(12) United States Patent
Adamo et al.

(10) Patent No.: US 11,185,839 B2
(45) Date of Patent: Nov. 30, 2021

(54) RECONFIGURABLE MULTI-STEP CHEMICAL SYNTHESIS SYSTEM AND RELATED COMPONENTS AND METHODS

(71) Applicant: Massachusetts Institute of Technology, Cambridge, MA (US)

(72) Inventors: Andrea Adamo, Cambridge, MA (US); Dale Arlington Thomas, III, Hampden, ME (US); Klavs F. Jensen, Lexington, MA (US); Timothy F. Jamison, Cambridge, MA (US); Aaron A. Bedermann, Conshohocken, PA (US); Kosisochukwu C. Aroh, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 432 days.

(21) Appl. No.: 16/098,333

(22) PCT Filed: May 2, 2017

(86) PCT No.: PCT/US2017/030649
§ 371 (c)(1),
(2) Date: Nov. 1, 2018

(87) PCT Pub. No.: WO2017/192595
PCT Pub. Date: Nov. 9, 2017

(65) Prior Publication Data
US 2019/0126229 A1    May 2, 2019

Related U.S. Application Data

(60) Provisional application No. 62/330,769, filed on May 2, 2016.

(51) Int. Cl.
*B01J 8/00* (2006.01)
*B01J 14/00* (2006.01)
(Continued)

(52) U.S. Cl.
CPC ............ *B01J 19/0053* (2013.01); *B01J 8/00* (2013.01); *B01J 14/00* (2013.01); *B01J 19/004* (2013.01);
(Continued)

(58) Field of Classification Search
CPC . B01J 8/00; B01J 14/00; B01J 19/0006; B01J 19/004; B01J 19/0053;
(Continued)

(56) References Cited

U.S. PATENT DOCUMENTS 2,421,714 A    6/1947 Rieveschl
2,441,498 A    5/1948 Lofgren et al.
(Continued)

FOREIGN PATENT DOCUMENTS

EP    2 374 534 A1    10/2011
EP    2 427 166 B1    10/2013
(Continued)

OTHER PUBLICATIONS

International Search Report and Written Opinion dated Jul. 27, 2017 for Application No. PCT/US2017/030649.
(Continued)

*Primary Examiner* — Natasha E Young
(74) *Attorney, Agent, or Firm* — Wolf, Greenfield & Sacks, P.C.

(57) ABSTRACT

The instant disclosure is related to fluidic distributors, fluidic systems, and associated methods and articles. Certain embodiments are related to fluidic distributors that comprise bays including fluidic connections with relative positions that substantially correspond to each other. In some embodiments, a fluidic distributor may comprise bays with electrical interfaces with relative positions that substantially correspond to each other.

20 Claims, 46 Drawing Sheets

(51) Int. Cl.
  *B01J 19/00* (2006.01)
  *B01J 19/24* (2006.01)
  *B01L 3/00* (2006.01)

(52) U.S. Cl.
  CPC ....... *B01J 19/0006* (2013.01); *B01J 19/0093* (2013.01); *B01J 19/245* (2013.01); *B01J 2219/00063* (2013.01); *B01J 2219/00162* (2013.01); *B01J 2219/00164* (2013.01); *B01J 2219/00177* (2013.01); *B01J 2219/00186* (2013.01); *B01J 2219/00308* (2013.01); *B01J 2219/00418* (2013.01); *B01J 2219/00479* (2013.01); *B01J 2219/00783* (2013.01); *B01J 2219/00813* (2013.01); *B01J 2219/00815* (2013.01); *B01J 2219/00822* (2013.01); *B01J 2219/00833* (2013.01); *B01J 2219/00835* (2013.01); *B01J 2219/00867* (2013.01); *B01J 2219/00873* (2013.01); *B01J 2219/00889* (2013.01); *B01J 2219/00907* (2013.01); *B01J 2219/00936* (2013.01); *B01J 2219/00945* (2013.01); *B01J 2219/00986* (2013.01); *B01L 3/502715* (2013.01)

(58) Field of Classification Search
  CPC ...... B01J 19/0093; B01J 19/24; B01J 19/245; B01J 2219/00–00063; B01J 2219/00162; B01J 2219/00164; B01J 2219/00177; B01J 2219/00186; B01J 2219/00274–00308; B01J 2219/00351; B01J 2219/00418; B01J 2219/00479; B01J 2219/00781; B01J 2219/00783; B01J 2219/000801; B01J 2219/0081; B01J 2219/0813; B01J 2219/00815; B01J 2219/00819; B01J 2219/00822; B01J 2219/00833; B01J 2219/00835; B01J 2219/00851; B01J 2219/00867; B01J 2219/00871; B01J 2219/00873; B01J 2219/00889; B01J 2219/00905; B01J 2219/00907; B01J 2219/00925; B01J 2219/00934; B01J 2219/00936; B01J 2219/00945; B01J 2219/0095; B01J 2219/00986
  See application file for complete search history.

(56) References Cited

U.S. PATENT DOCUMENTS

| | | | |
|---|---|---|---|
| 5,164,159 A | 11/1992 | Hayashi et al. | |
| 5,259,812 A | 11/1993 | Kleinsek | |
| 5,275,741 A | 1/1994 | Miano et al. | |
| 5,925,732 A | 7/1999 | Ecker et al. | |
| 6,376,729 B1 | 4/2002 | Merrill et al. | |
| 6,495,103 B2 * | 12/2002 | Hettinger | F15B 13/0817 137/269 |
| 6,638,482 B1 | 10/2003 | Ackley et al. | |
| 6,688,325 B2 * | 2/2004 | Hettinger | F15B 13/0814 137/270 |
| 6,737,026 B1 | 5/2004 | Bergh et al. | |
| 6,782,307 B2 | 8/2004 | Wilmott et al. | |
| 6,806,087 B2 | 10/2004 | Kibby et al. | |
| 7,172,735 B1 | 2/2007 | Lowe et al. | |
| 7,241,423 B2 | 7/2007 | Golbig et al. | |
| 7,790,124 B2 | 9/2010 | Matteo | |
| 7,854,902 B2 | 12/2010 | Matteo | |
| 8,075,778 B2 | 12/2011 | Guenther et al. | |
| 8,426,630 B2 | 4/2013 | McQuade et al. | |
| 8,540,939 B2 | 9/2013 | Niesz et al. | |
| 8,584,349 B2 | 11/2013 | Scannon et al. | |
| 8,709,231 B2 | 4/2014 | Lascoste et al. | |
| 8,821,718 B2 | 9/2014 | Blomberg et al. | |
| 10,780,410 B2 | 9/2020 | Jensen et al. | |
| 2002/0012616 A1 | 1/2002 | Zhou et al. | |
| 2002/0028504 A1 | 3/2002 | MacCaskill et al. | |
| 2003/0017467 A1 | 1/2003 | Hooper et al. | |
| 2003/0188740 A1 | 10/2003 | Tribelsky et al. | |
| 2004/0063992 A1 | 4/2004 | Chiang et al. | |
| 2005/0042149 A1 | 2/2005 | Bard | |
| 2005/0079109 A1 | 4/2005 | Meier | |
| 2005/0175519 A1 | 8/2005 | Rogers, Jr. et al. | |
| 2005/0177280 A1 | 8/2005 | Almstetter et al. | |
| 2006/0163069 A1 | 7/2006 | Prak et al. | |
| 2007/0144967 A1 | 6/2007 | Guenther et al. | |
| 2008/0233018 A1 | 9/2008 | Van Dam et al. | |
| 2008/0233653 A1 | 9/2008 | Hess et al. | |
| 2008/0288089 A1 | 11/2008 | Pettus et al. | |
| 2009/0043141 A1 | 2/2009 | Mazanec et al. | |
| 2009/0282978 A1 | 11/2009 | Jensen et al. | |
| 2010/0278706 A1 | 11/2010 | Mueh et al. | |
| 2010/0285575 A1 | 11/2010 | Michiels | |
| 2010/0324157 A1 | 12/2010 | Bauman et al. | |
| 2011/0104043 A1 | 5/2011 | Niesz et al. | |
| 2011/0132822 A1 | 6/2011 | Kaw | |
| 2011/0240924 A1 | 10/2011 | Repasky | |
| 2011/0258837 A1 | 10/2011 | Scannon et al. | |
| 2012/0061869 A1 | 3/2012 | Boeckx et al. | |
| 2012/0076692 A1 | 3/2012 | Miraghaie | |
| 2012/0094366 A1 | 4/2012 | Ludwig | |
| 2012/0107175 A1 | 5/2012 | Satyamurthy et al. | |
| 2012/0296448 A1 | 11/2012 | Balentine et al. | |
| 2012/0325469 A1 | 12/2012 | Olson et al. | |
| 2013/0260419 A1 | 10/2013 | Ransohoff et al. | |
| 2014/0263350 A1 | 9/2014 | Sheppard | |
| 2018/0207604 A1 | 7/2018 | Jensen et al. | |
| 2020/0368710 A1 | 11/2020 | Jensen et al. | |

FOREIGN PATENT DOCUMENTS

| | | |
|---|---|---|
| JP | H08-131819 A | 5/1996 |
| JP | H10-501167 A | 2/1998 |
| JP | 2002-186851 A | 7/2002 |
| JP | 2002-193848 A | 7/2002 |
| JP | 2003-531875 A | 10/2003 |
| JP | 2004-508919 A | 3/2004 |
| JP | 2006-239638 A | 9/2006 |
| JP | 2006-527073 A | 11/2006 |
| JP | 2007-515646 A | 6/2007 |
| JP | 2010-535703 A | 11/2010 |
| JP | 2011-509907 A | 3/2011 |
| JP | 2011-218349 A | 11/2011 |
| WO | WO 95/26796 A1 | 10/1995 |
| WO | WO 01/89681 A2 | 11/2001 |
| WO | WO 2005/063372 A2 | 7/2005 |
| WO | WO 2008/109877 A1 | 9/2008 |
| WO | WO 2010/132412 A2 | 11/2010 |
| WO | WO 2012/078677 A2 | 6/2012 |
| WO | WO 2013/123254 A1 | 8/2013 |
| WO | WO 2016/025803 A1 | 2/2016 |

OTHER PUBLICATIONS

Partial European Search Report dated Sep. 20, 2019 for Application No. EP 17793166.4.
Extended European Search Report dated Nov. 29, 2019 for Application No. EP 17793166.4.
Adamo et al., On-demand continuous-flow production of pharmaceuticals in a compact, reconfigurable system. Science. Apr. 1, 2016;352(6281):61-7. Doi: 10.1126/science.aaf1337.
International Preliminary Report on Patentability dated Nov. 15, 2018 for Application No. PCT/US2017/030649.
[No Author Listed], Defense Advanced Research Project Agency (DARPA), Broad Agency Announcement, Pharmacy on Demand (PoD), Defense Sciences Office (DSO), DARPA-BAA-11-05. Oct. 21, 2010;1-41.
[No Author Listed], Who Model List of Essential Medicines, 18th List, Apr. 2013, 47 pages. http://www.who.int/medicines/publications/essentialmedicines/en/index.html (accessed Aug. 3, 2013).

(56) References Cited

OTHER PUBLICATIONS

[No Author Listed], Corning Advanced-Flow Reactors—Low-Flow Reactor Pamphlet. 2016. 3 pages.
Abboud et al., Factory shift: new prescription for drug makers: update the plants; after years of neglect, industry focuses on manufacturing; FDA acts as a catalyst; the three-story blender. Wall Street J. Sep. 3, 2003, 5 pages.
Ahmed-Omer et al., Preparation of fluoxetine by multiple flow processing steps. Org Biomol Chem. May 21, 2011;9(10):3854-62. doi:10.1039/c0ob00906g. Epub Mar. 30, 2011.
Anderson, Using continuous processes to increase production. Org Process Res Dev. 2012;16(5):852-69.
Benyahia et al., A plant-wide dynamic model of a continuous pharmaceutical process. Ind Eng Chem Res. Oct. 2012; 51(47):15393-412.
Bogdan et al., The continuous-flow synthesis of ibuprofen. Angew Chem Int Ed Engl. 2009;48(45):8547-50. doi: 10.1002/anie.200903055.
Hartman et al., Deciding whether to go with the flow: evaluating the merits of flow reactors for synthesis. Angew Chem Int Ed Engl. Aug. 8, 2011;50(33):7502-19. doi: 10.1002/anie.201004637. Epub Jun. 27, 2011.
Hartman et al., Microchemical systems for continuous-flow synthesis. Lab Chip. Sep. 7, 2009;9(17):2495-507. doi: 10.1039/b906343a. Epub May 28, 2009.
Hessel, Novel process windows—gate to maximizing process intensification via flow chemistry. Chem Eng Technol. Nov. 2009;32(11):1655-81.
Hogan, A little goes a long way. Nature. Jul. 27, 2006;442:351-2. Erratum in: Nature. Jul. 27, 2006;442:351-2.
Jimenez-Gonzalez et al., Key green engineering research areas for sustainable manufacturing: a perspective from pharmaceutical and fine chemicals manufacturers. Org Process Res Dev. Jul. 2011; 15(4):900-11.
Malet-Sanz, Continuous flow synthesis. A pharma perspective. J Med Chem. May 10, 2012;55(9):4062-98. doi: 10.1021/jm2006029. Epub Feb. 27, 2012.
Mason et al., Greener approaches to organic synthesis using microreactor technology. Chem Rev. Jun. 2007;107(6):2300-18. Epub Mar. 21, 2007.
Plumb, Continuous processing in the pharmaceutical industry—changing the mindset. Chem Eng Res Des. Trans IChemE, Part A. Jun. 2005;83(A6):730-8.
Poechlauer et al., Continuous processing in the manufacture of active pharmaceutical ingredients and finished dosage forms: an industry perspective. Org Process Res Dev, 2012;16(10):1586-90.
Proctor et al., Continuous processing in the pharmaceutical industry, in Green Chemistry in the Pharmaceutical Industry, Ch. 11, 221-42. Wiley-VCH: Weinheim, Germany. 2010.
Reilly, The preparation of lidocaine. J Chem Educ. Nov. 1999;76(11):1557.
Roberge et al., Microreactor technology: a revolution for the fine chemical and pharmaceutical industries? Chem Eng Technol. 2005;28(3):318-23.
Roberge et al., Microreactor technology and continuous processes in the fine chemical and pharmaceutical industry: is the revolution underway? Org Process Res Dev. 2008;12(5):905-10.
Schaber et al., Economic analysis of integrated continuous and batch pharmaceutical manufacturing: a case study. Ind Eng Chem Res. Jul. 2011;50(17):10083-92.
Snead et al., End-to-end continuous flow synthesis and purification of diphenhydramine hydrochloride featuring atom economy, in-line separation, and flow of molten ammonium salts. Chem Sci. 2013;4(7):2822-27. doi: 10.1039/c3sc50859e.
Stankiewicz et al., Process intensification: transforming chemical engineering. Chem Eng Prog. Jan. 2000;96:22-34.
Sugasawa et al., A new simple synthesis of 1,4-benzodiazepines. J Heterocyclic Chem. Apr. 1979; 16(3):445-8.
Thomas, The reality of continuous processing. Manuf Chem. Apr. 1, 2005, accessed Jun. 21, 2017 at http://www.manufacturingchemist.com/technical/article_page/The_reality_of_continuous . . . , 5 pages.
Webb et al., Continuous flow multi-step organic synthesis. Chem Sci. 2010, 1, 675-80. doi: 10/1039/c0sc00381f.
Wegner et al., Ten key issues in modern flow chemistry. Chem Commun (Camb). Apr. 28, 2011;47(16):4583-92. doi: 10.1039/c0cc05060a. Epub Mar. 15, 2011.
Whitesides, The origins and the future of microfluidics. Nature. Jul. 27, 2006;442(7101):368-73.
Wiles et al., Micro Reaction Technology in Organic Synthesis. 453 pages (submitted in 2 parts), CRC Press: Boca Raton, 2011.
Yamauchi et al., A facile and efficient preparative method of methyl 2-arylpropanoates by treatment of propiophenones and their derivatives with iodine or iodine chlorides. J Org Chem. 1988;53(20):4858-9.
[No Author Listed], Critical Temperature and Pressure, dated Jul. 18, 2013. Purdue University. Retrieved on Nov. 19, 2019 from internet archive for https://web.archive.org/web/20130718160327/https://www.chem.purdue.edu/gchelp/liquids/critical.html. (Year: 2013).

\* cited by examiner

Modular piece that can be insterted between a unit operation (current MOD) and the BAY)
This piece enables new modular functionality

RECONFIGURABLE MULTI-STEP CHEMICAL SYNTHESIS SYSTEM AND RELATED COMPONENTS AND METHODS

RELATED APPLICATIONS

This application is a national stage filing under 35 U.S.C. 371 of International Patent Application Serial No. PCT/US2017/030649, filed May 2, 2017, published as International Patent Publication No. WO 2017/192595, and entitled "Reconfigurable Multi-Step Chemical Synthesis System and Related Components and Methods," which claims priority under 35 U.S.C. § 119(e) to U.S. Provisional Application No. 62/330,769, filed May 2, 2016, and entitled "Reconfigurable Multi-Step Chemical Synthesis System and Related Components and Methods," each of which is incorporated herein by reference in its entirety for all purposes.

GOVERNMENT SPONSORSHIP

This invention was made with Government support under Grant Nos. W911NF-15-1-0183 and W911NF-16-2-0023 awarded by the U.S. Army Research Office. The Government has certain rights in this invention.

TECHNICAL FIELD

Chemical synthesis systems, and related components and methods, are generally described.

BACKGROUND

Systems employed in chemical synthesis may include multiple components. Each component may be designed to perform a particular function, but may not be able to be easily or reversibly interfaced with other components in the system. In some cases, systems including multiple components may be custom designed for specific syntheses.

Accordingly, improved articles and methods are needed.

SUMMARY

The present disclosure is related to chemical synthesis systems and related components and methods. The subject matter of the present invention involves, in some cases, interrelated products, alternative solutions to a particular problem, and/or a plurality of different uses of one or more systems and/or articles.

Certain embodiments are related to inventive fluidic distributors. According to certain embodiments, the fluidic distributor comprises a first bay comprising first and second fluidic connections, and a second bay comprising first and second fluidic connections. In some such embodiments, the relative positions of the first and second fluidic connections of the first bay substantially correspond to the relative positions of the first and second fluidic connections of the second bay.

In some embodiments, the fluidic distributor comprises a first bay comprising first and second fluidic connections and an electrical interface; a second bay comprising first and second fluidic connections and an electrical interface; and a processor electronically coupled to the electrical interfaces of the first and second bays. In some such embodiments, the relative positions of the first fluidic connection of the first bay and the electrical interface of the first bay substantially correspond to the relative positions of the first fluidic connection of the second bay and the electrical interface of the second bay.

According to certain embodiments, a fluidic system is described. In some embodiments, the fluidic system comprises a fluidic distributor comprising a first bay comprising first and second fluidic connections and a second bay comprising first and second fluidic connections. In some embodiments, the fluidic system further comprises a first fluidic module comprising an inlet and an outlet and a second fluidic module comprising an inlet and an outlet. In some such embodiments, the fluidic distributor, the first fluidic module, and the second fluidic module are configured to be interchangeable such that: the relative positions of the inlet and the outlet of the first fluidic module substantially correspond to the relative positions of the first and second fluidic connections of the first bay; the relative positions of the inlet and the outlet of the first fluidic module substantially correspond to the relative positions of the first and second fluidic connections of the second bay; the relative positions of the inlet and the outlet of the second fluidic module substantially correspond to the relative positions of the first and second fluidic connections of the first bay; and the relative positions of the inlet and the outlet of the second fluidic module substantially correspond to the relative positions of the first and second fluidic connections of the second bay.

According to certain embodiments, the fluidic system comprises a fluidic distributor comprising a first bay comprising first and second fluidic connections and an electrical interface, a second bay comprising first and second fluidic connections and an electrical interface, and a processor electronically coupled to the electrical interfaces of the first and second bays. The fluidic system can comprise, in some such embodiments, a first fluidic module comprising an inlet, an outlet, and a sensor configured to determine at least one condition within the first fluidic module; and a second fluidic module comprising an inlet, an outlet, and a sensor configured to determine at least one condition within the second fluidic module. In some such embodiments, when the inlet and outlet of the first fluidic module are coupled with the first and second fluidic connections of the first bay, the electrical interface of the first bay is electronically coupled with the sensor of the first fluidic module, and when the inlet and outlet of the second fluidic module are coupled with the first and second fluidic connections of the second bay, the electrical interface of the second bay is electronically coupled with the sensor of the second fluidic module.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
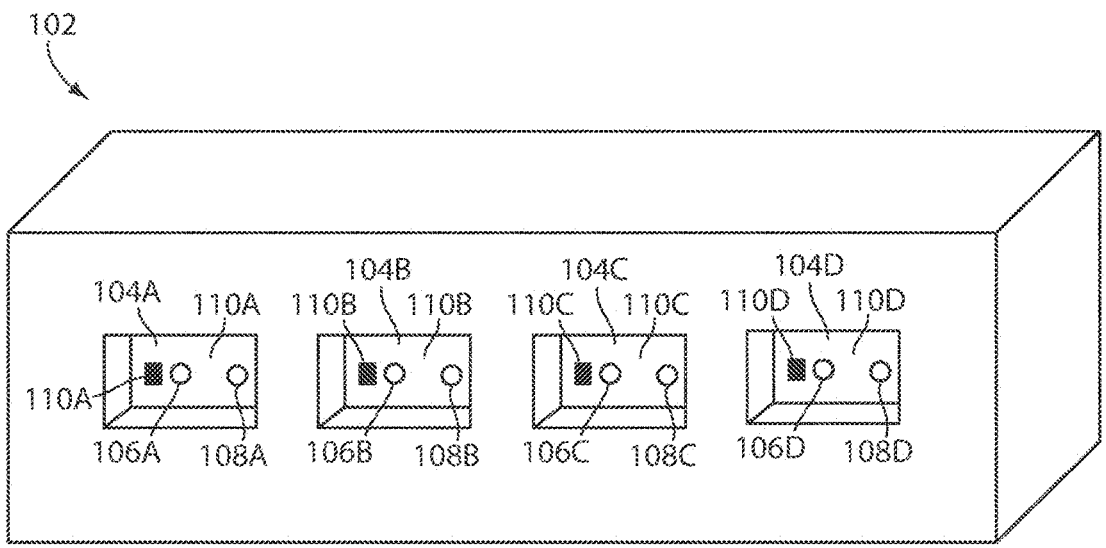
FIGS. 1A-1B show, according to some embodiments, fluidic distributors.

Chemical synthesis systems, and related components and methods, are generally described. In some embodiments, inventive fluidic distributors are described. The fluidic distributors can comprise at least a first bay and a second bay. The first and second bays (and/or additional, optional, bays) can be configured to receive modules. The modules can include one or more unit operations that can be used to perform chemical synthesis processes. In certain embodiments, the fluidic distributor can be configured such that modules may be placed in the first and second bays (and/or additional, optional, bays) interchangeably. Arranging the fluidic distributor in this way may allow one to, for example, create a customizable chemical synthesis process by arranging a plurality of modules within the plurality of bays of the fluidic distributor in a particular order. Arranging the fluidic distributor in this way may also, according to certain embodiments, perform multiple chemical synthesis processes using a single fluidic distributor and a single collection of modules arranged in different ways to produce, for example, different chemical products. For example, according to certain embodiments, a first chemical product may be produced by coupling a first module comprising a first chemical reactor unit operation to the first bay of the fluidic distributor, coupling a second module comprising a second chemical reactor unit operation to the second bay of the fluidic distributor, coupling a third module comprising a separator unit operation to the third bay of the fluidic distributor, and transporting one or more chemical reagents from the fluidic distributor through the first, second, and third modules in succession to perform a first chemical synthesis process. In some such embodiments, a second chemical product may be produced by coupling the first module comprising the first chemical reactor unit operation to the first bay of the fluidic distributor, coupling the third module comprising the separator unit operation to the second bay of the fluidic distributor, and transporting one or more chemical reagents (e.g., different from the first chemical reagent(s)) from the fluidic distributor through the first and third modules in succession to perform a second chemical synthesis process. Additional chemical synthesis processes could also be carried out, for example, using other permutations and combinations of modules comprising similar or different unit operations.

According to certain embodiments, the interchangeability of the modules within the fluidic distributor can be achieved by arranging fluidic connections (e.g., inlets and/or outlets) within bays of the fluidic distributor in a similar way. For example, in certain embodiments, each bay may include at least a first fluidic connection and a second fluidic connection. In some such embodiments, the relative positions of the first and second fluidic connections (and/or additional fluidic connections) within the first and second bays may be substantially similar. This can allow one, according to certain embodiments, to couple a single module to both the first and second bays (and/or additional bays) while maintaining the ability, within both bays (and/or additional bays), to transport fluid from the fluid distributor through the module and from the module back to the fluid distributor.

In certain embodiments, the fluidic distributor can be part of a system comprising a plurality of modules. Each of a plurality of the modules of the system may, according to certain embodiments, include one or more unit operations. In certain embodiments, each of a plurality of modules of the system may include at least a first fluidic connection and a second fluidic connection (e.g., an inlet and an outlet). In some such embodiments, the relative positions of the first and second fluidic connections (and/or additional fluidic connections) within each of a plurality of the modules of the system may be substantially similar. This can allow one, according to certain embodiments, to couple each of a plurality of the modules of the system to multiple bays of the fluidic distributor while maintaining the ability, within the multiple bays, to transport fluid from the fluid distributor through the module(s) and from the module(s) back to the fluid distributor.

Certain embodiments are related to inventive fluidic distributors and/or systems in which electrical communication can be easily maintained between the fluidic distributor and multiple modules. Such electrical communication may be used, for example, to monitor the chemical synthesis process performed by the system. According to certain embodiments, multiple bays of the fluidic distributor may have electrical interfaces arranged—relative to at least one fluidic connection within the bay—in a similar way. For example, in certain embodiments, at least first and second bays may include at least a first fluidic connection and at least one electrical interface (e.g., a metal contact pad). In some such embodiments, the relative positions of the fluidic connection and the electrical interface (and/or additional fluidic connections and/or electrical interfaces) within the first and second bays may be substantially similar. This can allow one, according to certain embodiments, to couple a single module to both the first and second bays (and/or additional bays) while maintaining the ability, within both bays (and/or additional bays), to both transport fluid between the fluid distributor and the module as well as transfer electrical signals between the fluid distributor and the module. In certain embodiments in which the fluidic distributor is part of a system comprising a plurality of modules, each of a plurality of modules of the system may include at least a first fluidic connection and at least one electrical interface. In some such embodiments, the relative positions of the first fluidic connection and the electrical interface (and/or additional fluidic connections and/or electrical interfaces) within each of a plurality of modules of the system may be substantially similar. This can allow one, according to certain embodiments, to couple multiple modules to any of multiple bays of the fluidic distributor while maintaining the ability, within each of the multiple bays, to both transport fluid between the fluid distributor and the module as well as transfer electrical signals between the fluid distributor and the module.

Research in chemistry and process chemistry development have changed little over the past 200 years and are still largely manual operations where the chemist manually prepares his/her own starting material and optimizes conditions by trial and error in a labor intensive way. In many industries, making molecules comprises a large bottleneck in research and development and requires the expertise of chemists with years of synthesis training. The availability of an automated system capable of multistep chemical synthesis/processing would greatly impact the field by freeing substantial amounts of time from the activities typically carried out by the chemist, including automated reaction optimization.

Accordingly, a fluidic system that is easy to operate may have the potential to become a "chemist companion" or "chemical toolbox." Certain of such user-friendly devices described herein could operate in a "plug-and-play" format, enable operation that is reaction and not hardware dependent, speed reaction discovery and development, simplify operations, perform tedious reactions, reduce the potential for user involvement and/or error, increase operational efficiency, allow for more rapid scaling, and/or increase safety by reducing user exposure to toxic chemicals. According to certain embodiments, such a system may become a general platform technology for user-driven, on-demand synthesis and purification. For example, a fluidic system that is easy to operate and useful to both beginners and experts may be able to perform one or more of the following functions traditionally performed by chemists: simplification of preparation of reagents, reaction optimization, data gathering for reaction scale up, and execution of dangerous reactions (for example, explosive and/or toxic reactions). Certain fluidic systems described herein may allow for adoption by engineers who desire to perform simple chemical transformations but do not have formal chemistry training.

In addition, certain embodiments described herein may be mass produced and/or capable of being priced at levels affordable to a wide variety of users in both industry and academia. For example, in some embodiments, a fluidic system may have a cost of less than or equal to $50,000. According to certain embodiments, a fluidic system may be priced at a level low enough that they may be as common as HPLC equipment, In certain embodiments, a fluidic system may be capable of producing lab-scale quantities of desired materials for purposes such as initial property evaluation and/or further study.

Certain of the embodiments described herein are related to fluidic systems capable of carrying out multistep chemical processes in an automated fashion. One feature of the system, according to certain embodiments, may be ease of configurability so that different processing sequences can be obtained on the same system. This configurability may be achieved, according to certain embodiments, by a design approach that uses a universal bay where clip-on modular units, or modules, can be attached. In some embodiments, bays may capable of connecting with modules without requiring additional fittings or screws. According to certain embodiments, electrical connection between a bay and a module may not require an electrical connector to be snapped in, thus protecting the electrical connector.

In certain embodiments, a fluidic system comprising a modular design may allow for a standardization of sizes so that users can have a "library" of reactors or reactor systems. In certain embodiments, the invention described herein may be able to carry out a variety of diverse reactions. In certain embodiments, a fluidic system may be able to carry out 7 or more different classes of chemical reactions. In some embodiments, a fluidic system may be able to carry out a combination of reactions that cover about 95% of the chemistry of interest in the pharmaceutical space. According to some embodiments, automation of the platform may open up a number of interesting applications further described below.

In some embodiments, a fluidic system may be coupled with liquid handlers to enable its use in medicinal chemistry and combinatorial applications with multistep processes. Some embodiments exploit a "flow chemistry" approach. Such flow chemistry approaches may, according to certain embodiments, provide one or more further advantages of: increased repeatability, simplification in expanding operating conditions in terms of pressure and temperature, unlimited flow of reagents into and out of modules, increased reaction yields, and shorter reaction times.

As noted above, certain embodiments are related to inventive fluidic distributors. The term "fluidic distributor" is generally used herein to refer to a device that is configured to be coupled to a plurality of modules and that includes fluidic pathways that allow fluid to be transported between a plurality of modules to which the fluidic distributor is coupled.

Figure 1B:
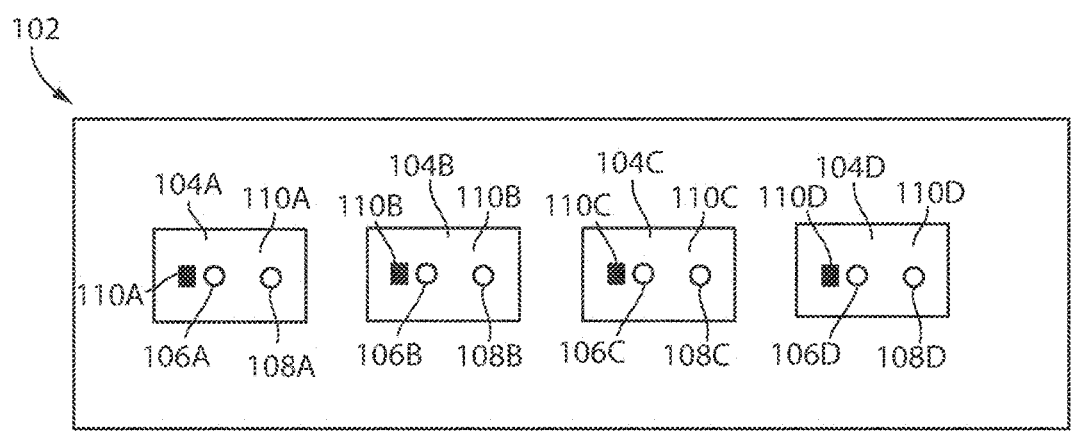

According to certain embodiments, the fluidic distributor comprises a first bay comprising first and second fluidic connections, and a second bay comprising first and second fluidic connections. FIGS. 1A-1B are schematic illustrations of exemplary fluidic distributor 102, according to certain embodiments. FIG. 1A is a perspective view of fluidic distributor 102, and FIG. 1B is a front view of fluidic distributor 102. In the set of embodiments illustrated in FIGS. 1A-1B, fluidic distributor 102 comprises first bay 104A comprising first fluidic connection 106A and second fluidic connection 108A. Fluidic distributor 102 also comprises second bay 104B comprising first fluidic connection 106B and second fluidic connection 108B. Optionally, the fluidic distributor can include additional bays (e.g., at least a third bay, a fourth bay, a fifth bay, etc.). One or more (or all) of the additional bays may include a first fluidic connection and a second fluidic connection. For example, referring to FIGS. 1A-1B, fluidic distributor 102 comprises optional third bay 104C comprising first fluidic connection 106C and second fluidic connection 108C. Fluidic distributor 102 also comprises optional fourth bay 104D comprising first fluidic connection 106D and second fluidic connection 108D. additional bays could also be included.

According to certain embodiments, the first fluidic connection of the first bay can be configured to transport fluid out of the fluidic distributor via the first bay (e.g., into a module coupled to the first bay). For example, referring to FIGS. 1A-1B, first fluidic connection 106A of first bay 104A can be configured to transport fluid out of fluidic distributor 102 via first bay 104A into a module coupled to first bay 104A. In some embodiments, the second fluidic connection of the first bay can be configured to transport fluid into the fluidic distributor via the first bay (e.g., from a module coupled to the first bay). For example, referring to FIGS. 1A-1B, second fluidic connection 108A of first bay 104A can be configured to transport fluid into fluidic distributor 102 via first bay 104A from a module coupled to first bay 104A.

In some embodiments, the first fluidic connection of the second bay can be configured to receive at least a portion (e.g., at least 75 wt %, at least 90 wt %, at least 95 wt %, at least 99 wt %, or at least 99.9 wt %) of the fluid transported into the fluidic distributor via the second fluidic connection of the first bay. For example, referring to FIGS. 1A-1B, first fluidic connection 106B of second bay 104B can be configured to receive at least a portion of the fluid transported into fluidic distributor 102 via second fluidic connection 108A of first bay 104A. Such arrangements may be achieved, for example, by connecting second fluidic connection 108A of first bay 104A to first fluidic connection 106B of second bay 104B, for example, with a fluidic channel. By fluidically arranging the first and second bays in this manner, the fluidic distributor can be configured such that the first bay is coupled to a module in which a first step of a chemical synthesis process is performed and the second bay is coupled to a module in which a second step of the chemical synthesis process is performed (after the first step).

According to certain embodiments, the first fluidic connection of the second bay can be configured to transport fluid out of the fluidic distributor via the second bay (e.g., into a module coupled to the second bay). For example, referring to FIGS. 1A-1B, first fluidic connection 106B of second bay 104B can be configured to transport fluid out of fluidic distributor 102 via second bay 104B into a module coupled to second bay 104B. In some embodiments, the second fluidic connection of the second bay can be configured to transport fluid into the fluidic distributor via the second bay (e.g., from a module coupled to the second bay). For example, referring to FIGS. 1A-1B, second fluidic connection 108B of second bay 104B can be configured to transport fluid into fluidic distributor 102 via second bay 104B from a module coupled to second bay 104B.

In some embodiments in which an optional third bay is present, the first fluidic connection of the third bay can be configured to receive at least a portion (e.g., at least 75 wt %, at least 90 wt %, at least 95 wt %, at least 99 wt %, or at least 99.9 wt %) of the fluid transported into the fluidic distributor via the second fluidic connection of the second bay. For example, referring to FIGS. 1A-1B, first fluidic connection 106C of third bay 104C can be configured to receive at least a portion of the fluid transported into fluidic distributor 102 via second fluidic connection 108B of second bay 104B. Such arrangements may be achieved, for example, by connecting second fluidic connection 108B of second bay 104B to first fluidic connection 106C of third bay 104C, for example, with a fluidic channel. By fluidically arranging the second and third bays in this manner, the fluidic distributor can be configured such that the first bay is coupled to a module in which a first step of a chemical synthesis process is performed, the second bay is coupled to a module in which a second step of the chemical synthesis process is performed (after the first step), and the third bay is coupled to a module in which a third step of the chemical synthesis process is performed (after the first and second steps).

According to certain embodiments in which an optional third bay is present, the first fluidic connection of the third bay can be configured to transport fluid out of the fluidic distributor via the third bay (e.g., into a module coupled to the third bay). For example, referring to FIGS. 1A-1B, first fluidic connection 106C of third bay 104C can be configured to transport fluid out of fluidic distributor 102 via third bay 104C into a module coupled to third bay 104C. In some embodiments, the second fluidic connection of the third bay can be configured to transport fluid into the fluidic distributor via the third bay (e.g., from a module coupled to the third bay). For example, referring to FIGS. 1A-1B, second fluidic connection 108C of third bay 104C can be configured to transport fluid into fluidic distributor 102 via third bay 104C from a module coupled to third bay 104C.

In some embodiments in which an optional fourth bay is present, the first fluidic connection of the fourth bay can be configured to receive at least a portion (e.g., at least 75 wt %, at least 90 wt %, at least 95 wt %, at least 99 wt %, or at least 99.9 wt %) of the fluid transported into the fluidic distributor via the second fluidic connection of the third bay. For example, referring to FIGS. 1A-1B, first fluidic connection 106D of fourth bay 104D can be configured to receive at least a portion of the fluid transported into fluidic distributor 102 via second fluidic connection 108C of third bay 104C. Such arrangements may be achieved, for example, by connecting second fluidic connection 108C of third bay 104C to first fluidic connection 106D of fourth bay 104D, for example, with a fluidic channel. By fluidically arranging the third and fourth bays in this manner, the fluidic distributor can be configured such that the first bay is coupled to a module in which a first step of a chemical synthesis process is performed, the second bay is coupled to a module in which a second step of the chemical synthesis process is performed (after the first step), the third bay is coupled to a module in which a third step of the chemical synthesis process is performed (after the first and second steps), and the fourth bay is coupled to a module in which a fourth step of the chemical synthesis process is performed (after the first, second, and third steps).

While an exemplary fluidic distributor has been described as including first and second bays, along with optional third and fourth bays, additional bays (some or all of which may be configured similarly to the first, second, third, and fourth bays) can also be present within the fluidic distributor.

It should be understood that in certain embodiments one or more bays may receive fluid from a source that is not another bay of the fluidic distributor, such as an external fluid source. For example, referring to FIGS. 1A-1B, first fluidic connection 106A of first bay 104A can be configured to receive fluid from a first external fluid source. Such arrangements may be achieved, for example, by connecting an external fluid source to first fluidic connection 106A of first bay 104A, for example, with a fluidic channel. As another example, again referring to FIGS. 1A-1B, first fluidic connection 106B of second bay 104B can be configured to receive fluid from a second external source. Such an arrangement may allow fluid to be introduced into the second bay that has not passed through the first bay and/or has not passed through a module coupled to the first bay. In some embodiments, a fluid that has not undergone any unit operations may be introduced into first fluidic connection 106B of second bay 104B from a second external source. In embodiments in which the fluidic distributor further comprises optional third, fourth, and/or additional bays, any or all of the third, fourth, and/or additional bays may be configured to receive fluid from external sources. For example, first fluidic connection 106C of third bay 104C can be configured to receive fluid from a third external source, and/or first fluidic connection 106D of fourth bay 104D can be configured to receive fluid from a fourth external source, It should be understood that in some embodiments, it may be possible for each of the bays within a fluidic distributor to be configured to receive fluid from an external source, and in other embodiments some or none of the bays be configured to receive fluid from an external source.

Figure 1C:
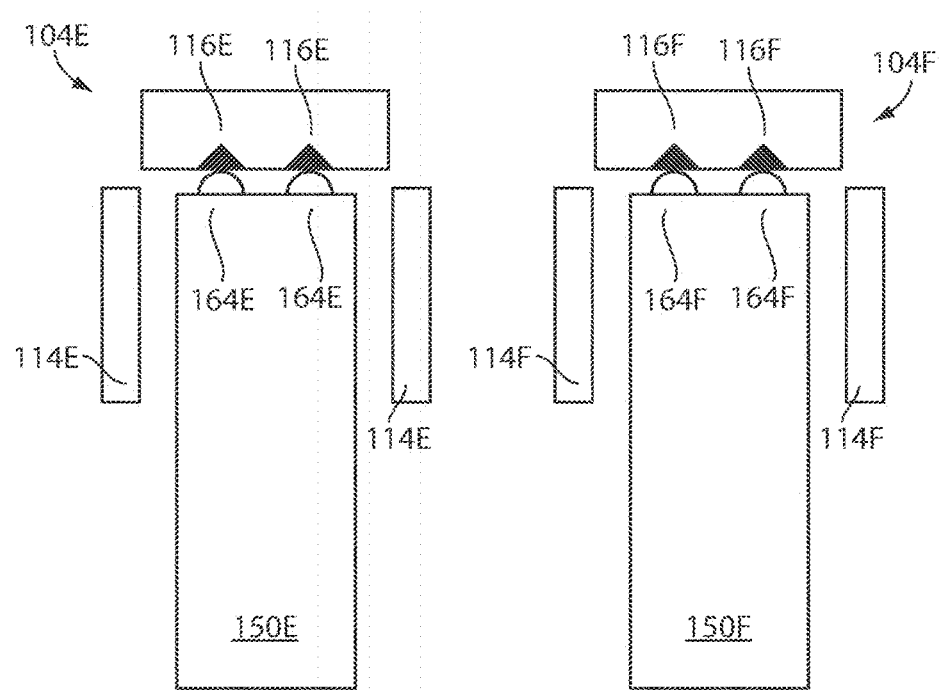
FIGS. 1C-1G show, according to some embodiments, bays that comprise clamps.
Figure 1D:
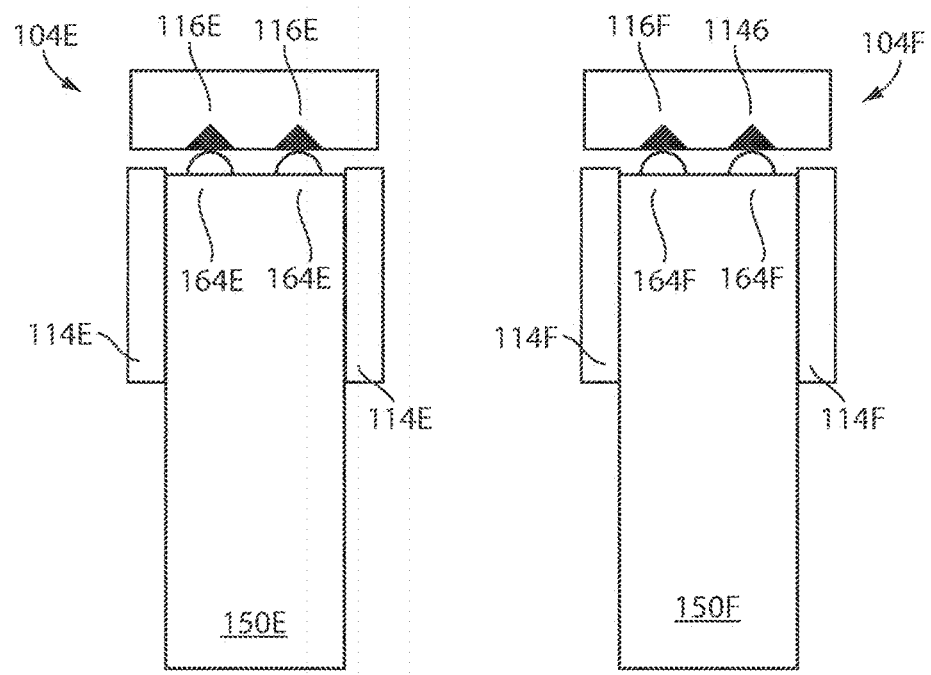
Figure 1E:
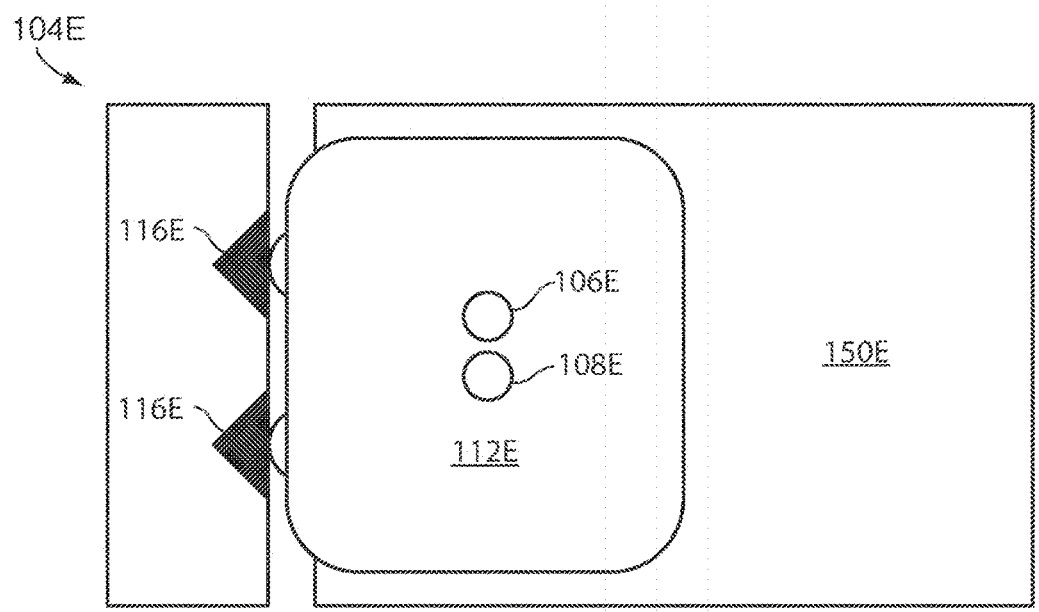
Figure 1F:
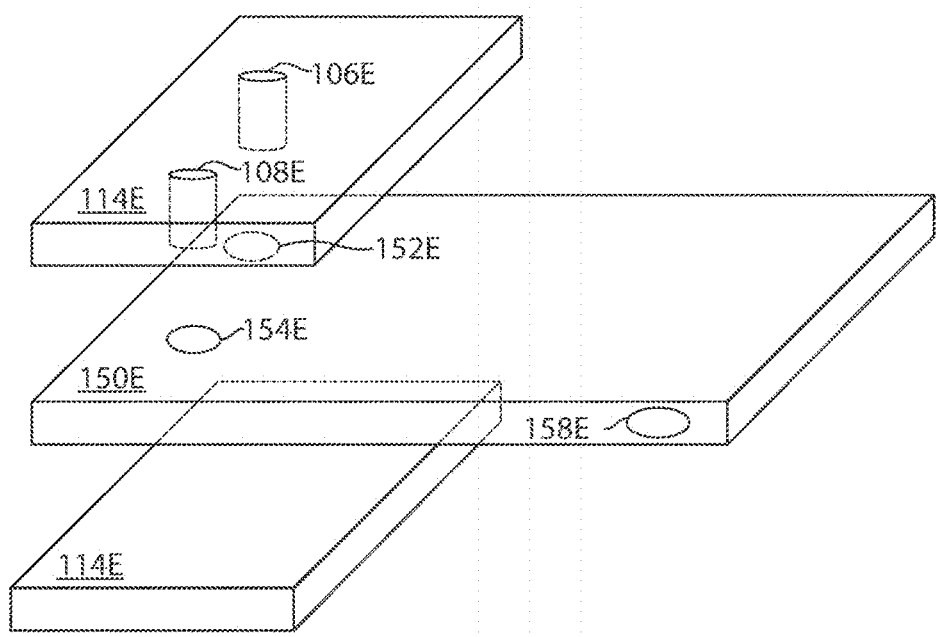

In some embodiments in which a bay (e.g., a first bay, a second bay, a third bay, a fourth bay, an additional bay) is configured to receive fluid from an external source, the bay may not receive fluid from the fluidic distributor, or may receive minimal fluid from the fluidic distributor. That is, the bay may be configured to receive fluid from the external source instead of from the fluidic distributor. In some such embodiments, one or more bays may not be in fluidic communication through the fluidic distributor. In other embodiments, a bay may receive fluid from both an external source directly and from the fluidic distributor. For example, as shown in FIG. 1F, a module may receive fluid from an external source directly through fluidic connection 158E.

As noted above, fluidic distributors can be configured to allow for easy interchangeability of modules, according to certain embodiments, by arranging fluidic connections within bays similarly. In some embodiments, the relative positions of the first and second fluidic connections of the first bay substantially correspond to the relative positions of the first and second fluidic connections of the second bay. For example, referring to FIGS. 1A-1B, the relative positions of first fluidic connection 106A and second fluidic connection 108B of first bay 104A substantially correspond to the relative positions of first fluidic connection 106B and second fluidic connection 108B of second bay 104B. In particular, in FIGS. 1A-1B, the distance between first fluidic connection 106A and second fluidic connection 108B of first bay 104A is the same as the distance between first fluidic connection 106B and second fluidic connection 108B of second bay 104B.

According to certain embodiments in which an optional third bay is present, the relative positions of the first and second fluidic connections of the third bay substantially correspond to the relative positions of the first and second fluidic connections of the first bay and the relative positions of the first and second fluidic connections of the second bay. For example, referring to FIGS. 1A-1B, the relative positions of first fluidic connection 106C and second fluidic connection 108C of third bay 104C substantially correspond to the relative positions of first fluidic connection 106A and second fluidic connection 108A of first bay 104A. In particular, in FIGS. 1A-1B, the distance between first fluidic connection 106C and second fluidic connection 108C of third bay 104C is the same as the distance between first fluidic connection 106A and second fluidic connection 108A of first bay 104A. In addition, in FIGS. 1A-1B, the relative positions of first fluidic connection 106C and second fluidic connection 108C of third bay 104C substantially correspond to the relative positions of first fluidic connection 106B and second fluidic connection 108B of second bay 104B. In particular, in FIGS. 1A-1B, the distance between first fluidic connection 106C and second fluidic connection 108C of third bay 104C is the same as the distance between first fluidic connection 106B and second fluidic connection 108B of second bay 104B.

According to certain embodiments in which an optional fourth bay is present, the relative positions of the first and second fluidic connections of the fourth bay substantially correspond to the relative positions of the first and second fluidic connections of the first bay, the relative positions of the first and second fluidic connections of the second bay, and the relative positions of the first and second fluidic connections of the third bay. For example, referring to FIGS. 1A-1B, the relative positions of first fluidic connection 106D and second fluidic connection 108D of third bay 104D substantially correspond to the relative positions of first fluidic connection 106A and second fluidic connection 108A of first bay 104A. In particular, in FIGS. 1A-1B, the distance between first fluidic connection 106D and second fluidic connection 108D of fourth bay 104D is the same as the distance between first fluidic connection 106A and second fluidic connection 108A of first bay 104A. In addition, in FIGS. 1A-1B, the relative positions of first fluidic connection 106D and second fluidic connection 108D of fourth bay 104D substantially correspond to the relative positions of first fluidic connection 106B and second fluidic connection 108B of second bay 104B. In particular, in FIGS. 1A-1B, the distance between first fluidic connection 106D and second fluidic connection 108D of fourth bay 104D is the same as the distance between first fluidic connection 106B and second fluidic connection 108B of second bay 104B. Finally, in FIGS. 1A-1B, the relative positions of first fluidic connection 106D and second fluidic connection 108D of fourth bay 104D substantially correspond to the relative positions of first fluidic connection 106C and second fluidic connection 108C of third bay 104C. In particular, in FIGS. 1A-1B, the distance between first fluidic connection 106D and second fluidic connection 108D of fourth bay 104D is the same as the distance between first fluidic connection 106C and second fluidic connection 108C of third bay 104C.

Figure 4A:
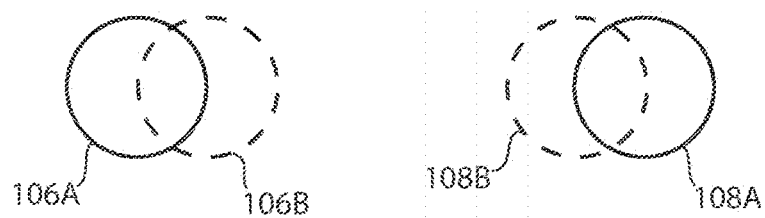
FIGS. 4A-4B show, according to some embodiments, relative positions of fluidic connectors.
Figure 4B:
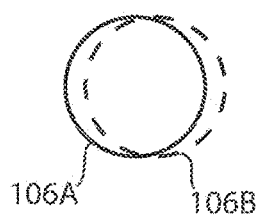
Figure 4B:
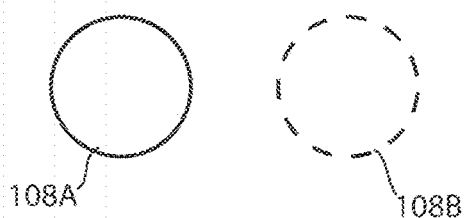

While, in FIGS. 1A-1B, the spatial arrangements of the first and second fluidic connections within each of first bay 104A, second bay 104B, third bay 104C, and fourth bay 104D are identical, such exact spatial conformity is not required for the relative positions of a first pair of fluidic connections to substantially correspond to the relative positions of a second pair of fluidic connections. In fact, the relative positions of a first pair of fluidic connections is considered to "substantially correspond" to the relative positions of a second pair of fluidic connections if one of the pairs of fluidic connections can be superimposed on the other of the pairs of fluidic connections (while maintaining the relative positions between fluidic connections within pairs) such that there is at least some overlap between the first fluidic connections of the pairs and such that there is at least some overlap between the second fluidic connections of the pairs. For example, referring to FIG. 4A, the relative positions of fluidic connection 106A and fluidic connection 108A (which may be, for example, the first and second fluidic connections of first bay 104A) substantially correspond to the relative positions of fluidic connection 106B and fluidic connection 108B (which may be, for example, the first and second fluidic connections of second bay 104B) because fluidic connections 106A and 108A can be superimposed over fluidic connections 106B and 108B—while maintaining the relative positions between connections 106A and 108A and while maintaining the relative positions between connections 106B and 108B—such that connection 106A at least partially overlaps with connection 106B and such that connection 108A at least partially overlaps with connection 108B. On the other hand, in FIG. 4B, the relative positions of fluidic connection 106A and fluidic connection 108A does not substantially correspond to the relative positions of fluidic connection 106B and fluidic connection 108B because, in FIG. 4B, fluidic connections 106A and 108A cannot be superimposed over fluidic connections 106B and 108B—while maintaining the relative positions between connections 106A and 108A and while maintaining the relative positions between connections 106B and 108B—such that connection 106A at least partially overlaps with connection 106B and such that connection 108A at least partially overlaps with connection 108B.

According to certain embodiments, the relative positions between two pairs of fluidic connections can substantially correspond to each other such that there is a relatively large degree of overlap (e.g., at least 50%, at least 75%, at least 90%, at least 95%, or more) between the two first fluidic connections, and such that there is a relatively large degree of overlap (e.g., at least 50%, at least 75%, at least 90%, at least 95%, or more) between the two second fluidic connections. For example, in some embodiments, the relative positions of the first and second fluidic connections of the first bay and the relative positions of the first and second fluidic connections of the second bay are arranged such that the first and second fluidic connections of the first bay can be superimposed over the first and second fluidic connections of the second bay—while maintaining the relative positions between the first and second fluidic connections of the first bay and while maintaining the relative positions between the first and second fluidic connections of the second bay—such that there is at least 50%, at least 75%, at least 90%, at least 95%, or more overlap between the first fluidic connection of the first bay and the first fluidic connection of the second bay, and such that there is at least 50%, at least 75%, at least 90%, at least 95%, or more overlap between the second fluidic connection of the first bay and the second fluidic connection of the second bay. Similarly, in some embodiments, the first and second fluidic connections of the optional third bay may have relative positions that substantially correspond to the relative positions of the first and second fluidic connections of the first bay and/or of the second bay to any of these degrees of overlap. In certain embodiments, the first and second fluidic connections of the optional fourth bay may have relative positions that substantially correspond to the relative positions of the first and second fluidic connections of the first bay, of the second bay, and/or of the third bay to any of these degrees of overlap.

While bays with two fluidic connections have been shown in FIGS. 1A-1B, additional fluidic connections may be present, in some embodiments. For example, in some embodiments, a third fluidic connection can be used to serve as a second outlet from the fluidic distributor. In some embodiments, an additional fluidic connection can be used to serve as a second inlet to the fluidic distributor. Additional fluidic connections can also be present.

It should be noted that although the first fluidic connection of a bay is generally referred to herein as an outlet (or a fluidic connection which provides fluid to a module to which the bay is connected) and the second fluidic connection of the bay is generally referred to as an inlet (or a fluidic connection which receives fluid from a module to which the bay is connected), this should not be understood to be limiting. In some embodiments, the first fluidic connection of a bay may be an outlet and the second fluidic connection of the bay may be an inlet. In some embodiments, a bay may contain only inlets or only outlets.

A variety of fluids may be transported through inlets and/or outlets of bays. In some embodiments, a fluid may be transported through an inlet of a bay into a module and/or from a module into an outlet of a bay. In some embodiments, the fluid may be a fluid to be processed by the module. Non-limiting examples of such fluids include fluids comprising solvents such as extraction solvents, quench fluids, reagents, chemical intermediates, products of chemical reactions, and/or waste fluids. In some embodiments, a fluid may comprise two or more of the above (e.g., one or more reagents dissolved in a solvent, unreacted reagents and chemical intermediates dissolved in a solvent, and the like).

In some embodiments, a fluid may be transported through an inlet and/or outlet of a bay may not be processed by the module. In some such cases, the fluid may improve the functionality of the module. For example, a heat transfer fluid may be transported from an outlet of a bay into a module and/or from a module into an inlet of a bay. Heat transfer fluids may be any liquid or gas that is capable of transferring heat to and/or from a module and/or any fluids therein. Non-limiting examples of heat transfer fluids include organic fluids such as silicone oils and propylene glycol and aqueous fluids such as water. Heat transfer fluids may assist in maintaining a module at a target temperature, which may allow for unit operations such as reactions to be performed at that temperature. According to certain embodiments, it can be advantageous to use a liquid as a heat transfer fluid.

In some embodiments, a fluid may be transported through an inlet and/or outlet of a bay and may not be transported into and/or out of the module. For example, the fluid may serve to actuate a valve, such as a valve that reversibly connects the module to the bay and/or a valve that controls the flow of fluid through a module attached to a bay. Non-limiting examples of suitable valves that may be actuated by a fluid include pneumatic valves and fluid-actuated membrane valves. Non-limiting examples of fluids that may be employed to actuate valves include compressible fluids such as air and nitrogen and incompressible fluids such as water and hydraulic oils.

The fluidic distributor may comprise, according to certain embodiments, a processor. The processor may be used, in some embodiments, to communicate with one or more sensors on modules of an integrated system, for example, to determine one or more parameters (e.g., at least one of a temperature, pressure, pH, a component concentration, and a flow rate).

According to certain embodiments, the fluidic distributor comprises a first bay comprising first and second fluidic connections and an electrical interface. The fluidic distributor may also comprise, according to some embodiments, a second bay comprising first and second fluidic connections and an electrical interface. For example, in the set of embodiments illustrated in FIGS. 1A-1B, fluidic distributor 102 comprises first bay 104A, which comprises first fluidic connection 106A, second fluidic connection 108A, and electrical interface 110A. Fluidic distributor 102 also comprises second bay 104B, which comprises first fluidic connection 106B, second fluidic connection 108B, and second electrical interface 110B. Optionally, the fluidic distributor can include additional bays (e.g., at least a third bay, a fourth bay, a fifth bay, etc.). One or more (or all) of the additional bays may include a first fluidic connection, a second fluidic connection, and an electrical interface. For example, referring to FIGS. 1A-1B, fluidic distributor 102 comprises optional third bay 104C comprising first fluidic connection 106C, second fluidic connection 108C, and electrical interface 110C. Fluidic distributor 102 also comprises optional fourth bay 104D comprising first fluidic connection 106D, second fluidic connection 108D, and electrical interface 110D. Additional bays having electrical interfaces (as well as first and second fluidic connections) could also be included.

In some embodiments, a processor is electronically coupled to the electrical interfaces of the first and second bays. The processor may be part of the fluidic distributor, or it may be provided separately from the fluidic distributor. The processor may be electronically coupled to the electrical interfaces using a wired or wireless connection.

According to certain embodiments, fluidic distributors can be configured to allow for easy interchangeability of modules by arranging fluidic connections and electrical interfaces within bays in a similar fashion. According to certain embodiments, the relative positions of the first fluidic connection of the first bay and the electrical interface of the first bay substantially correspond to the relative positions of the first fluidic connection of the second bay and the electrical interface of the second bay. For example, referring to FIGS. 1A-1B, the relative positions of first fluidic connection 106A and electrical interface 110A of first bay 104A substantially correspond to the relative positions of first fluidic connection 106B and electrical interface 110B of second bay 104B. In particular, in FIGS. 1A-1B, the distance between first fluidic connection 106A and electrical interface 110A of first bay 104A is the same as the distance between first fluidic connection 106B and electrical interface 110B of second bay 104B.

According to certain embodiments in which an optional third bay is present, the relative positions of the first fluidic connection of the third bay and the electrical interface of the third bay substantially correspond to the relative positions of the first fluidic connection of the first bay and the electrical interface of the first bay. In some such embodiments, the relative positions of the first fluidic connection of the third bay and the electrical interface of the third bay substantially correspond to the relative positions of the first fluidic connection of the second bay and the electrical interface of the second bay. For example, referring to FIGS. 1A-1B, the relative positions of first fluidic connection 106C and electrical interface 110C of third bay 104C substantially correspond to the relative positions of first fluidic connection 106A and electrical interface 110A of first bay 104A. In particular, in FIGS. 1A-1B, the distance between first fluidic connection 106C and electrical interface 110C of third bay 104C is the same as the distance between first fluidic connection 106A and electrical interface 110A of first bay 104A. In addition, referring to FIGS. 1A-1B, the relative positions of first fluidic connection 106C and electrical interface 110C of third bay 104C substantially correspond to the relative positions of first fluidic connection 106B and electrical interface 110B of second bay 104B. In particular, in FIGS. 1A-1B, the distance between first fluidic connection 106C and electrical interface 110C of third bay 104C is the same as the distance between first fluidic connection 106B and electrical interface 110B of second bay 104B.

According to certain embodiments in which an optional fourth bay is present, the relative positions of the first fluidic connection of the fourth bay and the electrical interface of the fourth bay substantially correspond to the relative positions of the first fluidic connection of the first bay and the electrical interface of the first bay. In some such embodiments, the relative positions of the first fluidic connection of the fourth bay and the electrical interface of the fourth bay substantially correspond to the relative positions of the first fluidic connection of the second bay and the electrical interface of the second bay. In some such embodiments, the relative positions of the first fluidic connection of the fourth bay and the electrical interface of the fourth bay substantially correspond to the relative positions of the first fluidic connection of the third bay and the electrical interface of the third bay. For example, referring to FIGS. 1A-1B, the relative positions of first fluidic connection 106D and electrical interface 110D of fourth bay 104D substantially correspond to the relative positions of first fluidic connection 106A and electrical interface 110A of first bay 104A. In particular, in FIGS. 1A-1B, the distance between first fluidic connection 106D and electrical interface 110D of fourth bay 104D is the same as the distance between first fluidic connection 106A and electrical interface 110A of first bay 104A. In addition, referring to FIGS. 1A-1B, the relative positions of first fluidic connection 106D and electrical interface 110D of fourth bay 104D substantially correspond to the relative positions of first fluidic connection 106B and electrical interface 110B of second bay 104B. In particular, in FIGS. 1A-1B, the distance between first fluidic connection 106D and electrical interface 110D of fourth bay 104D is the same as the distance between first fluidic connection 106B and electrical interface 110B of second bay 104B. Moreover, in FIGS. 1A-1B, the relative positions of first fluidic connection 106D and electrical interface 110D of fourth bay 104D substantially correspond to the relative positions of first fluidic connection 106C and electrical interface 110C of third bay 104C. In particular, in FIGS. 1A-1B, the distance between first fluidic connection 106D and electrical interface 110D of fourth bay 104D is the same as the distance between first fluidic connection 106C and electrical interface 110C of third bay 104C.

Figure 5A:
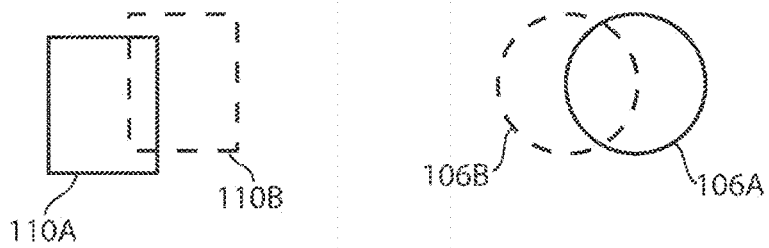
FIGS. 5A-5B show, according to some embodiments, relative positions of fluidic connectors and electrical interfaces.
Figure 5B:
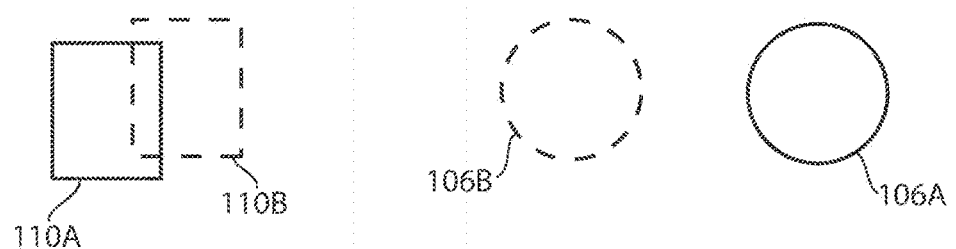

While, in FIGS. 1A-1B, the spatial arrangements of fluidic connections and electrical interfaces within each of first bay 104A, second bay 104B, third bay 104C, and fourth bay 104D in FIGS. 1A-1B are identical, such exact spatial conformity is not required for the relative positions between a first fluidic connection and a first electrical interface to substantially correspond to the relative positions between a second fluidic connection and a second electrical interface. In fact, the relative positions of a first fluidic connection and a first electrical interface is considered to "substantially correspond" to the relative positions of a second fluidic connection and a second electrical interface if the first fluidic connection and first electrical interface can be superimposed on the second fluidic connection and the second electrical interface (while maintaining the relative positions between the first fluidic connection and the first electrical interface and while maintaining the relative positions between the second fluidic connection and the second electrical interface) such that there is at least some overlap between the first and second fluidic connections and such that there is at least some overlap between the first and second electrical interfaces. For example, referring to FIG. 5A, the relative positions of fluidic connection 106A and electrical interface 110A (which may be, for example, positioned within first bay 104A) substantially correspond to the relative positions of fluidic connection 106B and electrical interface 110B (which may be, for example, positioned within second bay 104B) because fluidic connection 106A and electrical interface 110A can be superimposed over fluidic connection 106B and electrical interface 110B—while maintaining the relative positions between connection 106A and interface 110A and while maintaining the relative positions between connection 106B and interface 110A—such that connection 106A at least partially overlaps with connection 106B and such that interface 110A at least partially overlaps with interface 110B. On the other hand, in FIG. 5B, the relative positions of fluidic connection 106A and electrical interface 110A does not substantially correspond to the relative positions of fluidic connection 106B and electrical interface 110B because, in FIG. 5B, fluidic connection 106A and electrical interface 110A cannot be superimposed over fluidic connection 106B and electrical interface 110B—while maintaining the relative positions between connection 106A and interface 110A and while maintaining the relative positions between connection 106B and interface 110B—such that connection 106A at least partially overlaps with connection 106B and such that interface 110A at least partially overlaps with interface 110B.

According to certain embodiments, the relative positions between a first fluidic connection and a first electrical interface can substantially correspond to the relative positions between a second fluidic connection and a second electrical interface such that there is a relatively large degree of overlap (e.g., at least 50%, at least 75%, at least 90%, at least 95%, or more) between the two fluidic connections, and such that there is a relatively large degree of overlap (e.g., at least 50%, at least 75%, at least 90%, at least 95%, or more) between the two electrical interfaces. For example, in some embodiments, the relative positions of the first fluidic connection and the electrical interface of the first bay and the relative positions of the first fluidic connection and the electrical interface of the second bay are arranged such that the fluidic connection and electrical interface of the first bay can be superimposed over the fluidic connection and the electrical interface of the second bay—while maintaining the relative positions between the fluidic connection and electrical interface of the first bay and while maintaining the relative positions between the fluidic connection and electrical interface of the second bay—such that there is at least 50%, at least 75%, at least 90%, at least 95%, or more overlap between the fluidic connection of the first bay and the fluidic connection of the second bay, and such that there is at least 50%, at least 75%, at least 90%, at least 95%, or more overlap between the electrical interface of the first bay and the electrical interface of the second bay. Similarly, in some embodiments, the first fluidic connection and the electrical interface of the optional third bay may have relative positions that substantially correspond to the relative positions of the first fluidic connection and electrical interface of the first bay and/or of the second bay to any of these degrees of overlap. In certain embodiments, the first fluidic connection and the electrical interface of the optional fourth bay may have relative positions that substantially correspond to the relative positions of the first fluidic connection and electrical interface of the first bay, the second bay, and/or the third bay to any of these degrees of overlap.

The bays of the fluidic distributor can assume a variety of suitable configurations. In some embodiments, the bay(s) comprise a cavity formed into the volume of the fluidic distributor. For example, in FIGS. 1A-1B, bays 104A-104D are each in the form of a cavity that extends into the volume of fluidic distributor 102. According to certain embodiments, the bay cavity can be configured such that a module can be at least partially inserted into the volume of the bay (e.g., such that at least 2%, at least 5%, at least 10%, at least 20%, at least 50%, at least 75%, at least 90%, or all of the volume of the module is contained within the bay).

In some embodiments, a fluidic distributor may comprise bay(s) that do not necessarily include cavities. For example, the bay(s) may be flat surfaces on the face of the fluidic distributor.

In some embodiments, the bay(s) may comprise clamp(s). FIGS. 1C-1G show one non-limiting embodiment of a bay that comprises a clamp. In FIGS. 1C-1D show top views of bays 104E and 104F, which comprise clamps 114E and 114F, respectively, and FIG. 1E shows a side view of bay 104E. FIGS. 1C-1D also show modules 150E and 150F. As shown in FIG. 1D, clamp 114E may close around module 150E and clamp 114F may close around module 150F. Although FIGS. 1D-1E do not shown any electrical interfaces, it should be understood that clamps may also include electrical interfaces, and that the relative positions of the electrical interfaces on second, third, fourth, and/or additional clamps may substantially correspond to the relative positions of the electrical interface on the first clamp in the same manner as described above for bays with other morphologies.

In some embodiments, the clamp may comprise fluidic connections and/or electrical interfaces on one or more surfaces. FIG. 1E shows an example of a top surface of a bay that is a clamp and comprises a first fluidic connection and a second fluidic connection. In FIG. 1E, clamp 114E comprises first fluidic connection 106E and second fluidic connection 108E. Although not shown, these fluidic connections may couple with first and second fluidic connections on module 150E. It should be understood that each fluidic connection may be on the same surface of the clamp as shown in FIG. 1E (such as a surface on which an electrical interface is located, or a surface on which an electrical interface is not located), or the fluidic connections may be present on two or more surfaces of the clamp. The surface(s) may be interior surface(s) of the clamp, and/or surface(s) of the clamp that are configured to abut an external surface of a module.

Figure 1G:
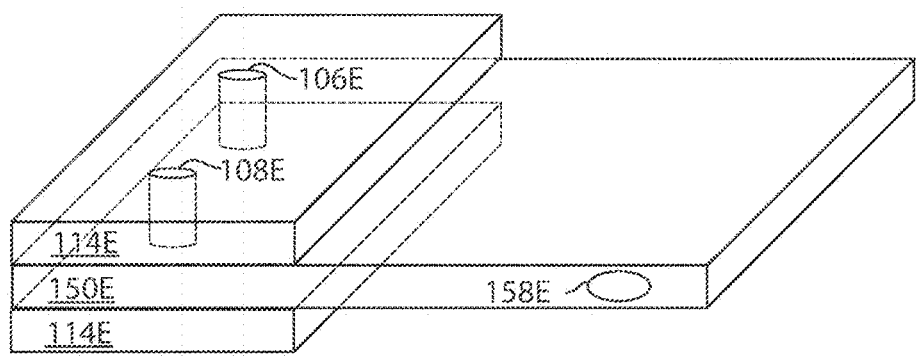

A clamp may be capable of gripping a module, or holding a module at a desired position and/or orientation. FIGS. 1F-1G show one example of a clamp 114E that is capable of gripping module 150E. In these FIGS., first fluidic connection 106E on clamp 114E is substantially aligned with first fluidic connection 152E on module 150E and second fluidic connection 108E on clamp 114E is substantially aligned with second fluidic connection 154E on module 150E. Module 150E also comprises unaligned fluidic connection 158E located on a face not comprising first fluidic connection 106E or second connection 108E, which will be discussed in further detail below. In some embodiments, the clamp may grip the module by applying pressure to the module. The pressure may be a compressive pressure, or it may be a reduced pressure. For example, the clamp may be capable of closing around a module and pressing it between two or more of its faces. As another example, the clamp may comprise one or more suction ports that are capable of applying a reduced pressure to a module at one or more positions. In some embodiments, an adhesive may be present on the surface of a clamp. In such cases, the adhesive may adhere a module to the surface of the clamp.

In some embodiments, a clamp may comprise one or more features that assist in the alignment of the clamp and a module. For example, as shown in FIGS. 1C-1F, bays 104E and 104F may comprise kinematic coupling features 116E and 116F, respectively, which may interact with kinematic coupling features 164E and 164F on modules 150E and 150F, respectively. The kinematic coupling feature(s) may facilitate alignment of one or more fluidic connections of the clamp with one or more fluidic connections of the module, and/or facilitate alignment of an electrical interface of the clamp with an electrical interface of the module.

Figure 1H:
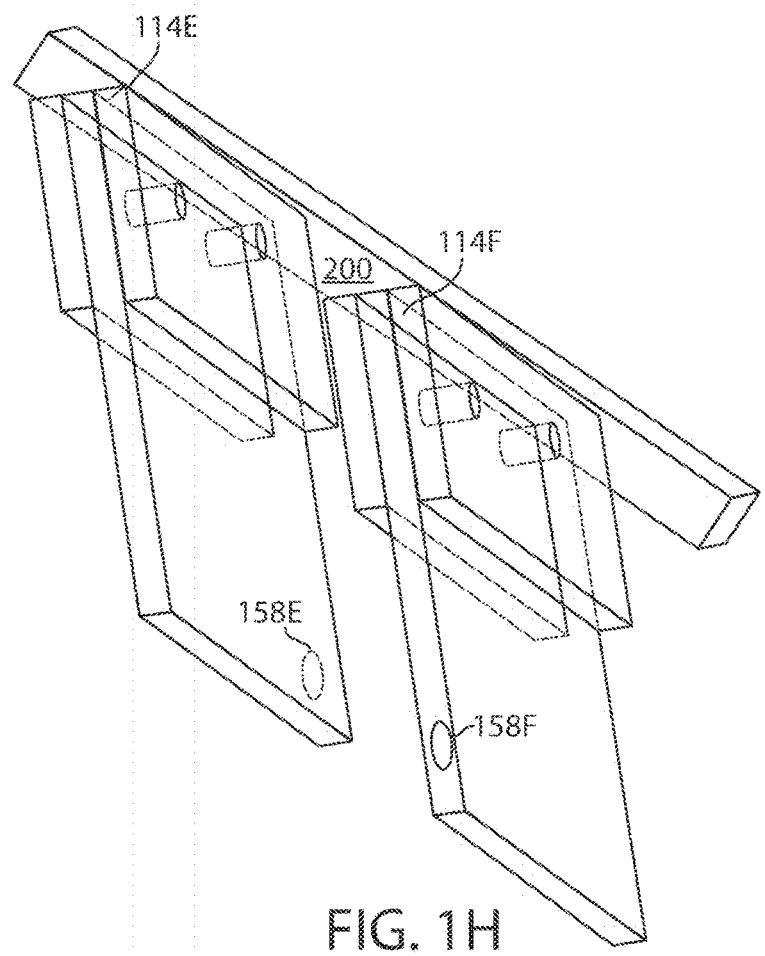
FIGS. 1H-1I show, according to some embodiments, bays that may be translated.
Figure 1I:
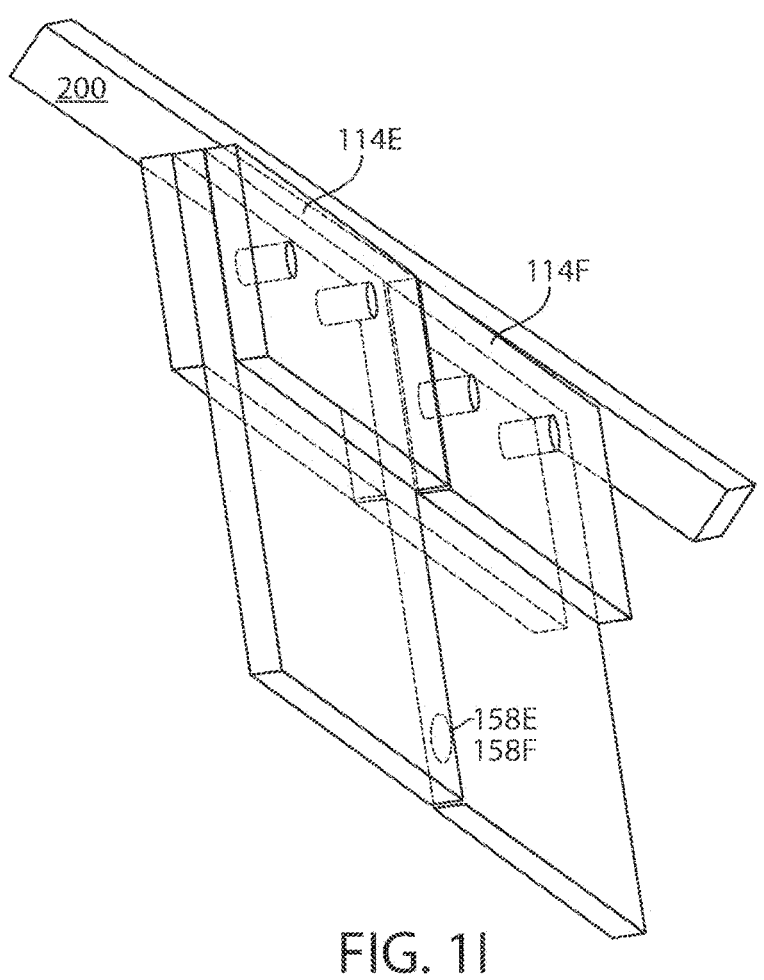

In some embodiments in which a fluidic distributor comprises at least two bays that comprise clamps, the clamps may be capable of moving relative to each other. For example, each clamp may be capable of being translated independently of any other bays and/or clamps of the fluidic distributor. As another example, two or more clamps may be positioned along a track, and may be capable of translating along the track. FIG. 1H shows one exemplary embodiment of two clamps 114E and 114F positioned along track 200. The two clamps may be brought closer together by moving one or both clamps along a track, or may be moved apart by moving one or both clamps along a track. For instance, as shown in in FIG. 1I, clamps 114E and 114F may be brought together by moving either clamp along the track. In certain embodiments, the first module and/or the second module may comprise one or more fluidic connections that are not aligned with any fluidic connections on a bay, such as unaligned fluidic connection 158E on module 150E and unaligned fluidic connection 158F on module 150F. Although unaligned fluidic connections 158E and 158F are shown on surfaces of modules 150E and 150F that lack other fluidic connections, this should be understood not to be limiting. In some embodiments, a module may comprise one or more unaligned fluidic connections on the same face as a first fluidic connection and/or a second fluidic connection. In cases where the first fluidic module and the second fluidic module comprise unaligned fluidic connections, the first module may be brought into fluidic communication with the second module by aligning the unaligned fluidic connection on the first module with the unaligned fluidic connection on the second module. For example, as shown in FIG. 1H, first module 150E may be translated so that it is adjacent to second module 150F and so that unaligned fluidic connection 158E is aligned with unaligned fluidic connection 158F. In this manner, one or more modules may be brought into direct fluidic communication with each other, without requiring fluidic communication with any bays. In some embodiments, an unaligned fluidic connection on a first bay may be in fluidic communication directly with an unaligned fluidic connection on a second bay, as is shown in FIG. 1I. In other embodiments, an unaligned fluidic connection on a first bay may be in fluidic communication with an unaligned fluidic connection through a conduit.

In some embodiments, fluidic communication through unaligned fluidic connections on a first module and a second module may be enhanced by one or more features that promote mating between the first module and the second module. The features may be features that promote mating between the unaligned fluidic connections on the first module and the second module, or may be features that promote mating between a conduit and the fluidic connections on the modules. In some embodiments, the features may be features that promote mating between the face of the first module and the face of the second module.

In certain embodiments, the first and second fluidic connections of the bay may be arranged on a single surface (e.g., a single planar or substantially planar face). For example, in FIGS. 1A-1B, fluidic connections 106A and 108A are both arranged on surface 112A of first bay 104A. Similarly, fluidic connections 106B and 108B are both arranged on surface 112B of second bay 104B; fluidic connections 106C and 108C are both arranged on surface 112C of third bay 104C; and fluidic connections 106D and 108D are both arranged on surface 112D of fourth bay 104D. As another example, in FIG. 1E, fluidic connections 106E and 108E are both arranged on surface 112E of clamp 114E.

In some embodiments, an electrical interface of a bay and at least one (or more) of the fluidic connections of the bay may be arranged on a single surface (e.g., a single planar or substantially planar face). For example, in FIGS. 1A-1B, electrical interface 110A and fluidic connection 106A (as well as fluidic connection 108A) of first bay 104A are both arranged on face 110A of first bay 104A. As another example, in FIG. 1E, the electrical interface (not shown) and fluidic connection 106E of clamp 114E are both arranged on face 112E of clamp 114E.

Similarly, electrical interface 110B and fluidic connection 106B (as well as fluidic connection 108B) of second bay 104B are both arranged on face 110B of second bay 104B; electrical interface 110C and fluidic connection 106C (as well as fluidic connection 108C) of third bay 104C are both arranged on face 110C of third bay 104C; and electrical interface 110D and fluidic connection 106D (as well as fluidic connection 108D) of fourth bay 104D are both arranged on face 110D of fourth bay 104D. As another example, in the case where a fluidic connector comprises at least two bays comprising clamps, an electrical interface and a fluidic connection may both be arranged on a face of each clamp.

Certain aspects are related to inventive fluidic systems. The system may comprise, according to certain embodiments, a fluidic distributor (e.g., any of the fluidic distributors described above or elsewhere herein) and a plurality of modules. The modules can contain, in certain embodiments, at least one unit operation. The unit operation can be used to perform a step of a chemical process. In some embodiments, the system comprises a plurality of modules fluidically connected in series. For example, in certain embodiments, the system comprises a first module and a second module fluidically connected to the first module in series (e.g., via the fluidic distributor and/or via one or more direct fluidic connections between the first module and the second module). In some such embodiments, the system comprises a third module, a fourth module, and/or additional modules fluidically connected to the first module and the second module in series (e.g., via the fluidic distributor and/or via one or more direct fluidic connections between two or more modules). By connecting multiple modules in series, one can perform a series of chemical processing steps as part of an overall chemical synthesis process. In some such embodiments, the first module can be used to perform a first step of the chemical synthesis process, and the second module can be used to perform a second step of the chemical synthesis process. Additional modules may, in some embodiments, perform additional steps of the chemical synthesis process.

Figure 2:
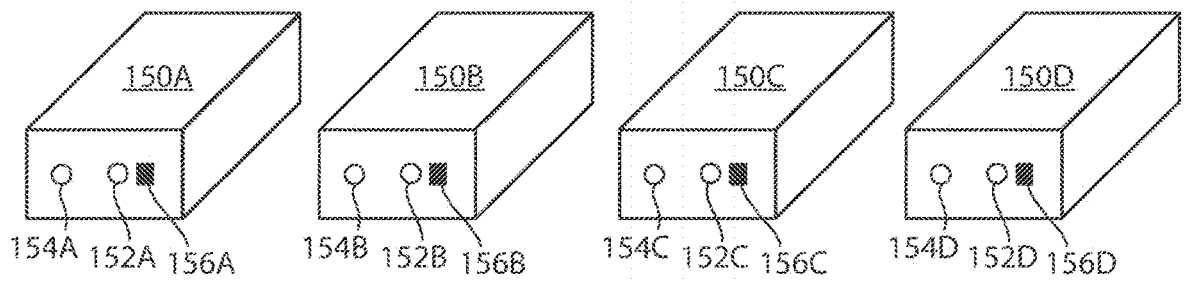
FIG. 2 shows, according to some embodiments, modules that may be connected to bays.
Figure 3:
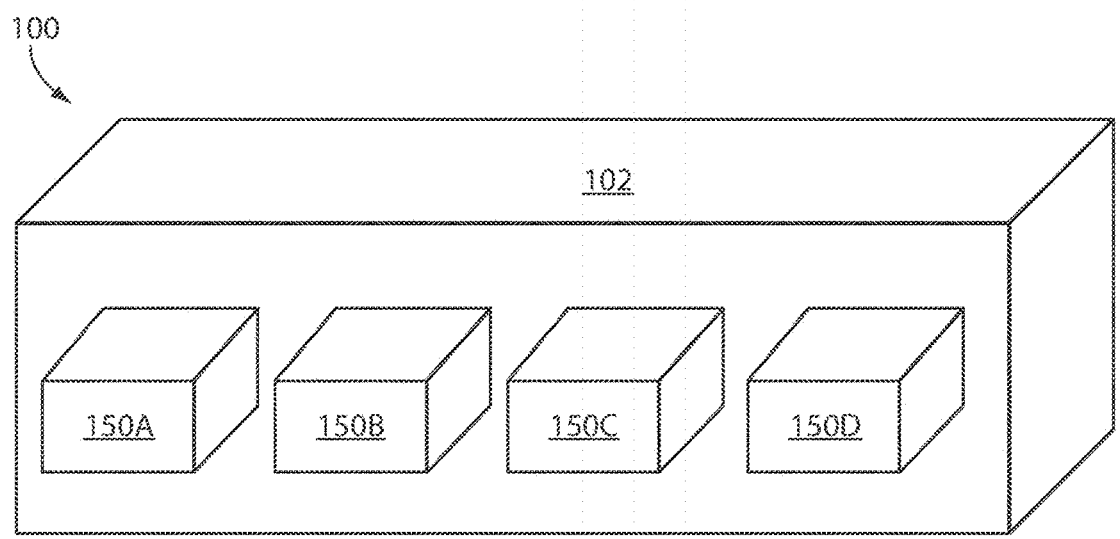
FIG. 3 shows, according to some embodiments, a system comprising a fluidic distributor and modules.

According to certain embodiments, the system comprises a first fluidic module comprising an inlet and an outlet, and a second fluidic module comprising an inlet and an outlet. FIG. 2 is a perspective view schematic illustration of exemplary modules 150A, 150B, and optional modules 150C and 150D, according to certain embodiments. FIG. 3 is a perspective view schematic illustration of system 100 in which modules 150A, 150B, optional module 150C, and optional module 150D have been coupled to bay 104A, bay 104B, optional bay 104C, and optional bay 104D of fluidic distributor 102. As illustrated in FIG. 2, first module 150A comprises inlet 152A and outlet 154A, and second module 150B comprises inlet 152B and outlet 154B. Also as shown in FIG. 2, optional third module 150C comprises inlet 152C and outlet 154C, and optional fourth module 150D comprises inlet 152D and outlet 154D.

In certain embodiments, the modules and/or bays of the system can be configured such that the modules can be connected to multiple bays interchangeably. In some embodiments, the fluidic distributor, the first fluidic module, and the second fluidic module are configured to be interchangeable such that the relative positions of the first fluidic connector and second fluidic connector (e.g., the inlet and the outlet) of the first fluidic module substantially correspond to the relative positions of the first and second fluidic connections of the first bay. In some embodiments, the relative positions of the first fluidic connector and second fluidic connector (e.g., the inlet and the outlet) of the first fluidic module substantially correspond to the relative positions of the first and second fluidic connections of the second bay. In some embodiments, the relative positions of the first fluidic connector and second fluidic connector (e.g., the inlet and the outlet) of the second fluidic module substantially correspond to the relative positions of the first and second fluidic connections of the first bay. In certain embodiments, the relative positions of the first fluidic connector and second fluidic connector (e.g., the inlet and the outlet) of the second fluidic module substantially correspond to the relative positions of the first and second fluidic connections of the second bay. In this way, the first module may be coupled to either of the first bay and the second bay while, in both cases, ensuring that fluid may be transported from the fluidic distributor through first module and back to the fluidic distributor. Additionally, the second module can be coupled to either of the first bay and the second bay while, in both cases, ensuring that fluid may be transported from the fluidic distributor through the second module and back to the fluid distributor and/or that the first module and the second module may be attached to the fluidic distributor by a standard set of valves. In certain embodiments in which an optional third and/or fourth (or more) bays are present, the third and/or fourth (or more) bays can be configured to interface similarly with the first and second modules. In addition, in certain embodiments in which optional third and/or fourth (or more) modules are present, the third and/or fourth (or more) modules may be configured to interface similarly with the first and second (and/or third, fourth, and/or more) bays.

While modules with a single inlet and a single outlet have been described above in accordance with certain embodiments of FIG. 2, additional fluidic connections may be present in the module(s), in some embodiments. For example, in some embodiments, one or more modules may comprise a second outlet. Such second outlets may be employed, for example, when the module comprises a separator. In some embodiments, one or more modules may comprise a second inlet. Such second inlets may be employed, for example, when the module comprises a mixer. Additional fluidic connections can also be present.

According to certain embodiments, one or more of the fluidic modules comprises a sensor. The sensor can be used to determine at least one condition within the module with which the sensor is incorporated. For example, in some embodiments, the first fluidic module comprises a sensor configured to determine at least one condition within the first fluidic module. In some embodiments, the second fluidic module comprises a sensor configured to determine at least one condition within the second fluidic module. In some embodiments in which an optional third module is present, the third fluidic module may comprise a sensor configured to determine at least one condition within the third fluidic module. In certain embodiments in which an optional fourth module is present, the fourth fluidic module may comprise a sensor configured to determine at least one condition within the fourth fluidic module.

The sensors within the module(s) can be configured to determine a number of conditions. For example, in some embodiments, the sensor can be configured to determine at least one condition within its corresponding module selected from the group consisting of temperature, pressure, pH, a component concentration, and a flow rate.

Non-limiting examples of suitable temperature sensors include RTD sensors, thermocouples such as type K thermocouples, infrared temperature sensors, pyrometers, Langmuir probes, and liquid thermometers. Exemplary commercially available temperature sensors include Omega SSRTC-GG-K-24-36 (a type K thermocouple); Omega SRTD-1 (an RTD temperature sensor); and Melexis Technologies NV part number MLX90614KSF-ACC-000-TU-ND (an IR temperature sensor).

Non-limiting examples of suitable pressure sensors include diaphragm sensors, MEMS sensors, capacitance sensors, resistive sensors, and strain gauges. Exemplary commercially available pressure sensors include TE 325540009-50, DJ instrument DF2, Omega PX209, Omega PX409, and Omega PX 55000 pressure sensors.

Non-limiting examples of suitable pH sensors include glass and non-glass ISFET pH sensors. Exemplary commercially available pH sensors include Mettler Toledo InPro 3100 and Mettler Toledo LoT407-M6-DXK-S7/25.

Non-limiting examples of suitable flow rate sensors include coriolis, differential pressure, ultrasonic, resistive, venturis, rotameter, thermal, electromagnetic, Doppler, calorimetric, Trubine, and vortex sensors. Exemplary commercially available pressure sensors include Bronkhorst mini CORI-FLOW, Bronkhorst micro-Flow, Bronkhorst Liqui-Flow, Bronkhorst Sonic-View, Bronkhorst MAG-View, Sensirion LPG10, Sensirion SLx, Sensirion Lx, and Senserion LD20.

Non-limiting examples of suitable component concentration sensors include FTIR sensors, UV/vis sensors, inline mass spectrometers, NIR sensors, and inline NMRs.

In some embodiments, the sensor(s) of the module(s) can be electronically coupled to the fluidic distributor. For example, the sensor of a module can be electronically coupled, in some embodiments, to the fluidic distributor via an electrical interface of a bay of the fluidic distributor to which the fluidic module is coupled. Referring to FIG. 3, for example, in some embodiments, a sensor in module 150A can be electronically coupled to fluidic distributor 100 via electrical interface 110A of first bay 104A of fluidic distributor 102. Electronic coupling between module(s) and the fluidic distributor via the electrical interface may comprise wired coupling, or may comprise wireless coupling. In the case of wired coupling, the electrical interface may be a contact pad. In the case of wireless coupling, the electrical interface may be a wireless antenna. The electronic coupling may be used to transmit data to and/or from a module, to provide power to a module from the fluidic distributor, and/or to provide power to the fluidic distributor from a module.

According to certain embodiments, the fluidic distributor and/or the fluidic module(s) may be configured such that, when the fluidic module is coupled with a bay (or multiple bays) of the fluidic distributor, the first and second fluidic connections (e.g., the inlet and the outlet) of the fluidic module are coupled with the first and second fluidic connections of the bay, and the electrical interface of the bay is electronically coupled with the sensor of the fluidic module. In some embodiments, the interface between the module and multiple bays can be standardized such that a single module may be connected in this fashion with multiple bays of the fluidic distributor. In certain embodiments, the interface between multiple modules and one or more bays can be standardized such that multiple modules may be connected in this fashion with a single bay of the fluidic distributor (or such that multiple modules may be interchangeably connected in this fashion with multiple bays of the fluidic distributor).

According to certain embodiments, when the inlet and outlet of the first fluidic module are coupled with the first and second fluidic connections of the first bay, the electrical interface of the first bay is electronically coupled with the sensor of the first fluidic module. In some such embodiments, when the inlet and outlet of the first fluidic module are coupled with the first and second fluidic connections of the second bay, the electrical interface of the second bay is electronically coupled with the sensor of the first fluidic module. In some such embodiments, when the inlet and outlet of the first fluidic module are coupled with the first and second fluidic connections of the optional third (and/or fourth, or additional) bay, the electrical interface of the third (and/or fourth, or additional) bay is electronically coupled with the sensor of the first fluidic module.

In some embodiments, when the inlet and outlet of the second fluidic module are coupled with the first and second fluidic connections of the second bay, the electrical interface of the second bay is electronically coupled with the sensor of the second fluidic module. In some such embodiments, when the inlet and outlet of the second fluidic module are coupled with the first and second fluidic connections of the first bay, the electrical interface of the first bay is electronically coupled with the sensor of the second fluidic module. In some such embodiments, when the inlet and outlet of the second fluidic module are coupled with the first and second fluidic connections of the optional third (and/or fourth, or additional) bay, the electrical interface of the third (and/or fourth, or additional) bay is electronically coupled with the sensor of the second fluidic module. Optional third and/or fourth (and/or more) fluidic modules may be configured to interface similarly with the first bay, the second bay, the optional third bay, the optional fourth bay, and/or additional bays of the fluidic distributor.

The distance between the first fluidic connection and the second fluidic connection on the first bay may be any suitable value. In some embodiments, the distance between the first fluidic connection and the second fluidic connection on the first bay may be greater than or equal to 0.5 mm, greater than or equal to 1 mm, greater than or equal to 2 mm, greater than or equal to 5 mm, greater than or equal to 10 mm, greater than or equal to 30 mm, greater than or equal to 50 mm, or greater than or equal to 100 mm. In some embodiments, the distance between the first fluidic connection and the second fluidic connection on the first bay may be less than or equal to 200 mm, less than or equal to 100 mm, less than or equal to 50 mm, less than or equal to 30 mm, less than or equal to 10 mm, less than or equal to 5 mm, less than or equal to 2 mm, or less than or equal to 1 mm. Combinations of the above-referenced ranges are also possible (e.g., greater than or equal to 0.5 mm and less than or equal to 30 mm, or greater than or equal to 30 mm and less than or equal to 200 mm). Other ranges are also possible. The first fluidic connection and the second fluidic connection may be positioned at any orientation with respect to each other. In some embodiments, the first fluidic connection and the second fluidic connection are positioned symmetrically around the center of the bay.

The diameter of the fluidic connections (e.g., a first fluidic connection, a second fluidic connection on, e.g., a first bay, a second bay, a third bay, a fourth bay) may be any suitable value. In some embodiments, the diameter of a fluidic connection is greater than or equal to 0.3 mm, greater than or equal to 0.5 mm, greater than or equal to 1 mm, greater than or equal to 3 mm, greater than or equal to 5 mm, greater than or equal to 10 mm, or greater than or equal to 12 mm. In some embodiments, the diameter of a fluidic connection is less than or equal to 15 mm, less than or equal to 12 mm, less than or equal to 10 mm, less than or equal to 5 mm, less than or equal to 3 mm, less than or equal to 1 mm, or less than or equal to 0.5 mm. Combinations of the above-referenced ranges are also possible (e.g., greater than or equal to 0.3 mm and less than or equal to 3 mm, or greater than or equal to 0.3 mm and less than or equal to 15 mm). Other ranges are also possible. As used herein, the diameter of a fluidic connection having a circular cross-section corresponds to the diameter of the circular cross-section. For a fluidic connection having a cross-sectional shape that is non-circular, the cross-sectional diameter of said connection corresponds to the diameter of a circle having an area equivalent to the area of the cross-section of the fluidic connection.

Flow rate through the fluidic connections (e.g., a first fluidic connection, a second fluidic connection on, e.g., a first bay, a second bay, a third bay, a fourth bay) may be any suitable value. In some embodiments, the flow rate through a fluidic connection is greater than or equal to 1 microliter per minute, greater than or equal to 2 microliters per minute, greater than or equal to 5 microliters per minute, greater than or equal to 10 microliters per minute, greater than or equal to 20 microliters per minute, greater than or equal to 50 microliters per minute, greater than or equal to 100 microliters per minute, greater than or equal to 200 microliters per minute, greater than or equal to 500 microliters per minute, greater than or equal to 1 milliliter per minute, greater than or equal to 2 milliliters per minute, greater than or equal to 5 milliliters per minute, greater than or equal to 10 milliliters per minute, greater than or equal to 20 milliliters per minute, greater than or equal to 50 milliliters per minute, greater than or equal to 100 milliliters per minute, greater than or equal to 200 milliliters per minute, greater than or equal to 500 milliliters per minute, greater than or equal to 1 liter per minute, or greater than or equal to 3 liters per minute. In some embodiments, the flow through a fluidic connection may be less than or equal to 4 liters per minute, less than or equal to 3 liters per minute, less than or equal to 1 liter per minute, less than or equal to 500 milliliters per minute, less than or equal to 200 milliliters per minute, less than or equal to 100 milliliters per minute, less than or equal to 50 milliliters per minute, less than or equal to 20 milliliters per minute, less than or equal to 10 milliliters per minute, less than or equal to 5 milliliters per minute, less than or equal to 2 milliliters per minute, less than or equal to 1 milliliter per minute, less than or equal to 500 microliters per minute, less than or equal to 200 microliters per minute, less than or equal to 100 microliters per minute, less than or equal to 50 microliters per minute, less than or equal to 20 microliters per minute, less than or equal to 10 microliters per minute, less than or equal to 5 microliters per minute, or less than or equal to 2 microliters per minute. Combinations of the above-referenced ranges are also possible (e.g., greater than or equal to 1 microliter per minute and less than or equal to 500 milliliters per minute, or greater than or equal to 1 microliter per minute and less than or equal to 4 liters per minute). Other ranges are also possible. In certain embodiments (e.g., in certain embodiments in which the fluidic connection(s) are used to actuate valves such as certain pneumatic valves), the flow rate through the fluidic connection can be 0 during at least a portion of the time the system is operated.

As noted above, according to certain embodiments, certain of the fluidic modules may comprise one or more unit operations. The unit operations may be configured to perform one or more steps of a chemical synthesis process, according to certain embodiments. In some embodiments, the first fluidic module comprises a unit operation, and the second fluidic module comprises a unit operation that is different from the unit operation of the first fluidic module. For example, in some embodiments, one fluidic module comprises a reactor and another fluidic module comprises a non-reactor unit operation (e.g., a separator or a mixer). In some embodiments, the first fluidic module comprises a unit operation, and the second fluidic module comprises a unit operation that is the same as the unit operation of the first fluidic module. For example, in some embodiments, both the first and second fluidic modules may comprise reactors (or separators, or mixers). In some embodiments, the first fluidic module comprises a unit operation, and the second fluidic module comprises a unit operation that is the same type of unit operation as is contained in the first fluidic module, but that is operated under different conditions than the unit operation of the first fluidic module. For example, in some embodiments, the first fluidic module may comprise a high-temperature reactor and the second fluidic module may comprise a low-temperature reactor.

As described herein, a unit operation generally refers to a device configured to perform a function that produces one or more output streams having a substantially different chemical composition than at least one of the streams input to the unit operation. Generally, an output stream has a substantially different chemical composition than an input stream when the relative abundance of at least one fluid component within the output stream is at least 5 wt % different (or, in some cases, at least 10 wt % different or at least 25 wt % different) than the relative abundance of that component in the input stream. The wt % difference of a particular fluid component can be determined by calculating the absolute value of the difference between the wt % of the fluid component within the output stream and the wt % of the fluid component within the input stream, and dividing the calculated absolute value by the wt % of the fluid component within the input stream. In other words, the wt % difference of a particular fluid component may be calculated as:

$$\Delta w = \frac{|w_o - w_i|}{w_i}$$

where $\Delta w$ is the wt % difference of the particular component, $w_o$ is the wt % of the fluid component within the output stream, and $w_i$ is the wt % of the fluid component within the input stream.

It should be understood that not all modules will necessarily include a unit operation. For example, in some embodiments, a fluidic module could include a bypass conduit, for example, to connect an output of an upstream fluidic module to a common outlet of the fluidic distributor. In some embodiments, the module containing the bypass conduit (which can also be referred to as a "bypass module") can be used to bypass a bay of a fluidic distributor that is not needed to complete the chemical synthesis process. For example, if the chemical synthesis process being performed includes only four steps, and the fluidic distributor comprises eight bays, four bypass modules may be coupled to the fluidic distributor such that fluid may be transported across the bays of the fluidic distributor that are not needed to perform the chemical synthesis process.

In some embodiments, at least one module comprises a unit operation that includes a reactor. In general, a reactor includes a volume (e.g., within a channel such as a microfluidic channel, a hollowed-out volume within an enclosure, etc.) configured to perform a chemical reaction. A reactor may be configured, in some cases, to take in a chemical reactant and to produce an intermediate of a target chemical product or to produce the target chemical product itself. Any suitable type of reactor may be used including, but not limited to, a plug flow reactor, a packed bed reactor (e.g., a catalytic packed bed reactor), a continuously stirred tank reactor, or any other suitable reactor type. In some embodiments, the reactor is packed with various materials such as glass or metal beads, sieves and/or resins. In certain embodiments, the reactor comprises a polymer tube (e.g. comprising perfluoroalkoxy (PFA), ethylene tetrafluoroethylene (ETFE), polyether ether ketone (PEEK), or other polymer materials) of defined structures and dimensions (e.g. the internal diameter), which can be coiled and embedded in a rigid housing (e.g. stainless steel, aluminum, silicon carbide or other rigid materials) to ensure (a) heat conduction and (b) high resistance to mechanical stresses under various operating temperatures and pressures.

In certain embodiments, one or more of the modules described herein can comprise a non-reactor unit operation. The non-reactor unit operation can be any type of unit operation that is not a reactor. For example, in some embodiments, the non-reactor unit operation is a separator. In certain embodiments, the non-reactor unit operation is a mixer.

In some embodiments, one or more of the fluidic modules described herein comprises a separator as a unit operation. The separator can be used to at least partially separate an intermediate of a target chemical product and/or a target chemical product from at least one other component (i.e., the "removed component"). For example, in some embodiments, the separator can be used to at least partially separate a target chemical product or an intermediate of the target chemical product from a solvent, a reaction by-product, and/or an impurity. The separator can be configured to remove at least a portion of at least one removed component from an input stream (in certain cases, without chemically reacting the removed component(s)), to produce a product stream that does not include the removed portion of the component. In some embodiments, the removed component can be retained within the separator, as might be observed, for example, in an absorptive separator. In some embodiments, the removed component can be transported out of the separator in a separate product stream. For example, in some cases, the separator may be configured such that a fluid stream comprising a target product entering the fluid separator will exit the separator in a first exit stream enriched in a target chemical product, and the removed component exits the separator in a second exit stream lean in the target chemical product. That is to say, the second exit stream may contain the target chemical product in an amount less than is contained in the feed stream. In some embodiments, the target chemical product comprises a desirable chemical product.

In some embodiments, the weight ratio of the chemical product present in the first exit stream from the separator and the chemical product present in the second exit stream from the separator is at least about 2:1, at least about 3:1, at least about 5:1, at least about 10:1, at least about 50:1, at least about 100:1, or at least about 1000:1. In certain embodiments, the second exit stream from the separator comprises substantially none of the target product.

Any of a variety of types of separators may be used in the systems and methods described herein. In some embodiments, the separator is a liquid-liquid separator. The liquid-liquid separator can be configured to take in a mixture of a first liquid and a second liquid, and produce a first product stream enriched in the first liquid relative to the mixture and a second product stream enriched in the second liquid relative to the mixture. In some embodiments, the liquid-liquid separator comprises a membrane (e.g., a membrane liquid-liquid separator). In some embodiments, the separator comprises chemically resistant polymeric materials (e.g., polyethylene, high density polyethylene (HDPE), PFA, ETFE, polytetrafluoroethylene (PTFE), ultra high molecular weight polyethylene (UHMWPE)), a rigid housing (e.g., stainless steel, aluminum) and the membrane. The membrane, in certain embodiments, may be semipermeable (i.e., the membrane permits the passage of one or more fluids but excludes the passage of a second fluid through the membrane). In the case of certain membrane-based separators, separation can be achieved by relying on the surface tension forces between the membrane, the first fluid in a mixture, and the second fluid in the mixture, as described, for example, in U.S. Patent Publication No. 2007/0144967 to Guenther et al. entitled "Fluid Separation" and U.S. Patent Publication No. 2009/0282978 to Jensen et al. entitled "Microfluidic Separators for Multiphase Fluid-Flow Based On Membranes", each of which is incorporated herein by reference in its entirety for all purposes. Separators are also described, for example, in International Patent Publication No. WO 2016/025803, published on Feb. 18, 2016, filed on Aug. 14, 2015 as International Application No. PCT/US2015/045220, and entitled "Systems and Methods for Synthesizing Chemical Products, Including Active Pharmaceutical Ingredients," which is incorporated herein by reference in its entirety for all purposes. In some embodiments, the separator is a reverse osmosis separator. In certain embodiments, the liquid-liquid separator is a liquid-liquid gravity separator (e.g., a sedimentation liquid-liquid separator). In certain embodiments, the separator can comprise a settling tank and/or a continuous centrifuge. In some embodiments, the separator comprises a diaphragm. In certain embodiments, the diaphragm comprises a chemically resistant polymeric material (e.g., polyethylene, HDPE, PFA, ETFE, PTFE). In some cases, the separator may comprise a self-tuning pressure regulator.

In some embodiments, the separator is a retention column. The retention column can be configured to retain (e.g., by adsorbing, absorbing, or otherwise taking up) at least one component of a feed stream transported into the retention column. In some embodiments, the retention column is a drying column. In certain embodiments, the retention column comprises an adsorption medium. Non-limiting examples of an adsorption medium include carbon-based material (e.g., charcoal). In some embodiments, the carbon-based material comprises activated charcoal. Other adsorption media are also possible and those of ordinary skill in the art would be able to select a suitable adsorption medium based on the component desired to be removed from the feed stream.

In some embodiments, at least one module comprises a mixer as a unit operation. Any suitable type of mixer can be used. In some embodiments, the mixer comprises a junction between two or more fluidically connected conduits. In some embodiments, the mixer can be heated (e.g., using a heat exchanger, including any of the types of heat exchangers described below, or others). The fluid can be mixed using static mixers, in some embodiments. In some embodiments, the mixer comprises a stir bar, an impeller, or the like to facilitate mixing of the first input stream and the second input stream. For example, in certain embodiments, the mixer comprises a Y junction, a T junction, an arrow head, and/or a cross junction. In some embodiments, the mixer comprises a micromixer and/or an embedded static macro-mixer. The mixer may be constructed from any suitable material (e.g., PEEK, PTFE, ETFE, stainless-steel, glass or any other suitable materials). In certain embodiments, the mixer consists of a stainless-steel tube packed with glass microbeads (e.g., with an average diameter of at least about 100 μm).

As mentioned above, certain of the systems described herein can be used to produce chemical products. Some embodiments comprise transporting a fluid (e.g., a chemical reagent, a solvent, or combinations thereof) through the one or more modules fluidically connected in series. Some embodiments comprise transporting a first fluid (e.g., a chemical reagent, a solvent, or combinations thereof) through a first module and a second module fluidically connected to the first module in series to form a first chemical product (which is output from the second module).

In some such embodiments, the fluid is transported through a unit operation within the module to perform a step of a multi-step chemical synthesis. Some such embodiments comprise producing an exit stream from a module that is compositionally distinguishable from a fluid transported through an inlet stream of the module. For example, in some cases, a chemical product may be produced in an exit stream of a module by performing a reaction within a unit operation within the module. In some embodiments, the exit stream may be produced by mixing and/or reacting a first fluid and a second fluid in a unit operation. In some cases, the exit stream from the module may be produced by separating, in a unit operation of the module, a first component (e.g., the desired chemical product) from a second component (e.g., a solvent and/or a byproduct) in a fluid.

In certain embodiments, a module comprises a reactor and is configured to produce a chemical product (or an intermediate thereof) from a chemical reactant. In some such embodiments, the module is configured to receive a chemical reactant via an inlet, house a chemical reaction involving the chemical reactant, and to output a target chemical product (or an intermediate thereof) via an exit conduit.

Generally, a variety of suitable chemical reagents can be used in the systems and methods described herein. The type of reagent that is employed in the system will generally depend on the chemical product one wishes to produce. In some embodiments, the chemical reactant can be a precursor of an active pharmaceutical ingredient.

In some embodiments, a first fluid comprising a first chemical reactant is transported through a first module, which can comprise reactor. Any suitable type of reactor can be used in the first module, including any of the chemical reactors described elsewhere herein. Certain embodiments further comprise transporting at least a portion of the first fluid (e.g., at least a portion of the fluid output from the first module) through a second module fluidically connected to the first module in series. In some embodiments, the second module comprises a separator. Any suitable type of separator can be used in the second module, including any of the separators described elsewhere herein. In some such embodiments, transporting the fluid through the separator of the second module results in at least partially removing a solvent. In some embodiments, transporting the fluid (e.g., the first fluid and/or the second fluid) through the separator comprises at least partially removing an impurity. In some embodiments, transporting the fluid through the separator of the second module comprises at least partially separating the fluid into a chemical product and a chemical byproduct.

In some embodiments, the system is configured to produce two or more chemical products. As described above, some embodiments comprise transporting a first fluid (e.g., a chemical reagent, a solvent, or combinations thereof) through a first module and a second module fluidically connected to the first module in series to form a first chemical product. In some embodiments, after the first chemical product has been formed, at least one (or both) of the first and second modules may be exchanged for a different module(s), and a second fluid comprising a second chemical reactant can be transported through the new module configuration to form a second chemical product.

In some cases, the system is configured to produce a first chemical product over a first period of time and then a second chemical product over a second period of time (which does not overlap the first period of time). In some embodiments, the first chemical product can be produced without producing the second chemical product during the first period of time. In some embodiments, the second chemical product can be produced without producing the first chemical product during the second period of time. For example, in some embodiments, the system can be operated such that the first chemical product is formed over a first period of time during which time the second chemical product is not formed, and the second chemical product is formed over a second period of time during which time the first chemical product is not formed. In some embodiments, third, fourth, fifth, or more chemical products can be formed during subsequent periods of time. For example, in some embodiments, the system can be operated such that the first chemical product is formed over a first period of time (during which time second and third chemical products are not formed), a second chemical product is formed over a second period of time (during which time the first and third chemical products are not formed), and a third chemical product is formed over a third period of time (during which time the first and second chemical products are not formed).

In some embodiments, the first chemical product is compositionally distinguishable from the second chemical product (and/or additional chemical products that are formed using the system). That is to say, the second chemical product can have, in some embodiments, a different chemical formula than the first chemical product. In some embodiments, the compositionally distinguishable first chemical product can be formed using a first combination of fluidic modules connected in series and the second chemical product can be formed using a second, different combination of fluidic modules connected in series. In certain embodiments, the system is configured to produce at least 1, at least 2 at least 3, at least 4, or at least 5 compositionally distinguishable chemical products.

Chemical reactants and/or chemical products can be transported into and/or out of the modules and/or unit operations in any suitable form. In certain embodiments, one or more of the chemical reactants and/or chemical products transported through the modules and/or unit operations is in the form of one or more solutes. In certain embodiments, the solute (e.g., the chemical reactant and/or the chemical product) may be present at a relatively high concentration. For example, in some embodiments, a chemical reactant and/or a chemical product may be present at a concentration of greater than or equal to about 1 M. In certain embodiments, a chemical reactant and/or a chemical product may be present in an amount close to the saturation limit (e.g., within 90%, within 95%, or within 99% of the saturation limit) of the chemical reactant and/or of the chemical product. As will be understood by those skilled in the art, the saturation limit generally refers to the concentration of a solute before the solute begins to precipitate from solution (i.e., form a solid phase of the solute). Several advantages of using fluids comprising a high concentration of solutes, as compared to batch processes where dilute solutes are dissolved and/or suspended in a carrier fluid, include increasing productivity and/or processed materials rates and reducing waste and formation of byproducts (e.g., solid precipitates).

In certain aspects, any of the methods for the production of a chemical product described herein can be continuous processes. In some embodiments, the method for the continuous production of the chemical product comprises transporting an input fluid comprising a chemical reactant through a reactor. In certain embodiments, a chemical reactant is reacted, within a reactor, to produce the chemical product within a reactor output stream. In certain embodiments, the reactor output stream is transported to a separator fluidically connected to the reactor in series. Some embodiments comprise separating (e.g., in the separator) at least a portion of the chemical product from at least a portion of another component of the reactor output stream (e.g., a solvent, etc.) to produce a separator output stream having a higher concentration of the chemical product than the reactor output stream. Additional process steps can also be performed, according to certain embodiments.

One of ordinary skill in the art would understand the difference between a continuous process and a non-continuous process (e.g., a batch process). Continuous processes generally refer to systems in which precursor enters the system, product exits the system, and the transformation the system is designed to achieve all occur during at least one overlapping period of time. As one example, in a continuous reactor system, reaction precursor enters the reactor and reaction product exits the reactor during at least a portion of the time that the chemical reaction within the reactor is taking place. As another example, in a continuous separator, precursor enters the separator and separated product exits the separator during at least a portion of the time that separation within the separator is taking place. As yet another example, in a continuous mixer, precursors enter the mixer and mixed product exits the mixer during at least a portion of the time that mixing within the mixer is taking place.

Continuous systems that include two or more unit operations (e.g., reactors, separators, and the like) are generally arranged such that transport between the unit operations within the continuous system occurs during at least a portion of the time during which the unit operations are performing their intended function (e.g., reaction for a reactor, separation for a separator, mixing for a mixer, etc.).

In some embodiments, a chemical product is produced continuously from a precursor of the chemical product when precursor of the chemical product is being transported into the continuous system and chemical product is being transported out of the continuous system during at least portions of the times the components of the continuous system are being operated to produce the finished chemical product.

In certain embodiments, each unit operation within the continuous process (e.g., reactor, separator, mixer, etc.) is operated in a continuous fashion such that the products of each unit operation and/or formulation unit are substantially continuously transported from one unit operation to the other until the final chemical product is produced. In certain embodiments, at least some of the target chemical product (e.g., at least 50 wt %, at least 75 wt %, at least 90 wt %, at least 95 wt %, or substantially all of the target chemical product) produced by each upstream unit operation within the continuous process is transported to the corresponding downstream unit operation within the continuous process within a period of about 12 hours, about 6 hours, about 1 hour, about 30 minutes, about 10 minutes, about 1 minute, or about 10 seconds after it exits the upstream unit operation.

As described above, certain embodiments of the inventive systems include one or more processors, for example, associated with a module, a fluidic distributor, or another component of the system. The processor may be part of, according to certain embodiments, a computer implemented control system. The computer implemented control system can be used to operate various components of the fluidic system. In general, any calculation methods, steps, simulations, algorithms, systems, and system elements described herein may be implemented and/or controlled using one or more computer implemented control system(s), such as the various embodiments of computer implemented systems described below. The methods, steps, control systems, and control system elements described herein are not limited in their implementation to any specific computer system described herein, as many other different machines may be used.

The computer implemented control system can be part of or coupled in operative association with one or more modules and/or the fluidic distributor and/or other system components that might be automated, and, in some embodiments, is configured and/or programmed to control and adjust operational parameters, as well as analyze and calculate values, for example any of the module conditions described above. In some embodiments, the computer implemented control system(s) can send and receive reference signals to set and/or control operating parameters of system apparatus. In other embodiments, the computer implemented system(s) can be separate from and/or remotely located with respect to the other system components and may be configured to receive data from one or more systems of the invention via indirect and/or portable means, such as via portable electronic data storage devices, such as magnetic disks, or via communication over a computer network, such as the Internet or a local intranet.

The computer implemented control system(s) may include several known components and circuitry, including a processor, a memory system, input and output devices and interfaces (e.g., an interconnection mechanism), as well as other components, such as transport circuitry (e.g., one or more busses), a video and audio data input/output (I/O) subsystem, special-purpose hardware, as well as other components and circuitry, as described below in more detail. Further, the computer system(s) may be a multi-processor computer system or may include multiple computers connected over a computer network.

The computer implemented control system(s) may include a processor, for example, a commercially available processor such as one of the series x86, Celeron and Pentium processors, available from Intel, similar devices from AMD and Cyrix, the 680X0 series microprocessors available from Motorola, and the PowerPC microprocessor from IBM. Many other processors are available, and the computer system is not limited to a particular processor.

A processor typically executes a program called an operating system, of which WindowsNT, Windows95 or 98, Windows XP, Windows Vista, Windows 7, Windows 8, Windows 8.1, Windows 10, UNIX, Linux, DOS, VMS, MacOS and OS8 are examples, which controls the execution of other computer programs and provides scheduling, debugging, input/output control, accounting, compilation, storage assignment, data management and memory management, communication control and related services. The processor and operating system together define a computer platform for which application programs in high-level programming languages are written. The computer implemented control system is not limited to a particular computer platform.

The computer implemented control system(s) may include a memory system, which typically includes a computer readable and writeable non-volatile recording medium, of which a magnetic disk, optical disk, a flash memory and tape are examples. Such a recording medium may be removable, for example, a floppy disk, read/write CD or memory stick, or may be permanent, for example, a hard drive.

Such a recording medium stores signals, typically in binary form (i.e., a form interpreted as a sequence of one and zeros). A disk (e.g., magnetic or optical) has a number of tracks, on which such signals may be stored, typically in binary form, i.e., a form interpreted as a sequence of ones and zeros. Such signals may define a software program, e.g., an application program, to be executed by the microprocessor, or information to be processed by the application program.

The memory system of the computer implemented control system(s) also may include an integrated circuit memory element, which typically is a volatile, random access memory such as a dynamic random access memory (DRAM) or static memory (SRAM). Typically, in operation, the processor causes programs and data to be read from the non-volatile recording medium into the integrated circuit memory element, which typically allows for faster access to the program instructions and data by the processor than does the non-volatile recording medium.

The processor generally manipulates the data within the integrated circuit memory element in accordance with the program instructions and then copies the manipulated data to the non-volatile recording medium after processing is completed. A variety of mechanisms are known for managing data movement between the non-volatile recording medium and the integrated circuit memory element, and the computer implemented control system(s) that implements the methods, steps, systems control and system elements control described above is not limited thereto. The computer implemented control system(s) is not limited to a particular memory system.

At least part of such a memory system described above may be used to store one or more data structures (e.g., look-up tables) or equations such as calibration curve equations. For example, at least part of the non-volatile recording medium may store at least part of a database that includes one or more of such data structures. Such a database may be any of a variety of types of databases, for example, a file system including one or more flat-file data structures where data is organized into data units separated by delimiters, a relational database where data is organized into data units stored in tables, an object-oriented database where data is organized into data units stored as objects, another type of database, or any combination thereof.

The computer implemented control system(s) may include one or more output devices. Example output devices include a cathode ray tube (CRT) display, liquid crystal displays (LCD) and other video output devices, printers, communication devices such as a modem or network interface, storage devices such as disk or tape, and audio output devices such as a speaker.

The computer implemented control system(s) also may include one or more input devices. Example input devices include a keyboard, keypad, track ball, mouse, pen and tablet, communication devices such as described above, and data input devices such as audio and video capture devices and sensors. The computer implemented control system(s) is not limited to the particular input or output devices described herein.

It should be appreciated that one or more of any type of computer implemented control system may be used to implement various embodiments described herein. Aspects of the invention may be implemented in software, hardware or firmware, or any combination thereof. The computer implemented control system(s) may include specially programmed, special purpose hardware, for example, an application-specific integrated circuit (ASIC). Such special-purpose hardware may be configured to implement one or more of the methods, steps, simulations, algorithms, systems control, and system elements control described above as part of the computer implemented control system(s) described above or as an independent component.

The computer implemented control system(s) and components thereof may be programmable using any of a variety of one or more suitable computer programming languages. Such languages may include procedural programming languages, for example, LabView, C, Pascal, Fortran and BASIC, object-oriented languages, for example, C++, Java and Eiffel and other languages, such as a scripting language or even assembly language.

The methods, steps, simulations, algorithms, systems control, and system elements control may be implemented using any of a variety of suitable programming languages, including procedural programming languages, object-oriented programming languages, other languages and combinations thereof, which may be executed by such a computer system. Such methods, steps, simulations, algorithms, systems control, and system elements control can be implemented as separate modules of a computer program, or can be implemented individually as separate computer programs. Such modules and programs can be executed on separate computers.

Such methods, steps, simulations, algorithms, systems control, and system elements control, either individually or in combination, may be implemented as a computer program product tangibly embodied as computer-readable signals on a computer-readable medium, for example, a non-volatile recording medium, an integrated circuit memory element, or a combination thereof. For each such method, step, simulation, algorithm, system control, or system element control, such a computer program product may comprise computer-readable signals tangibly embodied on the computer-readable medium that define instructions, for example, as part of one or more programs, that, as a result of being executed by a computer, instruct the computer to perform the method, step, simulation, algorithm, system control, or system element control.

According to certain embodiments, the system comprises an universal bay that allows snap-on connection with an unit operation. Non-limiting examples of modules include: 1) heated reactors, 2) cooled reactors, 3) liquid-liquid separators, 4) gas-liquid separators, 5) photo reactors, 6) packed bed reactors, and 7) bypass loops. In certain embodiments, a bay may comprise electrical and/or fluidic connections capable of coupling with any module (e.g., a module comprising a unit operation, or a module that does not comprise a unit operation). In certain embodiments, coupling connections may be universal connections.

A fluidic system may, according to certain embodiments, have multiple bays so that process steps can be cascaded to achieve a multistep process. Since each bay may, according to certain embodiments, be capable of coupling with any module, the combinations of process configurations can be very large and fluids flowing through the fluidic system may encounter modules in any order. A fluidic system comprising multiple bays may, according to certain embodiments, be capable of carrying out a number of process steps less than or equal to the total number of bays.

In some embodiments, it may be possible to position an intermediate module between a bay and a different module. According to some embodiments, an intermediate module may provide additional functionality. Non-limiting examples of intermediate bays include: sampling ports, pH sensors, and flow cells for spectroscopy.

Modules may be designed, according to certain embodiments, to comprise additional features that enable safe use and ease of use. For example, in certain embodiments, modules may comprise flow paths that are at least partially optically accessible. In some embodiments, one or more modules may be thermally insulated by, for example, thick glass and/or silicon layers. Fluidic modules may also be adapted, according to certain embodiments, to handle any suitable volume of fluid.

Figure 6A:
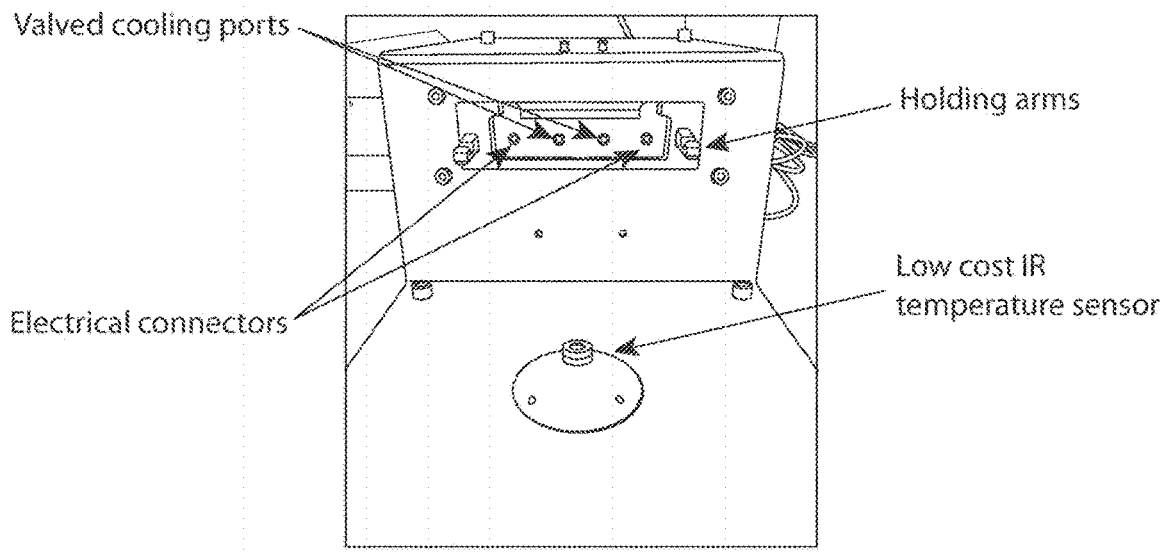
FIGS. 6A and 6B show, according to some embodiments, photographs of exemplary modules and bays.
Figure 6B:
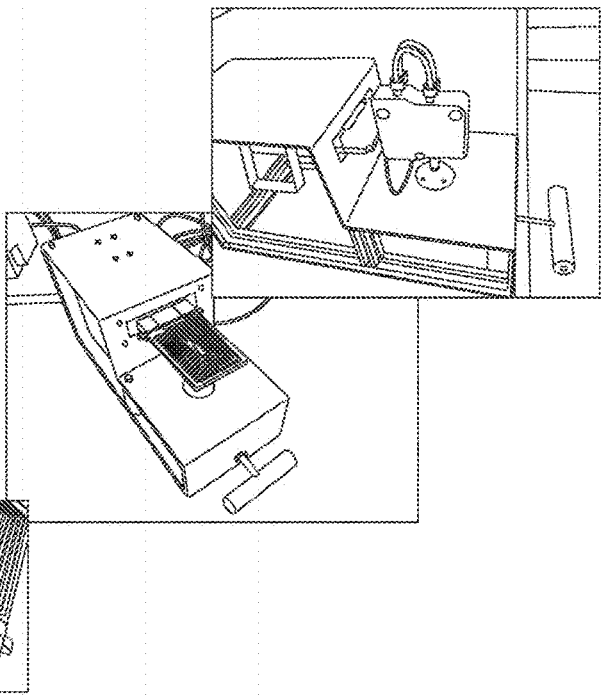

Photographs of an exemplary system are shown in FIGS. 6A and 6B.

Figure 7:
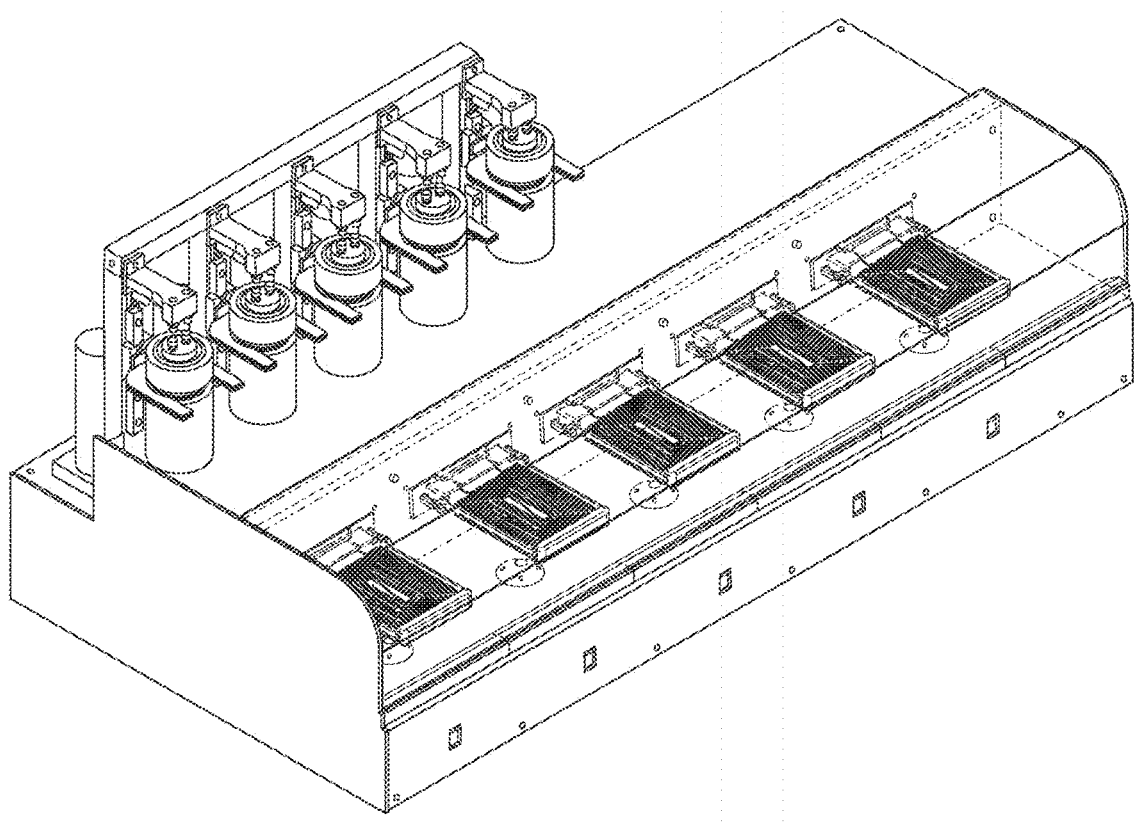
FIG. 7 shows, according to some embodiments, a schematic depiction of a fluidic distributor.

FIG. 7 depicts a rendering of a system with 5 bays in accordance with certain embodiments. In this exemplary rendering, each bay has a reactor snapped on. In certain embodiments, a reactor as depicted in FIG. 7 may comprise pumps and/or buttons for motorized reactor loading. In some embodiments, such a reactor may allow for easy loading of reagents.

In certain embodiments, modules comprising reactors may comprise a metal plate comprising a groove that houses tubing (e.g., perfluorinated polymer tubing). According to some embodiments, such tubing may be made into preforms which may provide ease of operation. The tubing may be manually laid into the groove in certain embodiments. In accordance with certain embodiments, the tubing may be disposable and/or low cost.

According to certain embodiments, the preforms may incorporate structures such as static mixers and/or features to improve mass and/or heat transfer. In some embodiments, a user may access these added features by changing the preform insert without needing to purchase an additional reactor.

In some embodiments, the fluidic systems described herein may provide a reactor with highly pure surfaces. According to certain embodiments, a module comprising a reactor with highly pure surfaces may find application in the pharmaceutical industry. Reactors may further comprise an internal lining. In some embodiments, an internal lining may be replaced as needed.

In some embodiments, a fluidic system may further comprise additional components. Non-limiting examples of such components include computers, pumps, reaction and separation hardware, analytics, sensors, and/or waste collection components. In certain embodiments, computers may further comprise user interfaces, software capable of optimizing reactions, and/or software capable of system control and/or monitoring. According to some embodiments, pumps may comprise modified and/or unmodified milliGAT pumps. In certain embodiments, pumps may have unlimited capacity and/or may be capable of executing flow rates ranging over six orders of magnitude. In some embodiments, reaction and separation hardware may comprise one or more of the following: reagents, reactors, separators, heating and/or cooling systems such as electrical heaters, and back pressure control systems. In certain embodiments, analytics may comprise one or more of sampling ports for reaction monitoring and/or optimization, and in-line IR, MS, and/or UV monitoring capabilities. According to certain embodiments, sensors may comprise pressure and/or temperature monitoring sensors such as IR-based temperature sensors. Temperature monitoring sensors may be capable of performing noncontact temperature readout in certain embodiments. In some embodiments, waste collection components may comprise separate organic and aqueous receptacles.

In some embodiments, a fluidic system may be able to generate, store, transmit, and/or receive data from another source. Such fluidic systems may be used to share process parameters and characterization data for reactions they have performed in certain embodiments. In certain embodiments, a fluidic system may receive data comprising instructions for executing a reaction such as reaction conditions and then the fluidic system may execute the reaction. According to some embodiments, data can be gathered as reactions are performed that may be later used by either an operator or the fluidic system to optimize and/or scale up reactions. In some embodiments, the fluidic system may be able to provide data to an open source database.

An automated, easy to use fluidic system with embedded software control may allow chemists, engineers, and/or other users to use software to aid reaction design and/or execution. For example, such a fluidic system may allow for one or more of the following scenarios. A recipe run by a first user on a first instrument at a first location may be executed by a second user on a second instrument at a second location to produce substantially similar results, according to some embodiments. This can allow users, according to certain embodiments, to repeat results achieved by others (e.g., as discussed in printed academic publications) relatively quickly (e.g., within minutes instead of the weeks that might be required with traditional lab equipment).

In some embodiments, an analogue of the iTunes store could be replicated in the chemistry world. For example, a user may be able to purchase recipes to make specific molecules of interest on demand. In some embodiments, a user may be able to purchase a software application capable of running a desired optimization and/or analysis. According to certain embodiments, a user can purchase a software application capable of performing a desired function such as utilizing a piece of equipment and/or generating a calibration curve for one or more reagents and/or a user may be able to easily and quickly repeat the results of a published paper by following a recipe provided therein (such as in the supplemental information, for example).

In some embodiments, an automated fluidic system may comprise software capable of performing different optimization algorithms such as simplex, conjugate gradient, and/or interior point methods. According to certain embodiments, automation may function in a manner similar to apps for mobile devices (e.g., iPhones) where chemists can download recipes/apps for execution in the fluidic system. Such apps may be purchased from an equivalent of the iTunes store, in certain embodiments. In some embodiments, an app store for chemistry would allow chemists to synthesize target molecules on demand without having to worry about concerns such as shelf life, shipping delays, etc. Such applications may enable the fluidic systems described herein to serve as all-purpose, software driven technologies.

According to some embodiments, an automated fluidic system may enable synthesis in a manner analogous to the way that 3D printers enable manufacturing. Such an embodiment may open the door to 3D printing of molecules.

In certain embodiments, an automated fluidic system may allow the user to treat the system as a black box. Automation of a fluidic system may be accomplished by a variety of suitable automation systems. In certain embodiments, automation may be accomplished by the use of a software program such as Labview.

Figure 8A:
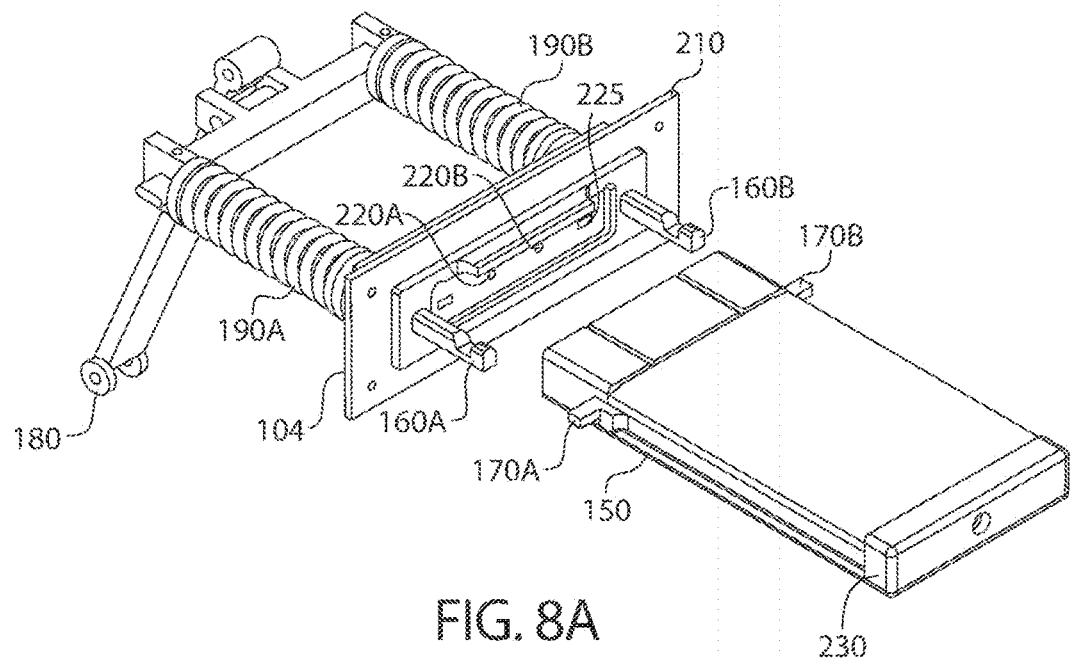
FIGS. 8A-18B show, according to some embodiments, schematic depictions of modules and bays.

FIG. 8A illustrates a set of embodiments in which a fluidic bay 104 is capable of being mechanically coupled to fluidic module 150 using arms 160A and 160B capable of connecting with and/or grabbing onto hooks 170A and 170B. In some embodiments, hooks 170A and 170B may have 100 pounds of force applied during operation. Fluidic bay 104 further comprises lever arm 180, springs 190A and 190B, face plate 210, coolant inlet and outlet ports 220A and 220B, and electrical connector 225. In some embodiments, lever arm 180 allows the force on the face plate to be controlled. Lever arm 180 may further comprise a linear actuator connected to a switch in certain embodiments.

According to certain embodiments, springs 190A and 190B are capable of applying force to the plate and the lever arm. In some embodiments, spring 190 may have a spring constant of at least 160 lb/in, and/or may be capably of applying up to 200 pounds of force at full compression. Coolant inlet and outlet ports 220A and 220B may substantially overlap with a coolant inlet and outlet ports on fluidic module 150 (not shown) in some embodiments. In certain embodiments, coolant inlet and outlet ports 220A and 220B may comprise push valves, optionally of the same type as push valves on face plate 210. In some embodiments, such a design may prevent fluid leakage. According to certain embodiments, the coolant inlets and outlets may be connected to each bay in parallel, and/or may all pass through a central cooling unit and/or pump.

In some embodiments, face plate 210 may allow bay 104 to interface with module 150. In certain embodiments, the face plate may comprise plastic; optionally, the face plates may comprise a plastic compatible with a wide variety of chemicals, such as polyether ether ketone (PEEK). According to some embodiments, face plate 210 may be secured onto the fluidic system such that only a raised portion of face plate 210 may be visible.

Electrical connector 225 may, in some embodiments, align with an electrical contact on fluidic module 150 (not shown). In some embodiments, electrical connector 225 may be a push-type connector that does not substantially protrude from the body of fluidic bay 104. In some embodiments, such a design may prevent accidental contact between the electrical connectors and other system components.

Fluidic module 150 further comprises endcap 230, which may act as a cover and/or hold parts of fluidic module 150 in place. In some embodiments, endcap 230 comprises a plastic, such as PEI.

Figure 8B:
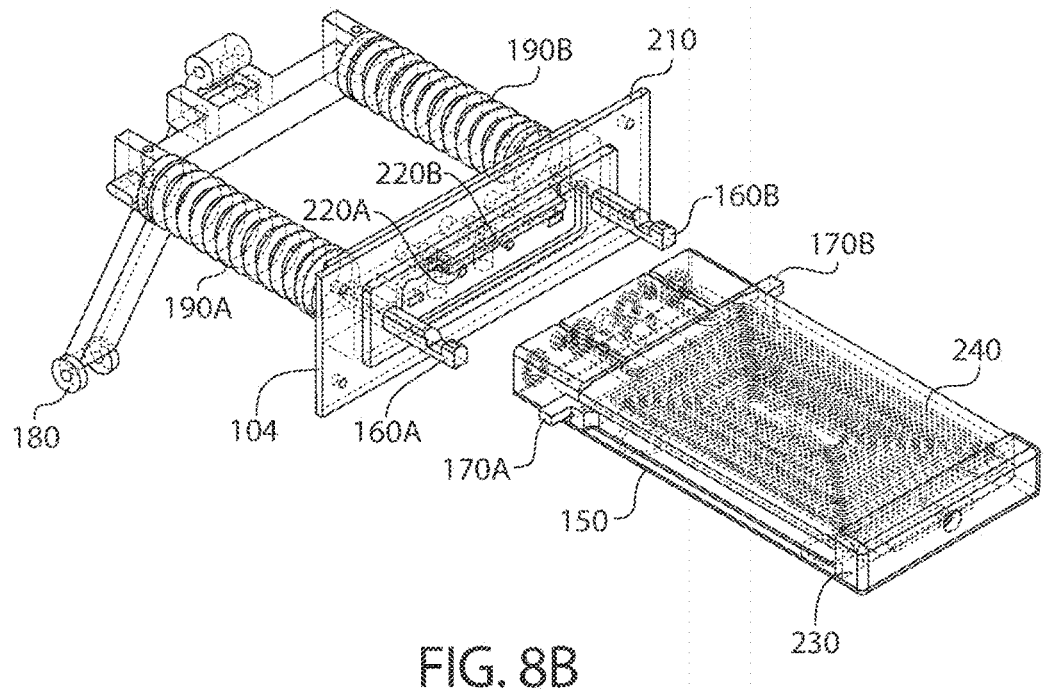

FIG. 8B displays, according to some embodiments, a fluidic bay 104 and a fluidic module 150 as in FIG. 8A, further comprising fluidic channel 240. In certain embodiments, fluidic channel 240 may comprise tubing. In some embodiments, the tubing may have a length of 1 meter long and/or a total volume of 1 mL.

Figure 9A:
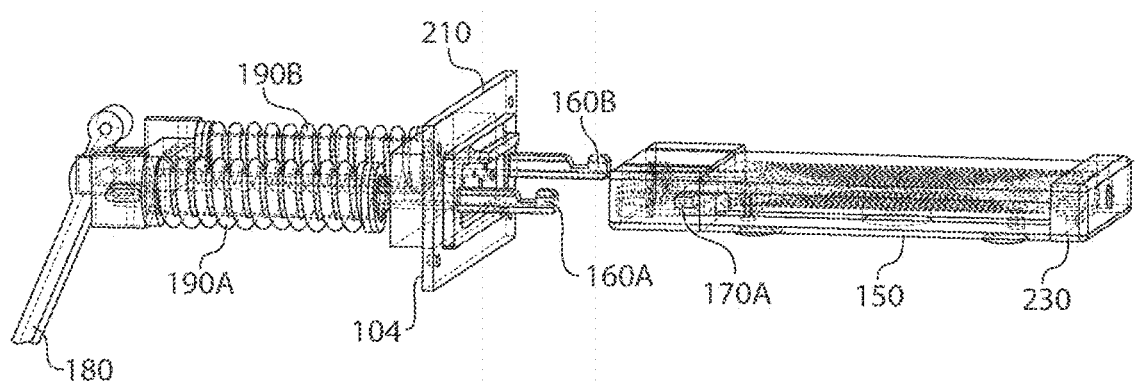
Figure 9B:
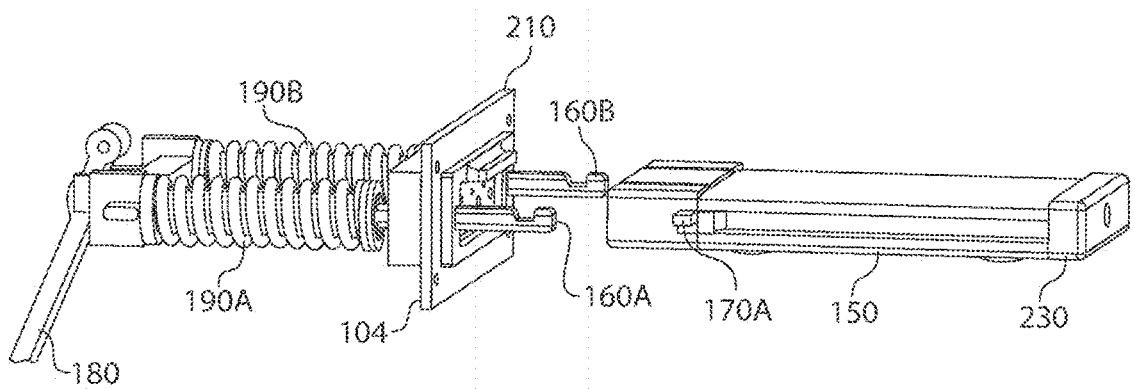

FIG. 9A and FIG. 9B show side views of fluidic bay 104 and fluidic module 150, in accordance with certain embodiments.

Figure 9C:
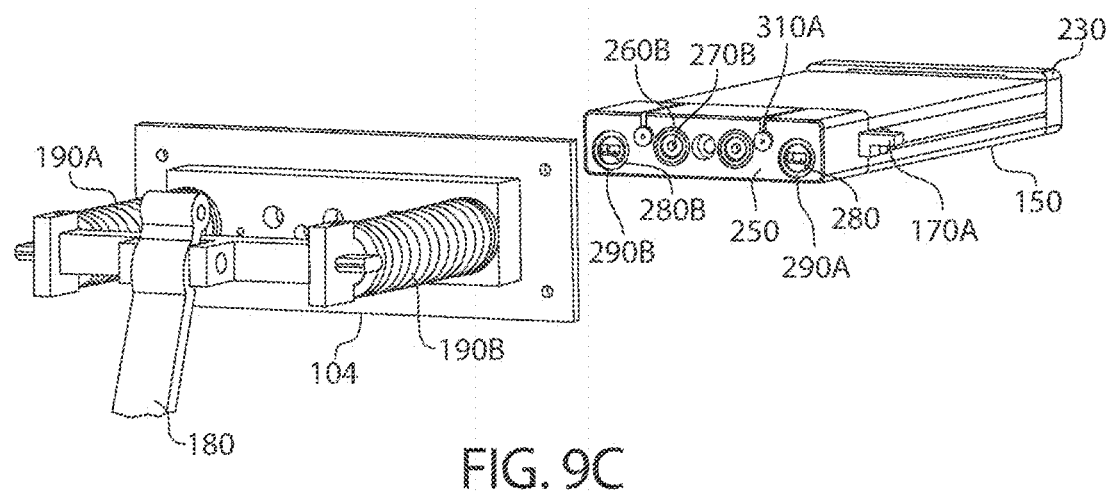
Figure 10A:
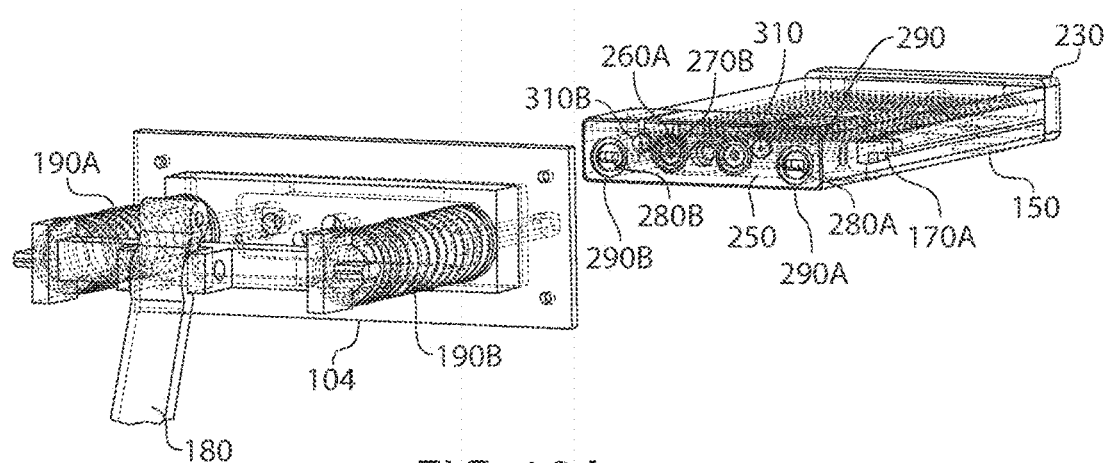

FIG. 9C and FIG. 10A illustrate a set of embodiments comprising fluidic bay 104 and fluidic module 150. Fluidic module 150 comprises end cap 230, face plate 250, O-rings 260A and 260B, coolant valves 270A and 270B, electrical connectors 280A and 280B, O-rings 290A and 290B, and ferrules 310A and 310B.

In some embodiments, end cap 230 may act as a cover to hold one or more parts in place. According to certain embodiments, the end cap may comprise a plastic, such as PEI plastic. In some embodiments, an end cap may secure a glass layer to a thermal plate.

In certain embodiments, face plate 250 may interface with fluidic bay 104, hold various connectors, and/or provide rigidity to the reactor. Face plate 250 may be made from a plastic, such as PEI, in some embodiments.

According to certain embodiments, O-rings 260A and 260B may surround coolant valves 270A and 270B and may prevent leakage during operation of the fluidic system. In some embodiments, coolant valves 270A and 270B may interface with coolant inlets and outlets of fluidic bay 104 (not shown) and/or may act as inlets and/or outlets for coolant flow. Coolant valves 270A and 270B may be a cut down push valve in certain embodiments; a cut down push valve may provide a seal when not under pressure but allow for flow when under pressure (e.g., when a module is placed into a bay).

In accordance with some embodiments, electrical connectors 280A and 280B may be used to power devices on fluidic module 150. In certain embodiments, some modules, such as cold reactors, may lack electrical connectors and/or have electrical connectors that are not used. Such a design may reduce costs in certain embodiments. In some embodiments, O-rings 290A and 290B may prevent electrical connector 280 from exposure to fluid.

According to some embodiments, end ferrules 310A and 310B may be used to form a tight seal between fluidic module 150 and fluidic bay 104. In certain embodiments, the ferrules may comprise tubing with an OD of ⅟16" and/or an ID of ⅟32".

Figure 10B:
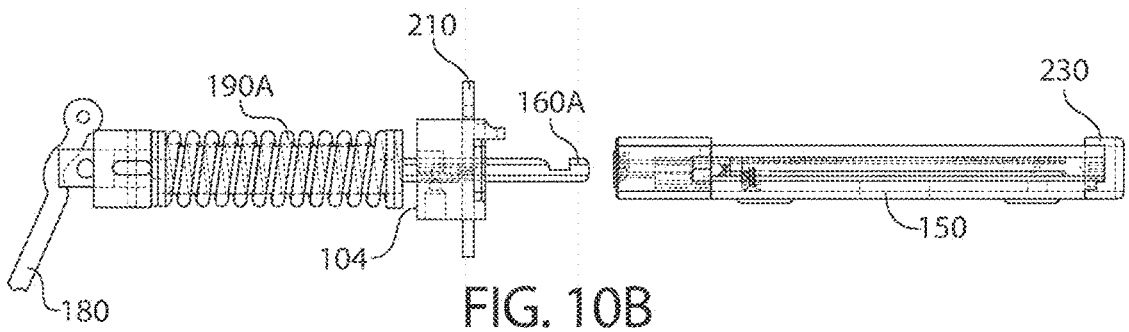
Figure 10C:
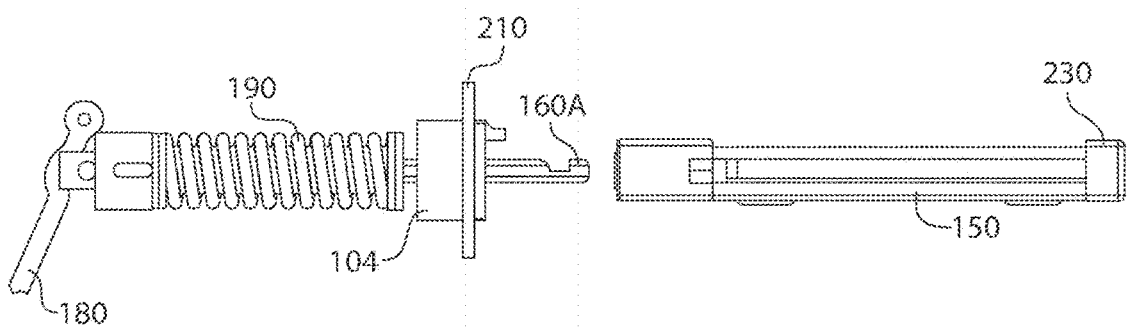

FIG. 10B and FIG. 10C display side views of fluidic bay 104 and fluidic module 150 in accordance with certain embodiments.

Figure 11A:
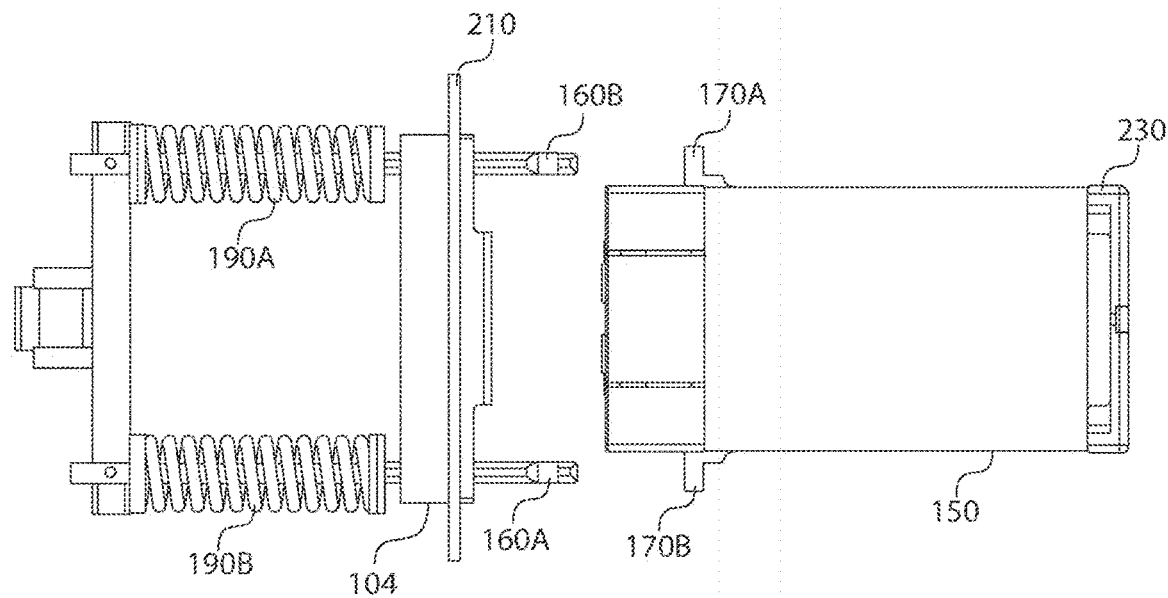
Figure 11B:
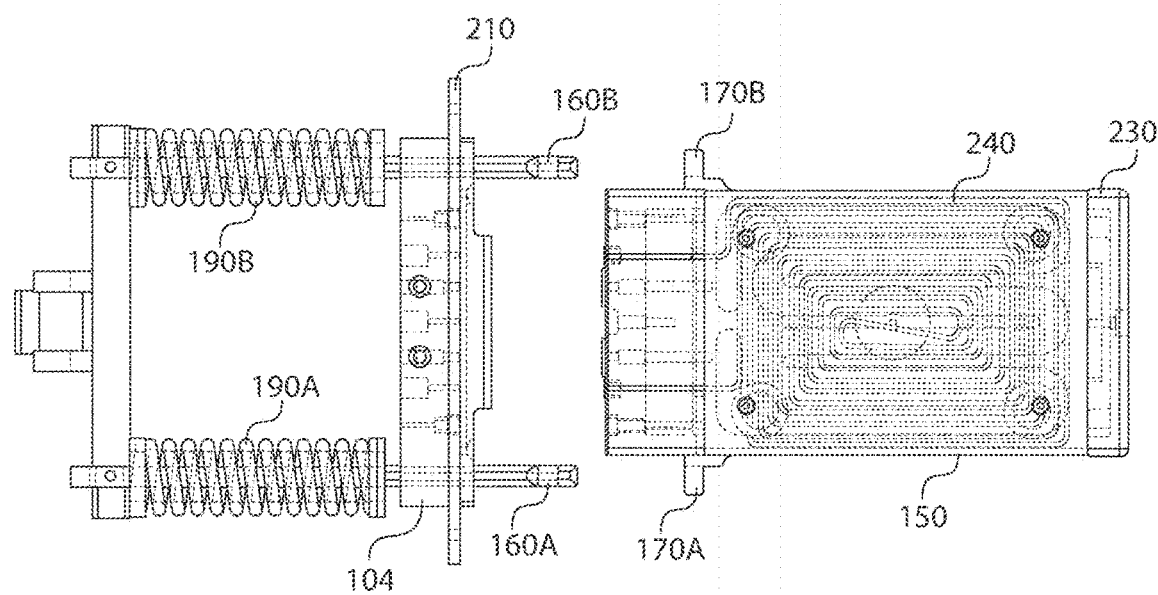

FIG. 11A and FIG. 11B illustrate top views of fluidic bay 104 and fluidic module 150 according to some embodiments.

Figure 12A:
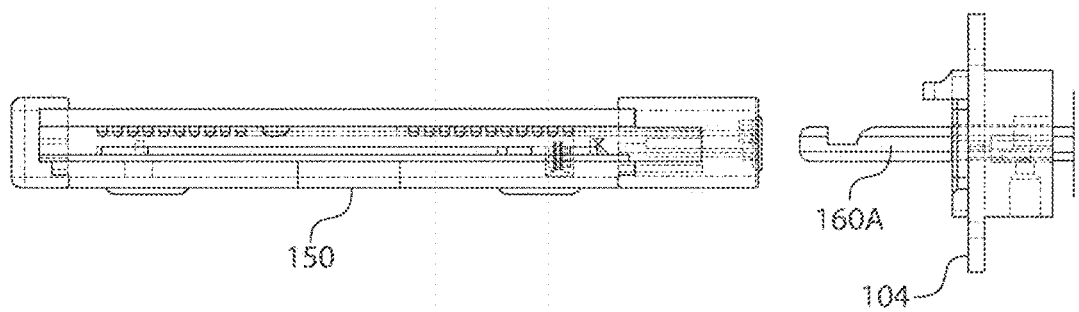
Figure 12B:
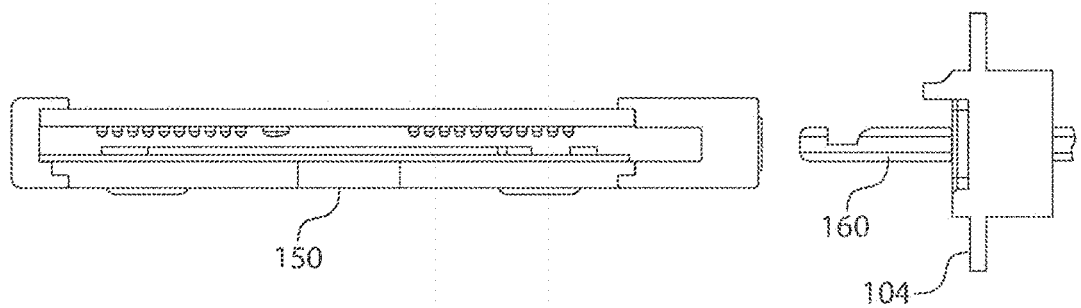

FIG. 12A and FIG. 12B illustrate, in accordance with certain embodiments, side views of fluidic bay 104 and fluidic module 150.

Figure 12C:
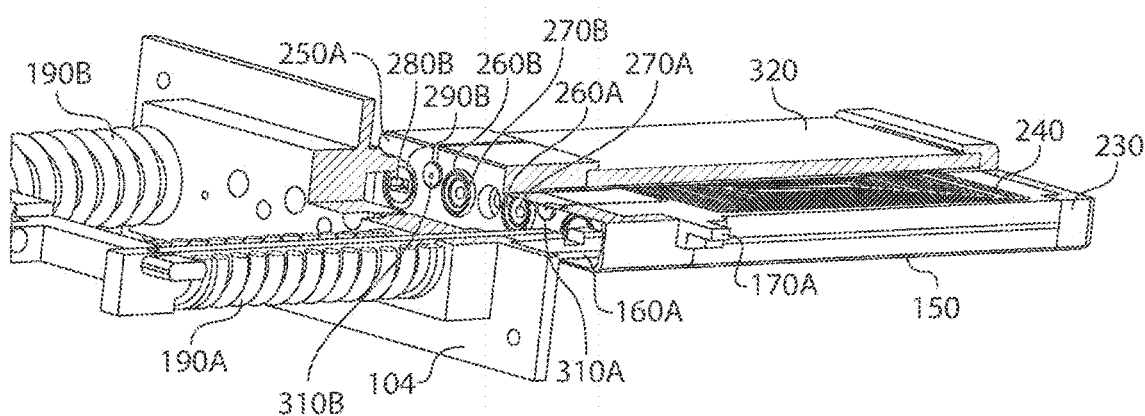
Figure 13A:
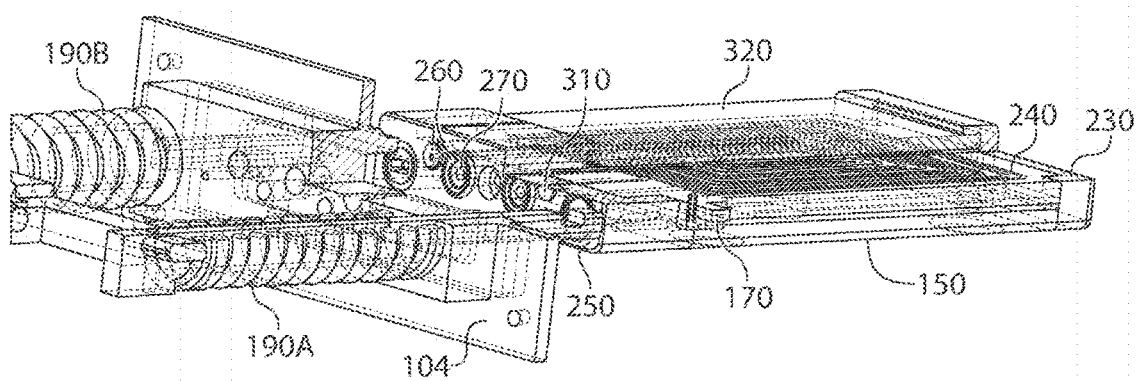

FIG. 12C and FIG. 13A display perspective views of fluidic bay 104 and fluidic module 150, according to certain embodiments. Fluidic module 150 further comprises cover 320, which has been partially removed to expose fluidic channel 240.

Figure 13B:
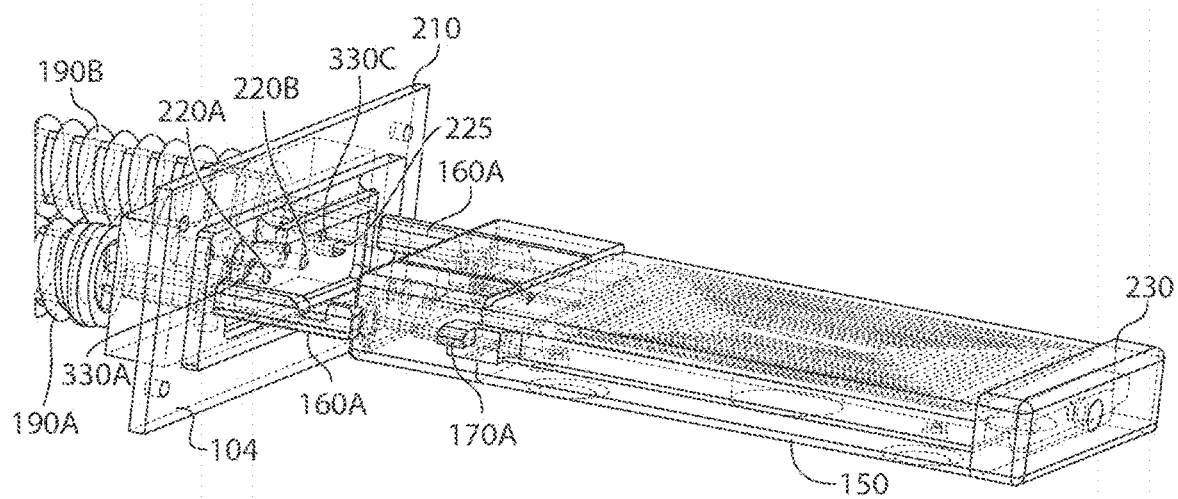
Figure 13C:
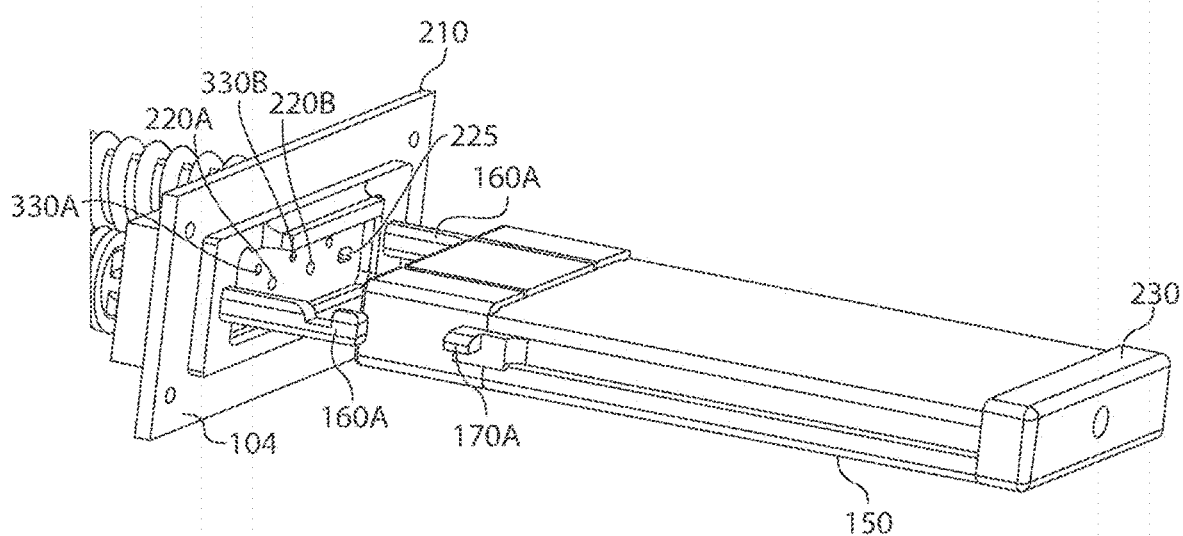

FIG. 13B and FIG. 13C display perspective view of fluidic bay 104 and fluidic module 150, in accordance with certain embodiments. Fluidic bay 104 further comprises inlet and outlet ports 330A, 330B and 330C. In some embodiments, inlet and outlet ports 330A, 330B, and 330C may be aligned with one or more fluidic channels on fluidic module 150. In certain embodiments, inlet and outlet port 330B may be a waste outlet port, optionally for use with a module comprising a separator.

Figure 14A:
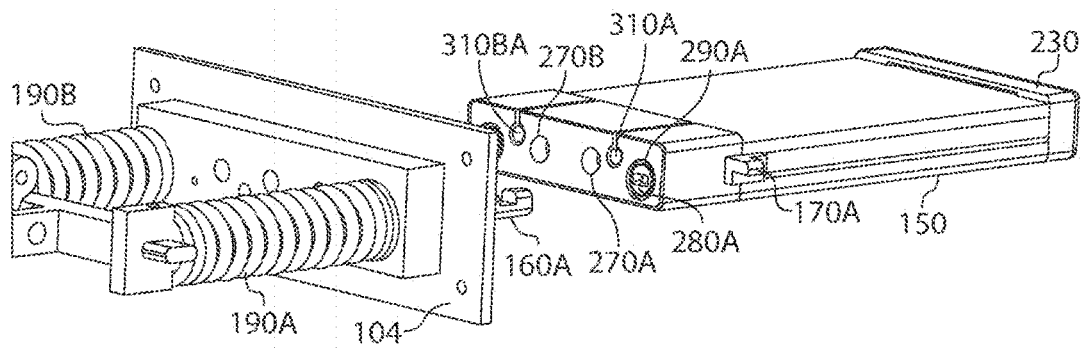
Figure 14B:
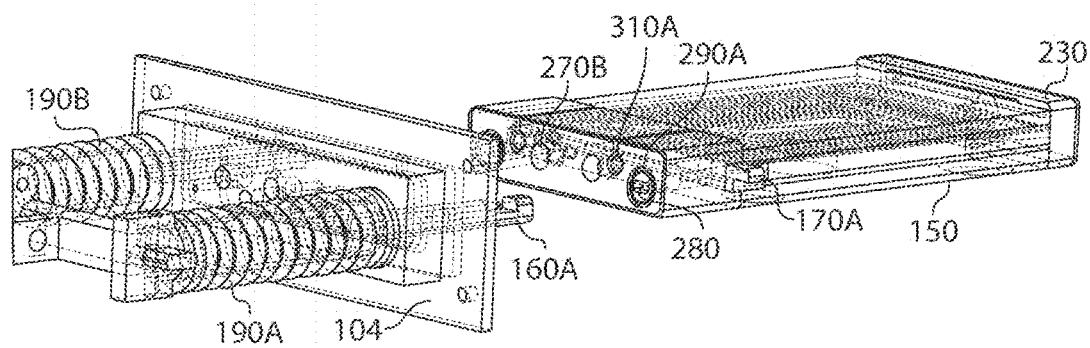

FIG. 14A and FIG. 14B illustrate, in accordance with certain embodiments, perspective views of fluid bay 104 and fluidic module 150.

Figure 14C:
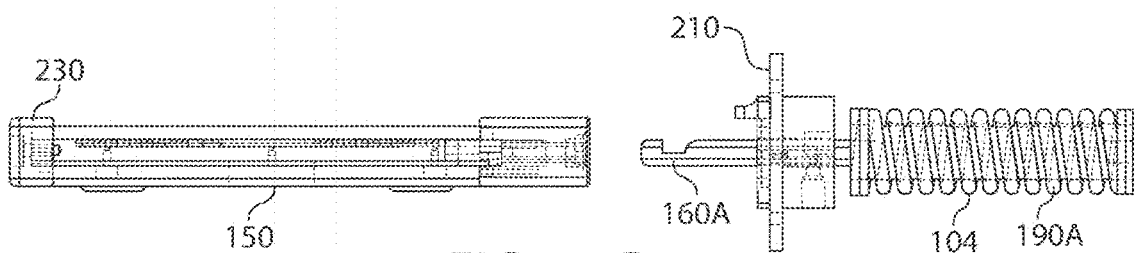
Figure 14D:
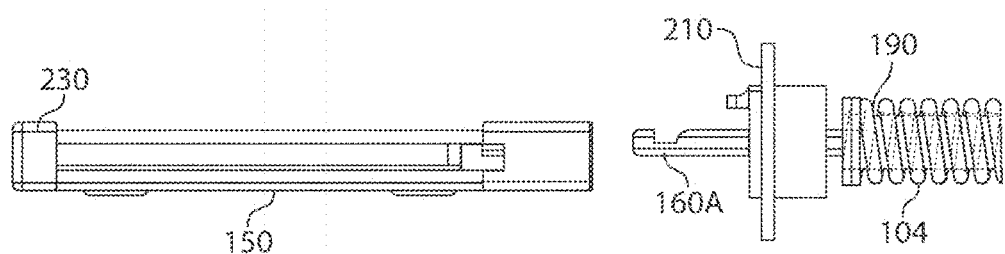

FIG. 14C and FIG. 14D depict side views of fluid bay 104 and fluidic module 150, in accordance with some embodiments.

Figure 15A:
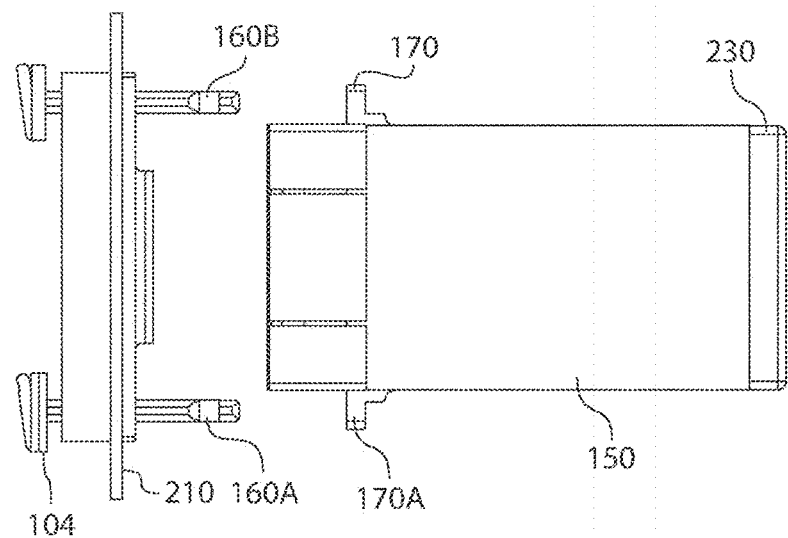
Figure 15B:
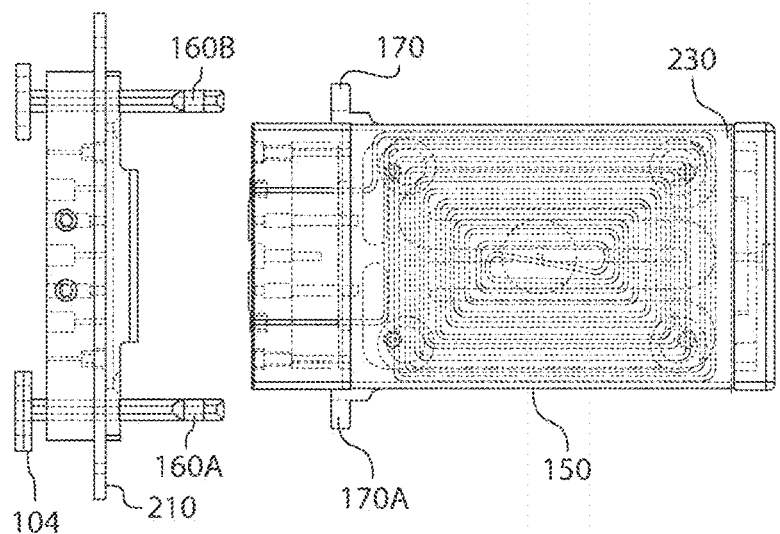

FIG. 15A and FIG. 15B illustrate top views of fluidic bay 104 and fluidic module 150 according to some embodiments.

Figure 16A:
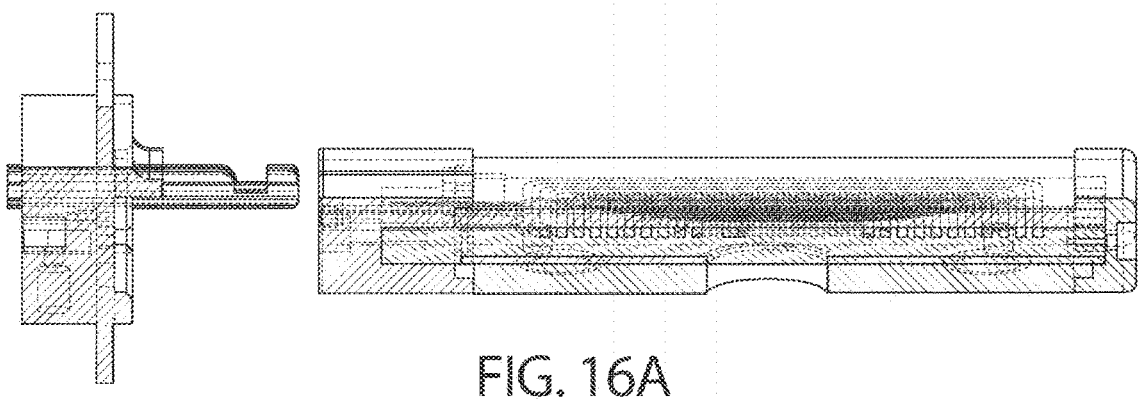
Figure 16B:
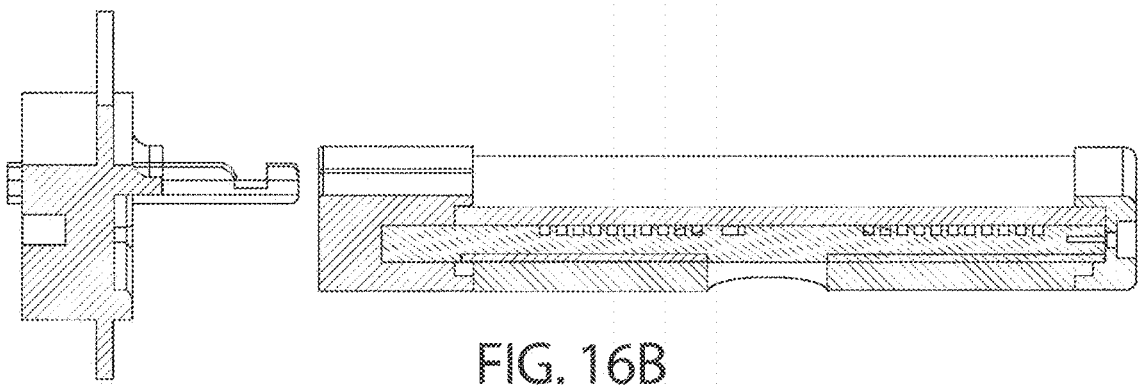

FIG. 16A and FIG. 16B show side views of fluidic bay 104 and fluidic module 150, in accordance with certain embodiments.

Figure 16C:
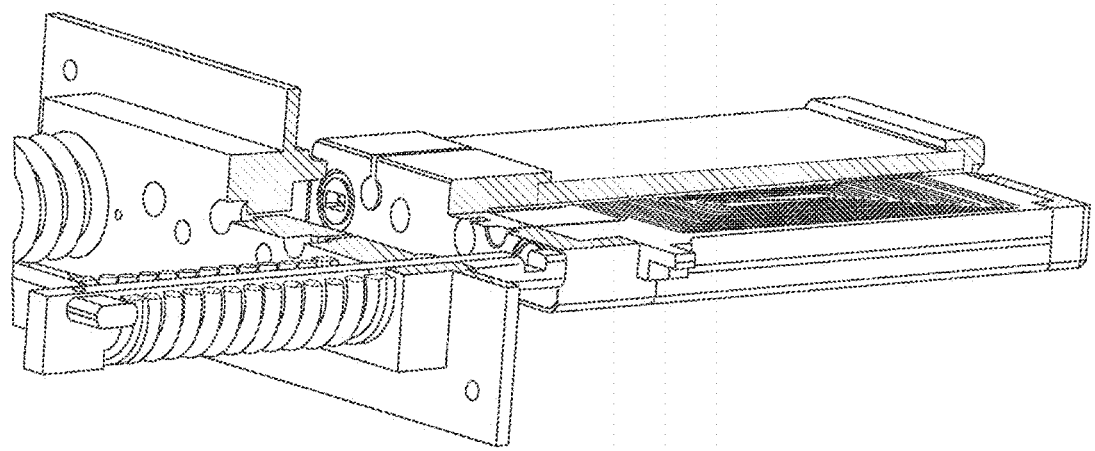
Figure 17A:
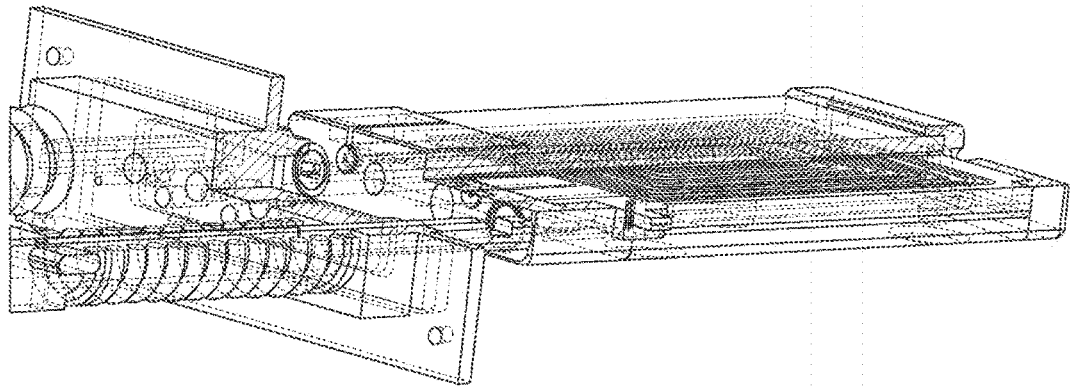
Figure 17B:
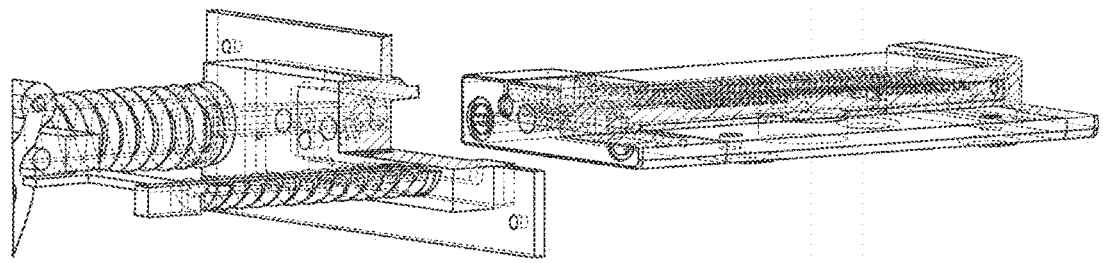

FIG. 16C and FIG. 17A display perspective views of fluidic bay 104 and fluidic module 150, according to certain embodiments. Fluidic module 150 further comprises cover 320, which has been partially removed to expose fluidic channel 240.

Figure 17C:
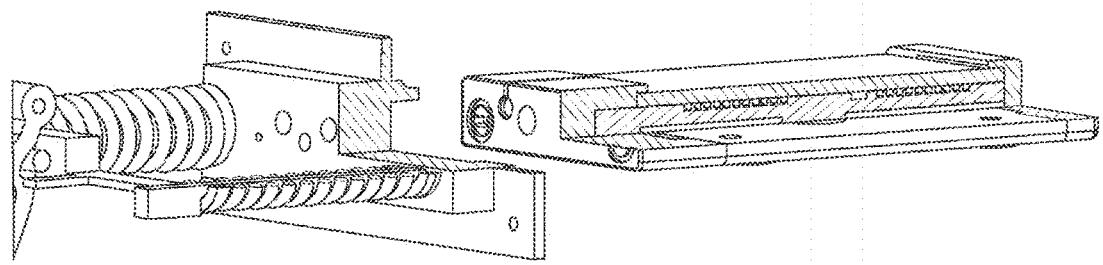
Figure 18A:
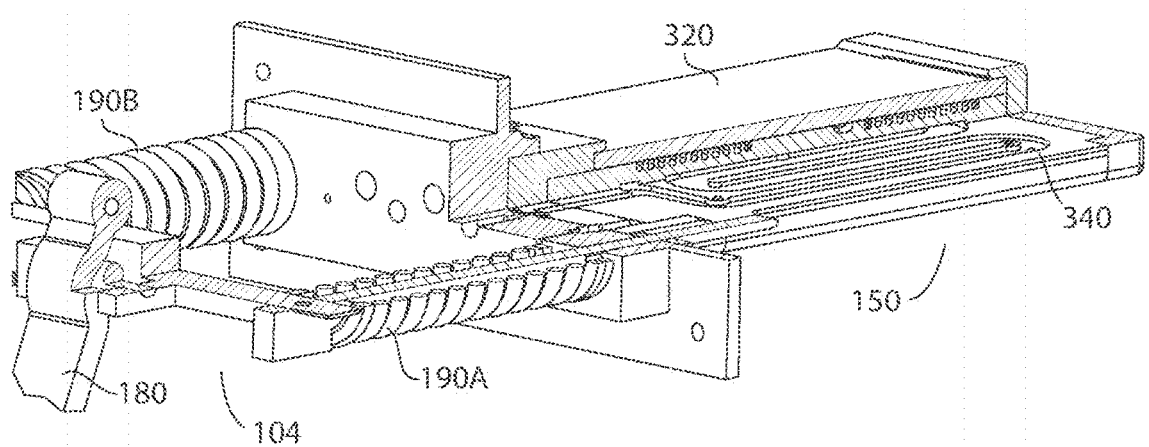
Figure 18B:
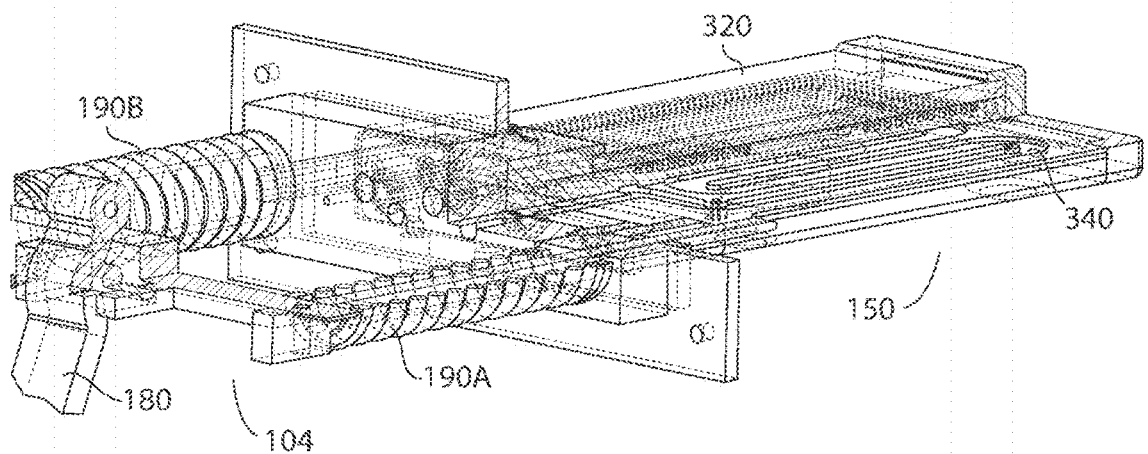

FIG. 17C, FIG. 18A, and FIG. 18B depict partial cutaway views of fluidic bay 104 and fluidic module 150, in accordance with some embodiments. FIG. 18A and FIG. 18B are cutaway views showing coolant channel 340. In certain embodiments, coolant channel 340 may act as the cold side of a heat exchanger. In some embodiments, the working fluid may be ethylene glycol.

Figure 19A:
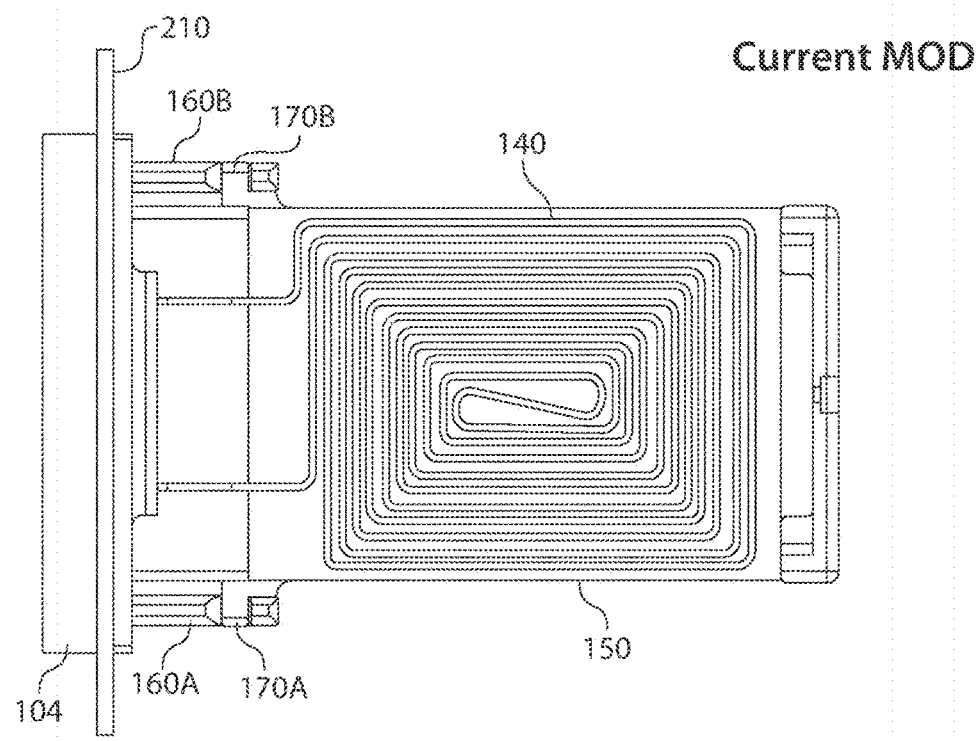
FIGS. 19A and 19B show, according to some embodiments, the insertion of a modular piece between a module and a bay.

FIG. 19A illustrates a top view of a fluidic system comprising fluidic bay 104 and fluidic module 150, according to certain embodiments.

Figure 19B:
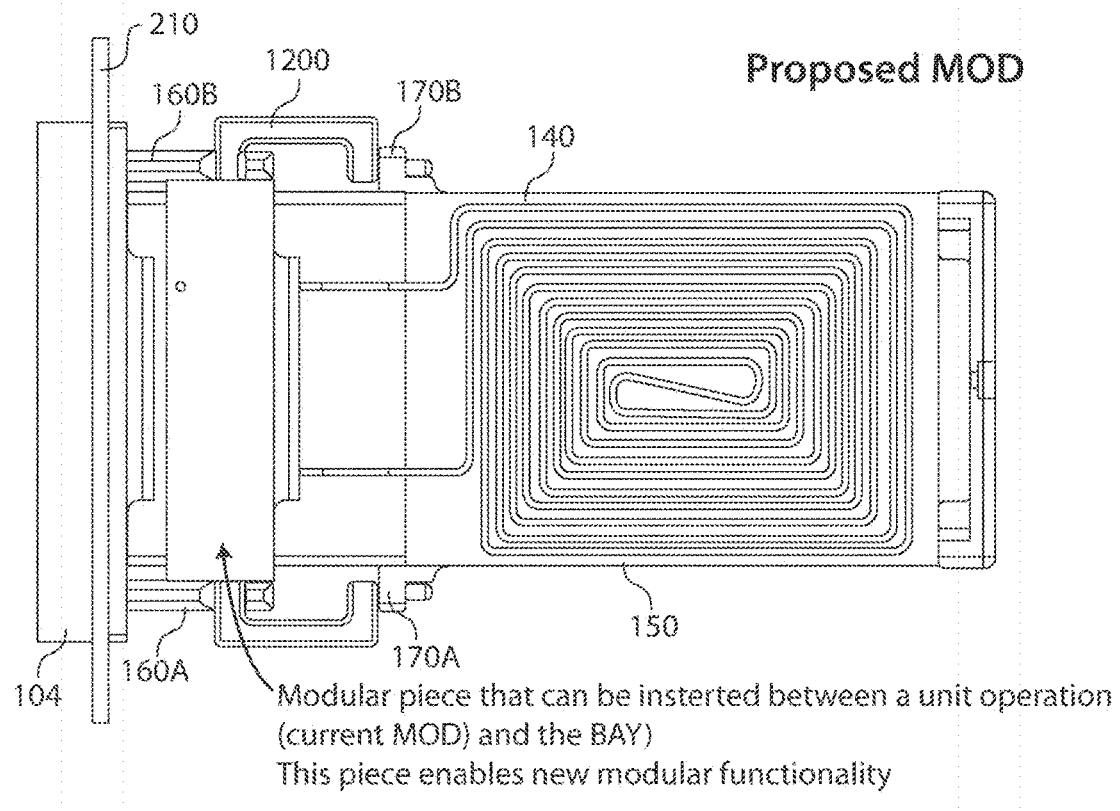

FIG. 19B shows, in accordance with some embodiments, a top view of a fluidic system in which an intermediate module 500 is positioned between fluidic bay 104 and fluidic module 150. In certain embodiments, fluidic channel 240 may pass through intermediate module 1200 both prior to entering fluidic module 150 from fluidic bay 104 and prior to entering fluidic bay 104 after flowing through fluidic module 150.

Figure 20:
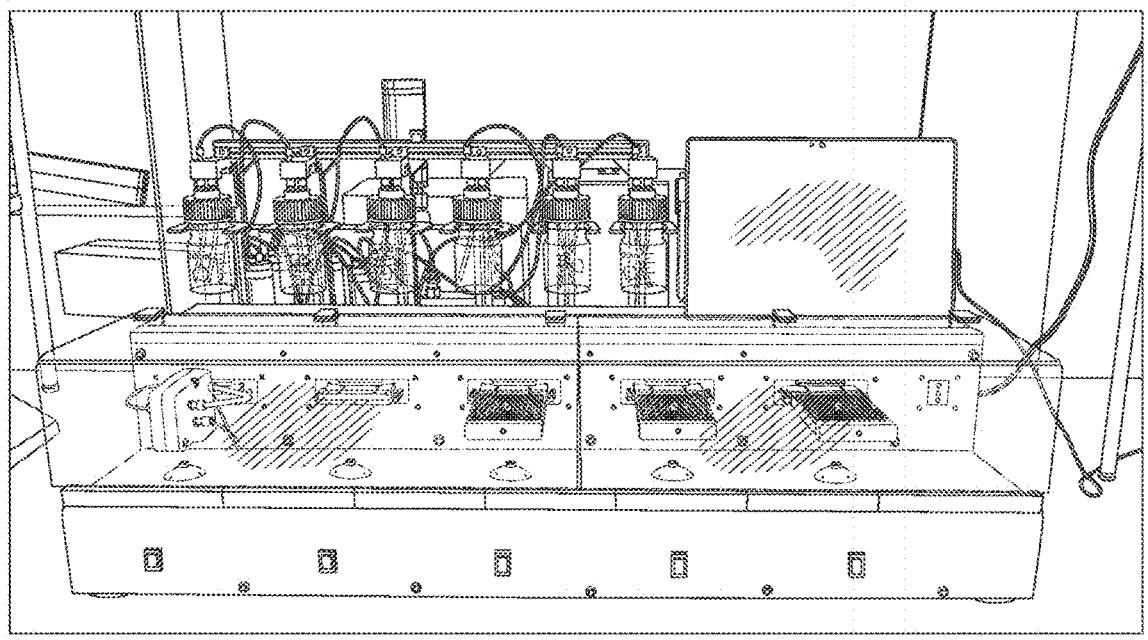
FIG. 20 shows, according to some embodiments, a photograph of a fluidic distributor.

FIG. 20 is a photograph of a fluidic system in accordance with certain embodiments of the invention.

Figure 21:
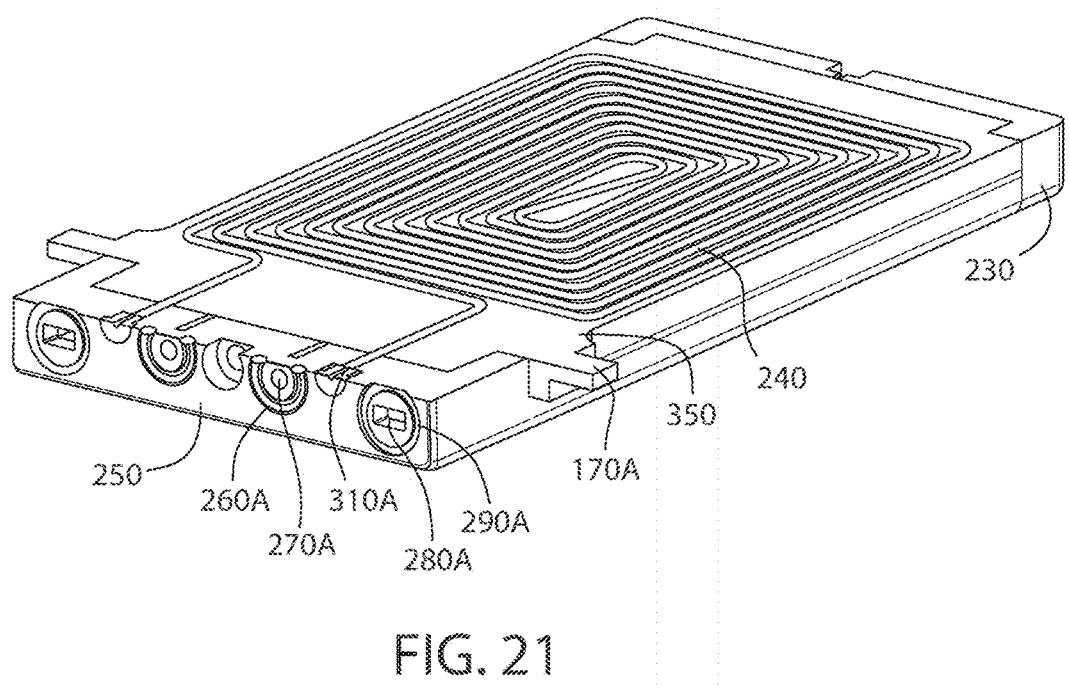
FIGS. 21-29 show, according to some embodiments, schematic depictions of modules.

FIG. 21 displays, according to certain embodiments, a cross-sectional view of a cooling module 150E comprising a thermal plate 340. In some embodiments, the thermal plate may house the fluidic channel, flow channel, and/or hooks. In certain embodiments, the thermal plate may act as a heat exchanger between the fluid and the coolant. The thermal plate may be fabricated from any suitable material; in some embodiments, the thermal plate is fabricated from a conductive material such as aluminum.

Figure 22:
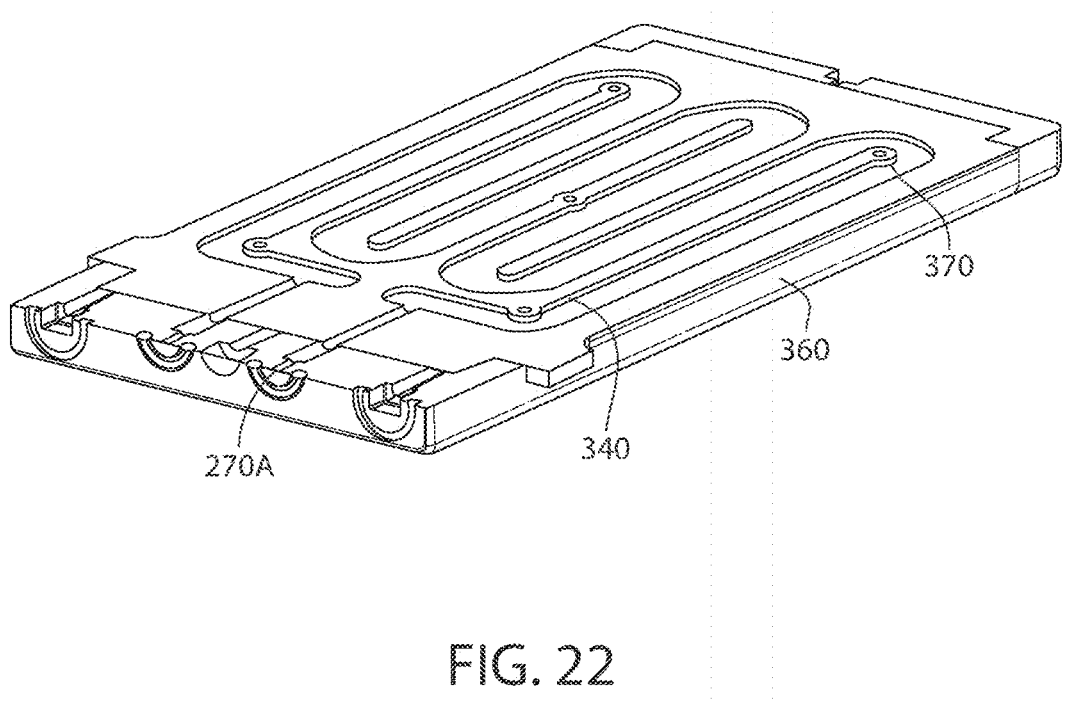

FIG. 22 is a cutaway schematic depiction of cooling module 150E comprising a cooling channel 340, in accordance with some embodiments. The cooling channel 340 may allow chemical processes to occur within module 150E at temperatures below that of the ambient environment in some embodiments. In certain embodiments, module 150E and cooling channel 340 may be insulated from the surrounding environment by insulator 360 positioned at the bottom surface of module 150. According to some embodiments, insulator 360 may prevent the coolant from getting warm. In some embodiments, the insulator may comprise silicone. According to some embodiments, the insulator may be attached to the remainder of the module with an adhesive, such as silicone glue. In some embodiments, insulator 360 may further comprise a small opening through which an IR sensor may be able to perform an accurate temperature reading. According to certain embodiments, module 150E may further comprise a fastening hole 370 through which a nut and screw may be inserted so that the cooling channel 340 and insulator 360 are fastened to the remainder of the module. In some embodiments, the fastening hole may help hold the reactor together during assembly.

Figure 23:
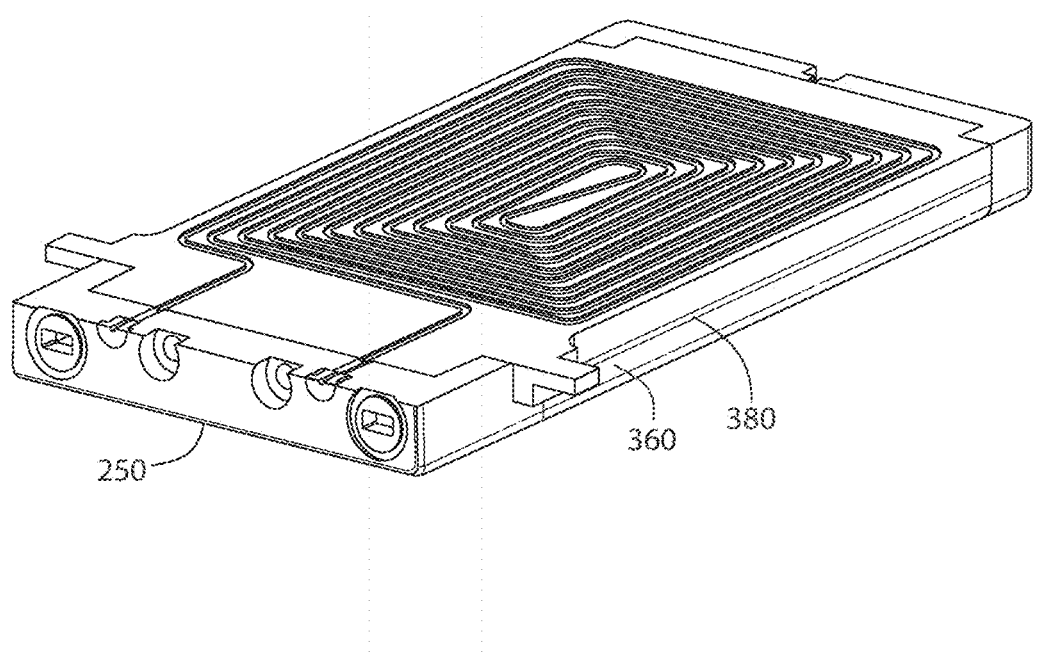

FIG. 23 illustrates, according to some embodiments, a cutaway schematic depiction of a module 150F comprising a hot reactor capable of providing heating to flow channel 240. In certain embodiments, module 150F may further comprise heater 380. Heater 380 may be fabricated from any suitable material, such as Kapton. In some embodiments, heater 380 may operates at 24 volts and/or provide a power output of 80 watts. Heater 380 may be insulated from the surrounding environment by insulator 360, optionally comprising silicone, in certain embodiments. In some embodiments, the face plate of module 150F may not comprise coolant inlets and/or outlets.

Figure 24:
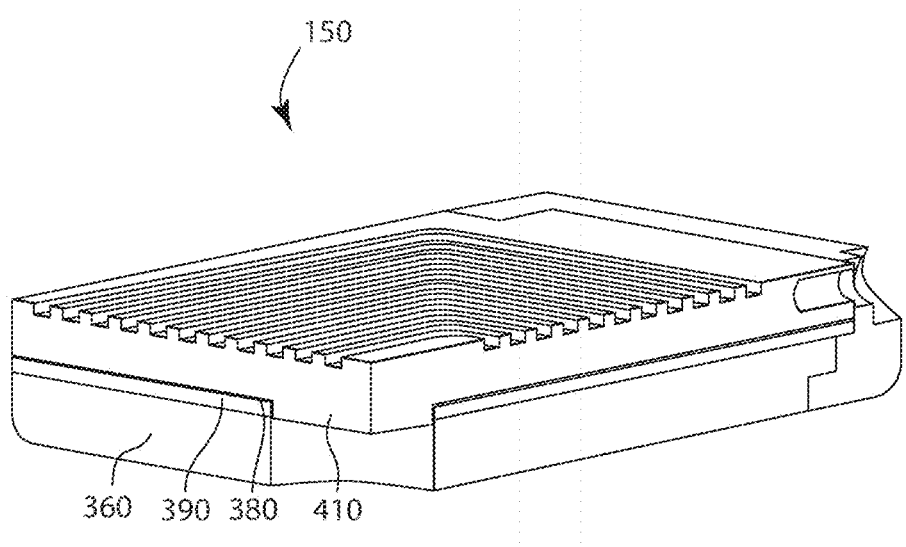

FIG. 24 displays a cutaway schematic view of heating module 150F in accordance with certain embodiments. Module 150F comprises a heater 380, insulator 360, heater cover 390, and alignment area 410. In certain embodiments, insulator 360 may help to ensure that the heater is working to heat up the fluid. In some embodiments, heater cover 390 may aid in positioning the heater at the appropriate location within module 150F. Heater cover 390 may be fabricated from any suitable material, such as aluminum. In certain embodiments, heater cover 390 may be attached to heater 380 by the use of, for example, an adhesive.

According to some embodiments, alignment area 410 may assist in alignment of heater 380, insulator 360, and heater cover 390. In some embodiments, alignment area 410 may further comprise a circular bump to aid alignment. In certain embodiments, temperature readings may be performed at alignment area 410. In some embodiments, module 150E may also have a similar alignment area.

Figure 25:
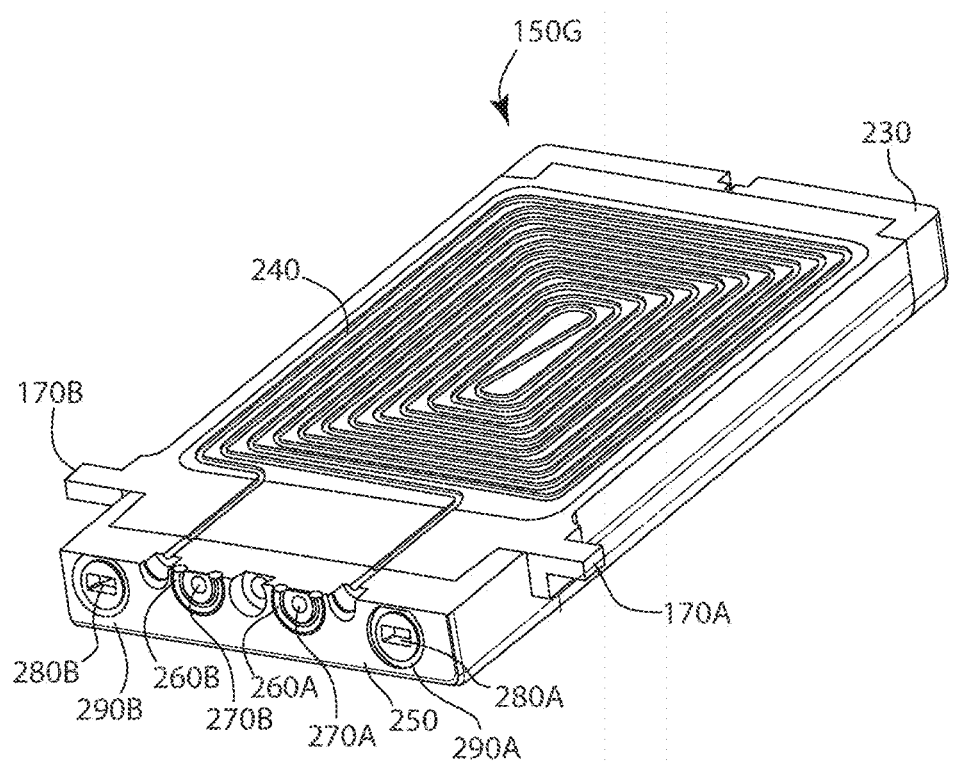
Figure 26:
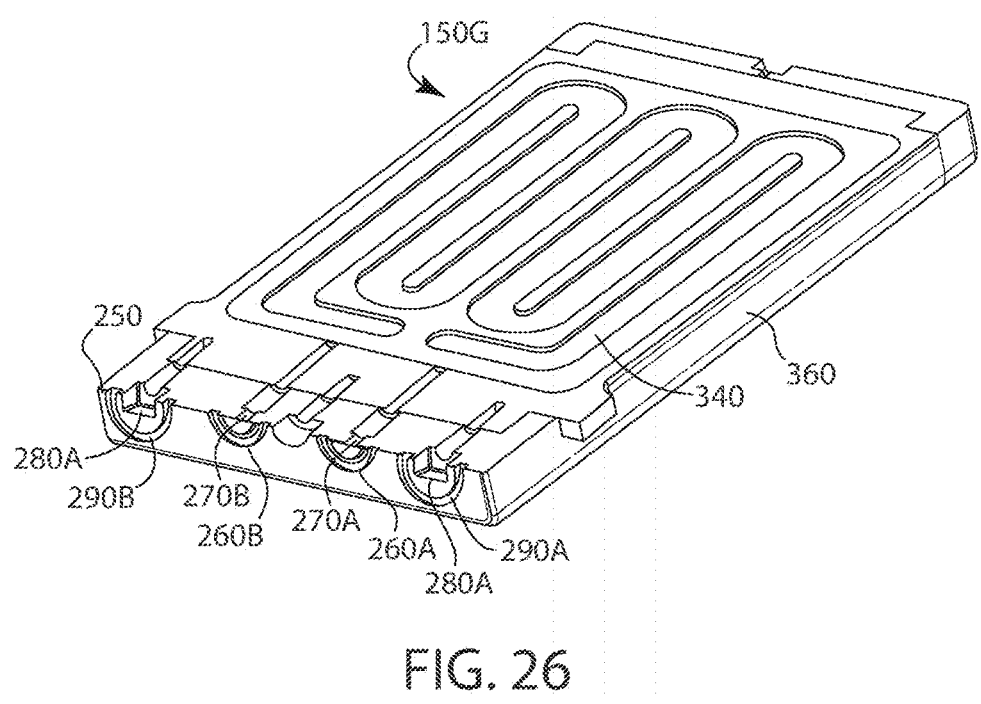
Figure 27:
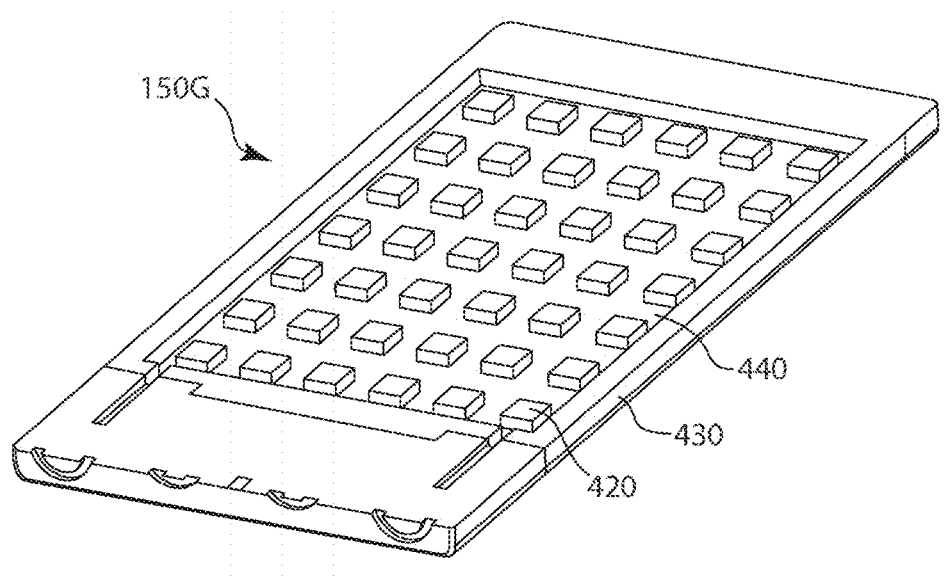

FIG. 25, FIG. 26, and FIG. 27 illustrate cutaway schematic views of a module 150G capable of serving as a cooled photo reactor, in accordance with some embodiments. In certain embodiments, the photo reactor may have the same basic face plate and/or thermal plate design as a hot reactor and/or a cold reactor. FIG. 25 shows a layer of module 150G comprising fluidic channel 240, according to certain embodiments. FIG. 26 depicts a layer of module 150G comprising coolant channels 340, according to some embodiments. In some embodiments, coolant channels 340 may dissipate heat produced by the LEDs. FIG. 27 shows a layer of module 150G comprising LED diodes 420, cover 430, and printed circuit board 440, in accordance with certain embodiments. In some embodiments, LED diodes 420 may be bright blue diodes. According to certain embodiments, the cover 430 may comprise plastic and/or may help keep printed circuit board 440 in place. In some embodiments, printed circuit board 440 may be handmade.

Figure 28:
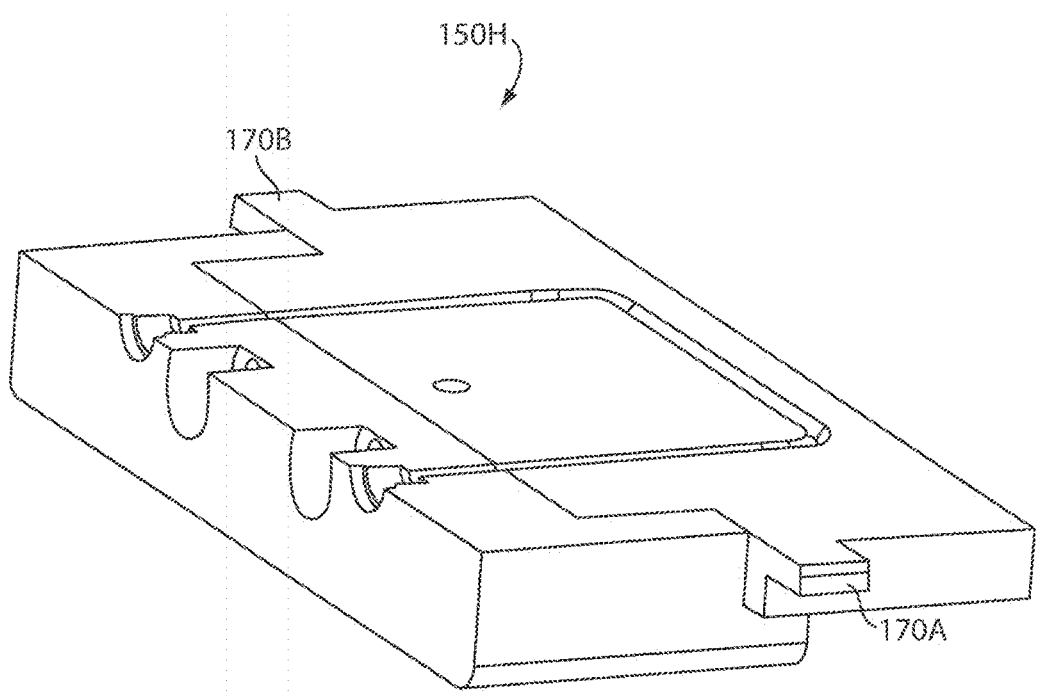

FIG. 28 depicts, according to certain embodiments, a cutaway schematic view of a module 150H capable of serving as a bypass channel. In some embodiments, module 150H is adapted so that fluid flows from the inlet to the outlet without chemical processes and/or chemical reactions occurring. In certain embodiments, one or more bypass channels may be utilized in a fluidic system when fewer than five reactors are needed for a given chemical reaction.

Figure 29:
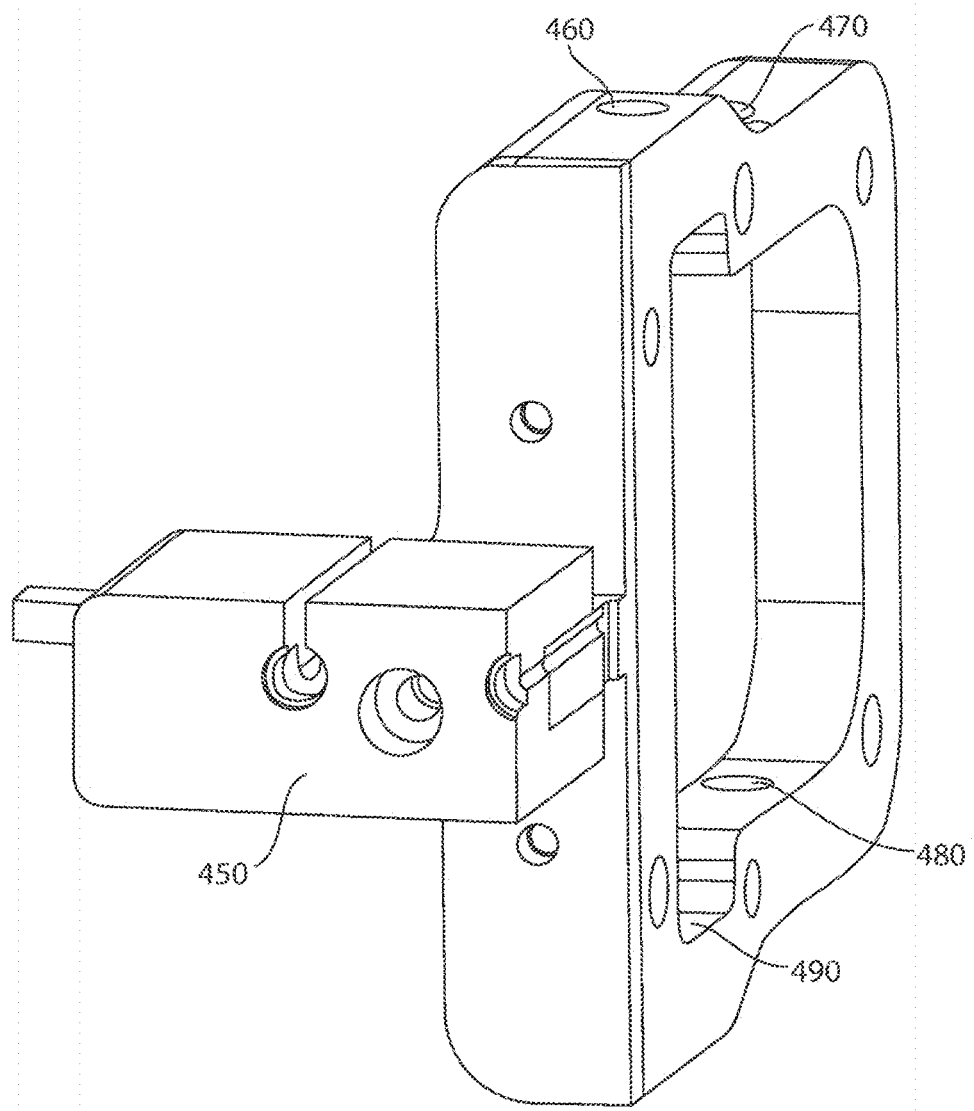

FIG. 29 illustrates, in accordance with some embodiments, a cutaway schematic view of a module 150I capable of serving as a separator. Module 150I comprises face plate 450, solution inlet 460, solution waste outlet 470, waste pressure regulator inlet 480, and separator waste outlet 490. In some embodiments, waste may flow out of the separator from separator waste outlet 490 into waste pressure regulator inlet 480. Module 150I further comprises an outlet through which the separated desired product flows (not shown).

Figure 30:
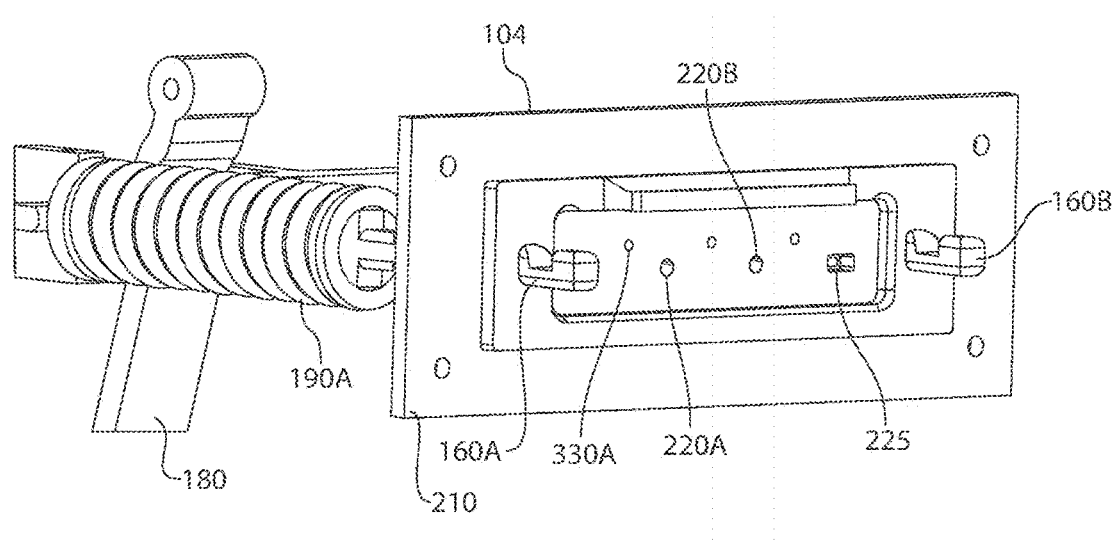
FIG. 30 shows, according to some embodiments, a schematic depiction of a bay.

FIG. 30 shows a perspective view of module 104 in accordance with certain embodiments.

Figure 31:
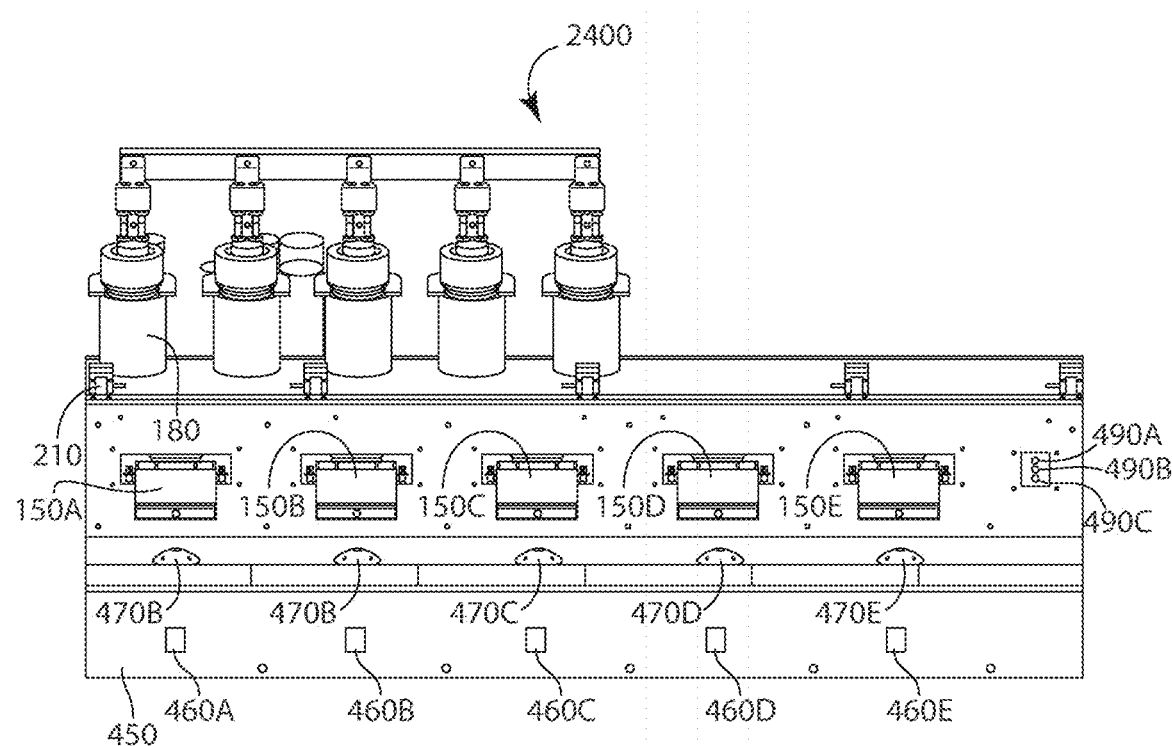
FIG. 31 shows, according to some embodiments, a schematic depiction of a fluidic distributor.

FIG. 31 illustrates a schematic view, according to some embodiments, of fluidic system 2400. Fluidic system 2400 comprises face 450; holes 460A, 460B, 460D, and 460E; IR sensors 470A, 470B, 470C, 470D, and 470E; modules 150A, 150B, 150C, 150D, and 150E; face plate 210; hinge 475; bottle and holder assembly 480; and outlet ports 490A, 490B, and 490C. In certain embodiments, fluid may flow through fluidic system 2400 through modules 150A-E and then into one or more of outlet ports 490A, 490B, and 490C. In some embodiments, different outlet ports may outlet different fluids, such as fluids comprising reaction products or fluids comprising waste. According to some embodiments, the temperatures of reactions occurring in modules 150A-E may be accurately monitored by IR sensors 470A-E.

In certain embodiments, face plate 450 may house device components such as switches, IR sensors 470A-E, and outlet ports 490A, 490B, and 490C. Face plate 450 may be fabricated from sheet metal in some embodiments. In some embodiments, a cover is attached to face plate 450 by hinge 475.

In some embodiments, hole 460A may comprise a switch which controls an actuator capable of reversibly attaching module 150A to face plate 450. In certain embodiments, any of the modules 150A-E may be attached to any suitable position on face plate 450 by use of switches.

In certain embodiments, solvents and/or reagents may be delivered to one or more of modules 150A-E from bottle and holder assembly 480. In some embodiments, solvents and/or reagents are delivered into modules 150A-E with the aid of a pump (not shown). In certain embodiments, bottle and holder assembly 480 may comprise bottles which are connected by tubing first to a pump and then to a reactor.

According to some embodiments, outlet ports 490A-C may comprise outlets for product and/or waste.

Figure 44A:
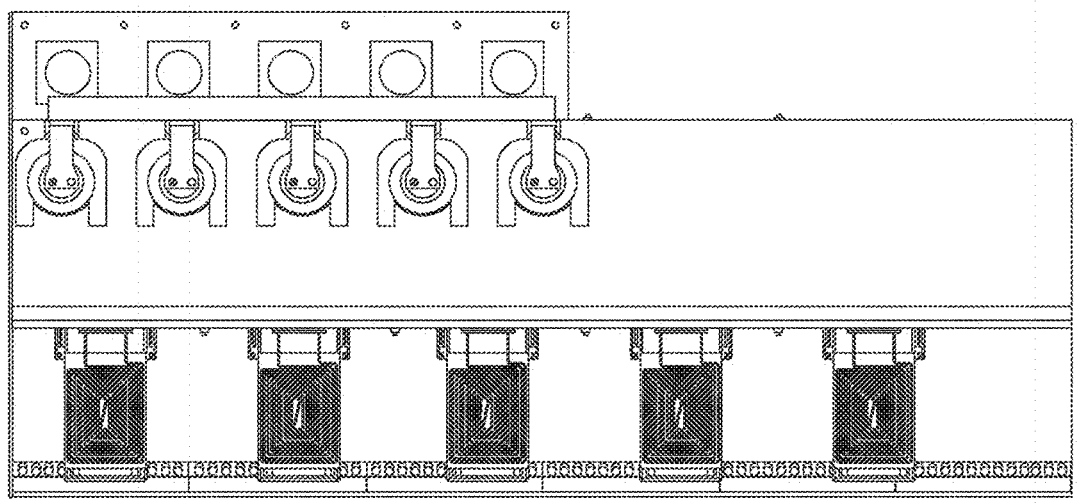
FIGS. 44A-44B show, according to some embodiments, schematic depictions of a fluidic distributor.
Figure 44B:
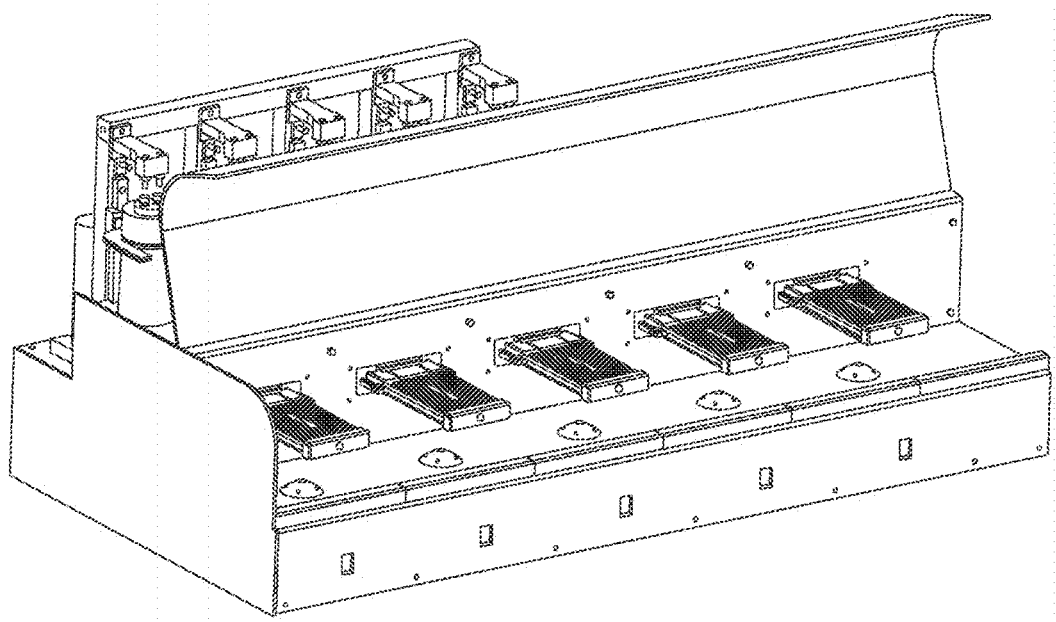

FIG. 44A and FIG. 44B show schematic depictions of the fluidic system hardware, in accordance with some embodiments. In certain embodiments, the electronics may have dimensions of approximately 40 cm by approximately 80 cm. In some embodiments, the hardware may comprise a cover for process area ventilation.

Figure 45A:
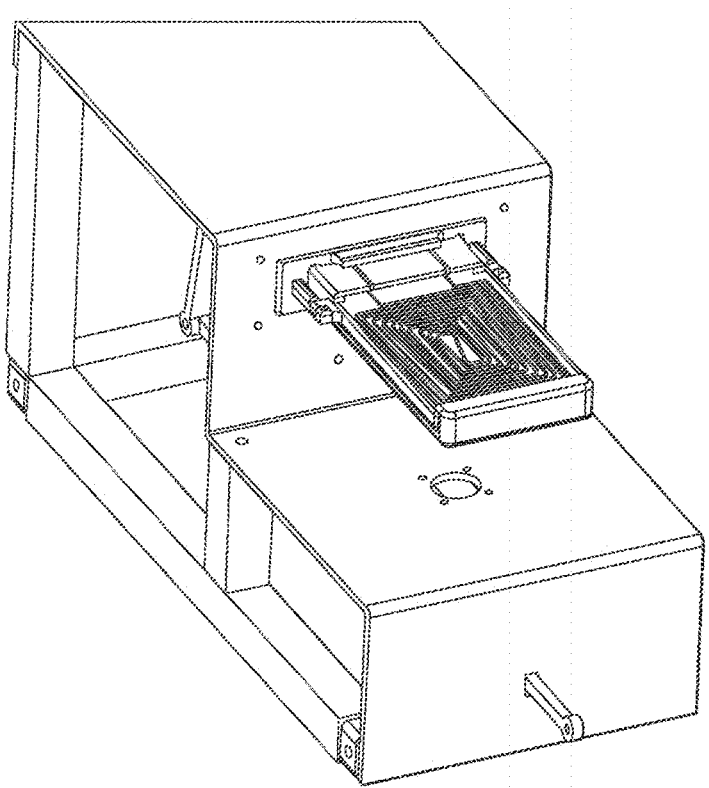
FIG. 45A shows, according to some embodiments, a schematic depiction of a fluidic distributor.

FIG. 45A is, according to certain embodiments, a schematic of a plug and play fluidic system in which a module interfaces with a bay. In some embodiments, a module may be able to plug into a bay without the use of any screws. In certain such embodiments, a universal "clipping" strategy may instead be employed to attach bays to modules such as heated and/or cooled reactors, separators, in-line liquid-liquid separators, and photo reactors. While attached to the bay, there may be uninterrupted flow of reagents into and out of modules and waste ports in some embodiments. In certain embodiments, the temperature of one or more modules may be determined by IR-based temperature measurement.

Figure 45B:
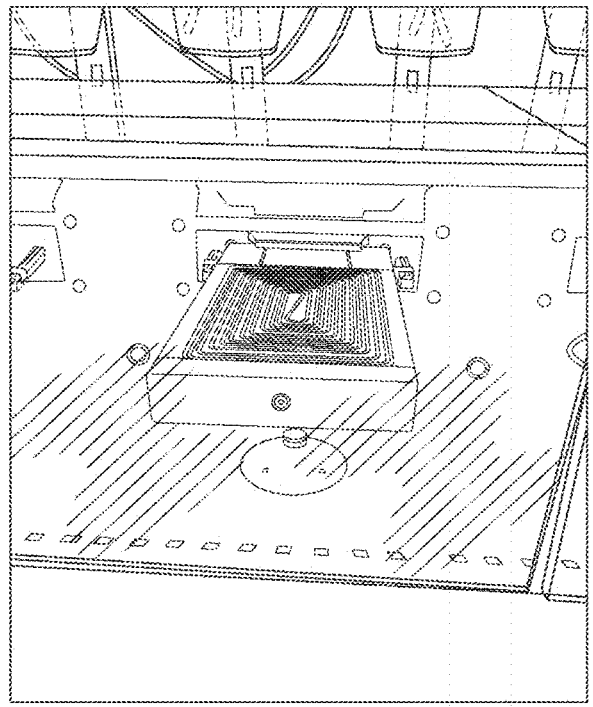
FIG. 45B shows, according to some embodiments, a photograph of a module.

FIG. 45B is a photograph of a photo reactor in accordance with certain embodiments of the invention.

Figure 46A:
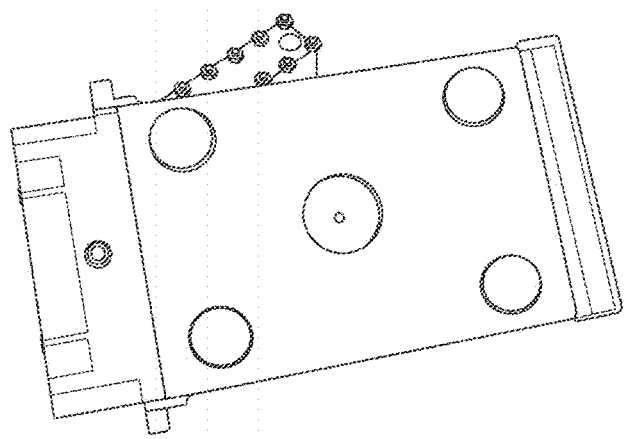
FIGS. 46A-46C show, according to some embodiments, photographs of modules.
Figure 46B:
Figure 46C:
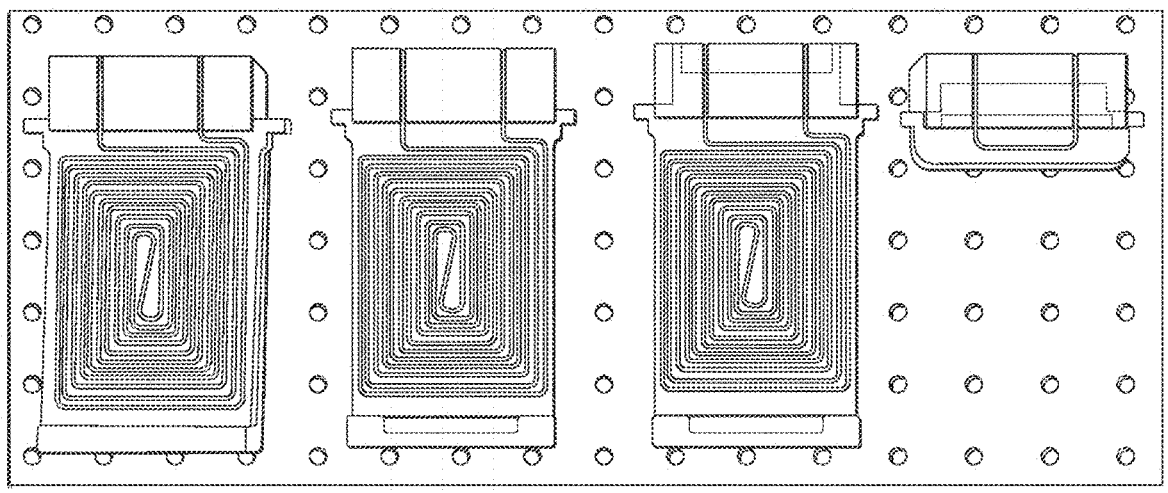

FIG. 46A, FIG. 46B, and FIG. 46C are photographs of modules of the fluidic system in accordance with some embodiments. FIG. 46A and FIG. 46C are top views of modules and FIG. 46B is a side view of a module. In some embodiments, the hardware displayed in FIG. 46A, FIG. 46B, and/or FIG. 46C may have one or more of the following properties: able to comprise and/or interface with possibly inexpensive standard or preformed tubing, embedded electrical heaters that may allow for small module size and/or heating without the use of an oil bath, an optically accessible flow path, no electrical connectors to snap in, protected electrical connectors, thermally insulated by possibly either thick glass and/or silicon, noncontact temperature readout, and able to comprise a range of fluid volumes.

Figure 47:
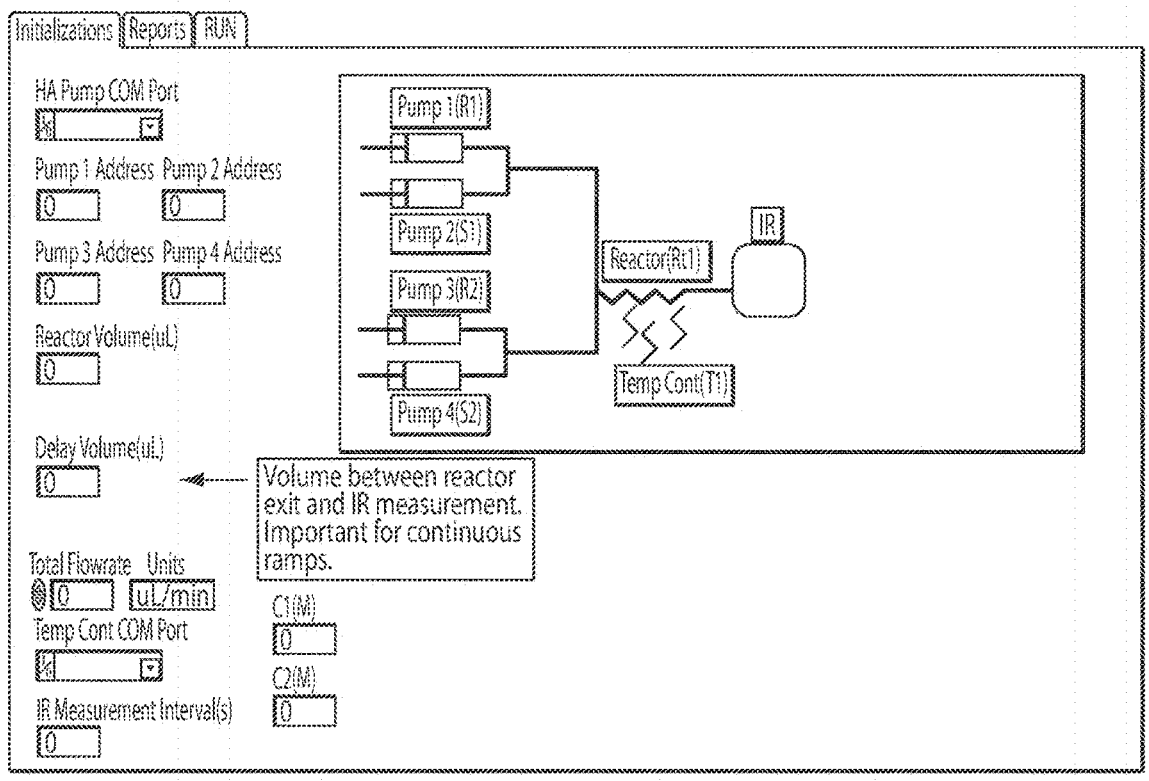
FIG. 47 shows, according to some embodiments, a control system for a fluidic distributor.

FIG. 47 is a screenshot of the labview control system for an exemplary embodiment of the invention.

The following examples are intended to illustrate certain embodiments of the present invention, but do not exemplify the full scope of the invention.

EXAMPLE 1

Figure 32:
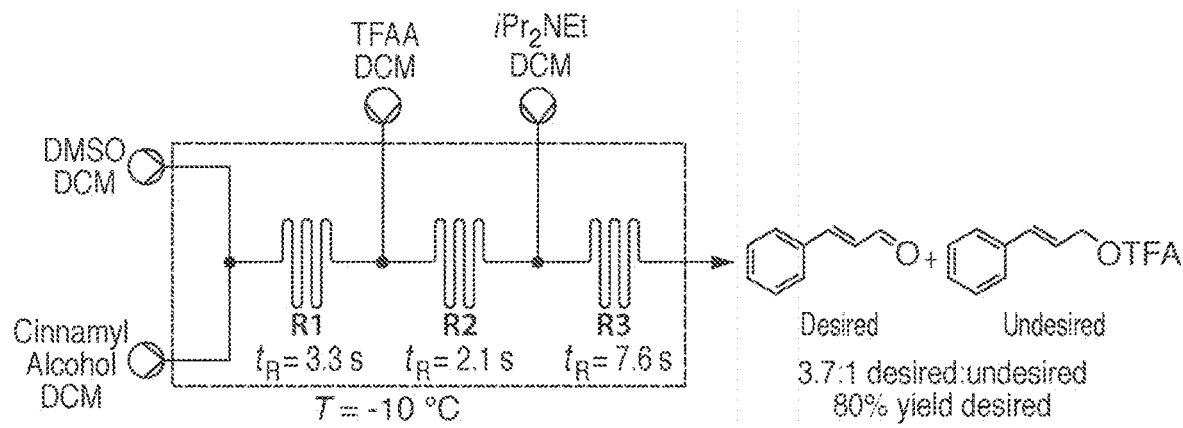
FIGS. 32-43 show, according to some embodiments, schematic depictions of reactions that may be carried out in a system comprising a fluidic distributor and one or more modules.

This example describes the use of a fluidic system to perform a Moffatt-Swern Oxidation, a reaction which comprises 35% of the oxidations used in medicinal chemistry. The Moffat-Swern Oxidation was performed in a fluidic system comprising 3 bays, 4 pumps, and a cooled reactor. Cinnamoyl alcohol in dichloromethane, dimethyl sulfoxide, and dichloromethane was introduced into a fluidic system −10° C. These reagents were mixed and then passed through a first module for 3.3 seconds, after which trifluoroacetic anhydride and dichloromethane were added. Then, the mixture was passed through a second module for 2.1 seconds, after which N,N-Diisopropylethylamine and additional dichloromethane were added. Following this step, the mixture was passed through the final module for 7.6 seconds. At the conclusion of the reaction, an 80% yield of the desired cinnamoyl aldehyde was obtained and a ratio of 3.7:1 of the desired aldehyde to the undesired trifluoroacetic acid-protected molecule can be observed. FIG. 32 displays a schematic of the reaction setup.

EXAMPLE 2

Figure 33:
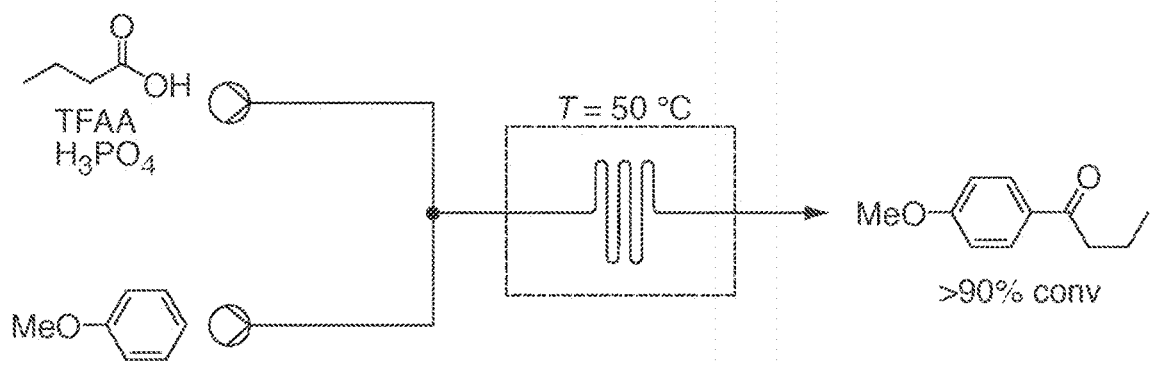

This example describes the use of a fluidic system to perform a Friedel-Crafts Acylation, a reaction which is used to form greater than 10% of all carbon-carbon bonds in process chemistry. The Friedel-Crafts Acylation was performed in a fluidic system comprising 1 bay, 2 pumps, and a heated reactor. Anisole and butyric acid in a trifluoroacetic anhydride and phosphoric acid solution were introduced into a first module at 50° C. Upon exiting the module, the product 4'-methoxybuterophenone was recovered at a conversion efficiency greater than 90%. FIG. 33 displays a schematic of the reaction setup.

EXAMPLE 3

Figure 34:
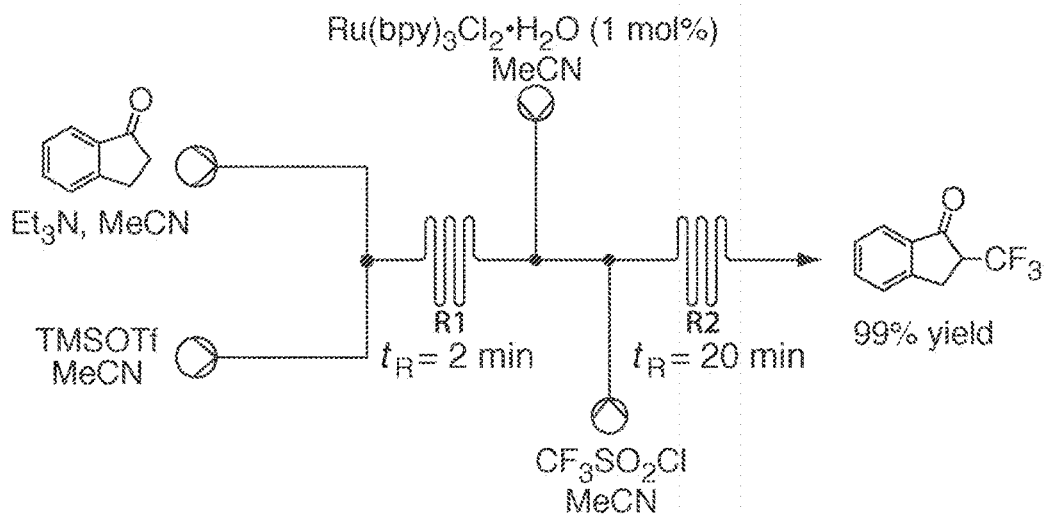

This example describes the use of a fluidic system to perform a trifluoromethylation, which is of emerging interest for pharmaceutical and agrochemical industries. The trifluoromethylation was performed in a fluidic system comprising 3 bays, 4 pumps, and an LED reactor. Trimethylsilyl trifluoromethanesulfonate in acetonitrile and a solution comprising 1-indanone, triethylamine, and acetonitrile were mixed and introduced into a first module. After passing through the first module in 2 minutes, $Ru(bpy)_2Cl_2.H_2O$ (1 mol %) in acetonitrile was added to the mixture, followed by $CF_3SO_2Cl$ in acetonitrile. The mixture was then flowed through the second module for 20 minutes. The trifluoromethylated product was formed with a 99% yield. FIG. 34 displays a schematic of the reaction setup.

EXAMPLE 4

This example describes the use of a fluidic system to perform reductive aminations. The reductive aminations were performed in a fluidic system comprising 3 bays, 4 pumps, and an LED reactor. A molecule comprising the following first structure

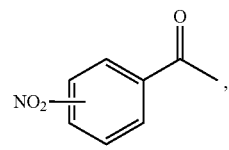

10 mol % pyrrolidine in 1,2-dichloroethene, and a molecule comprising the following second structure

Figure 35:
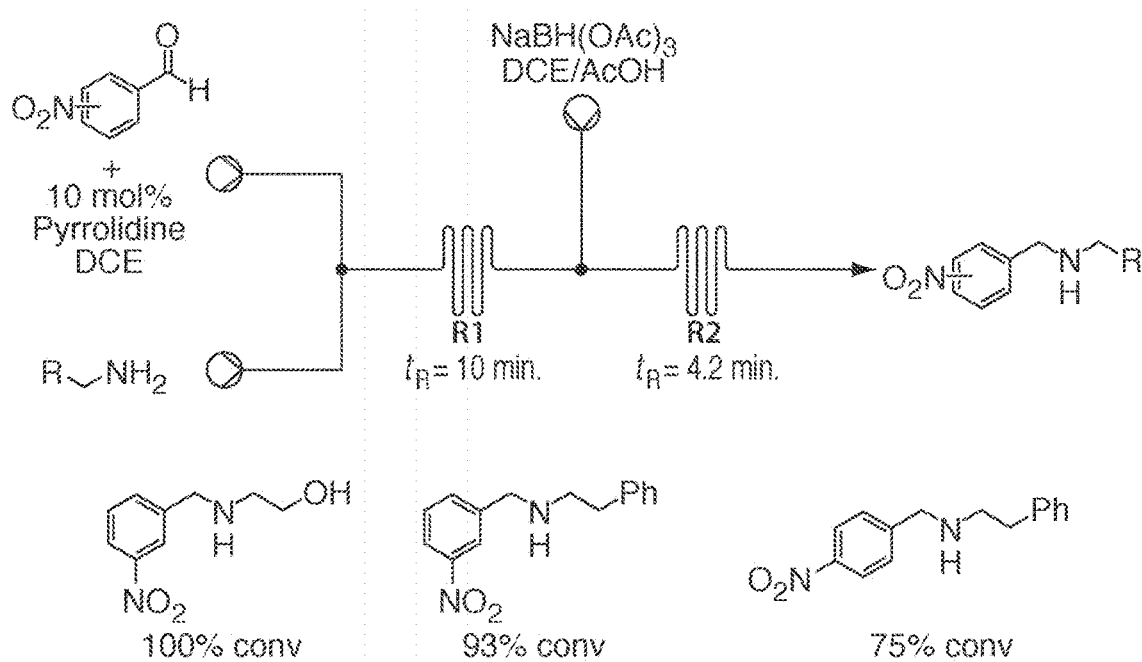

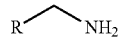

were introduced into a first module and flowed through the first module over a period of 10 minutes. Then, $NaBH(OAc)_3$, 1,2-dichloroethene, and acetic acid were added and the mixture was introduced into a second module. The mixture was flowed through the second module over a period of 4.2 minutes, after which the desired aminated product was obtained with an efficiency greater than or equal to 75% and up to 100%, depending on the position of the $NH_2$ group and the identity of R. FIG. 35 displays a schematic of the reaction setup, including conversions obtained from different combinations of reagents.

EXAMPLE 5

Figure 36:
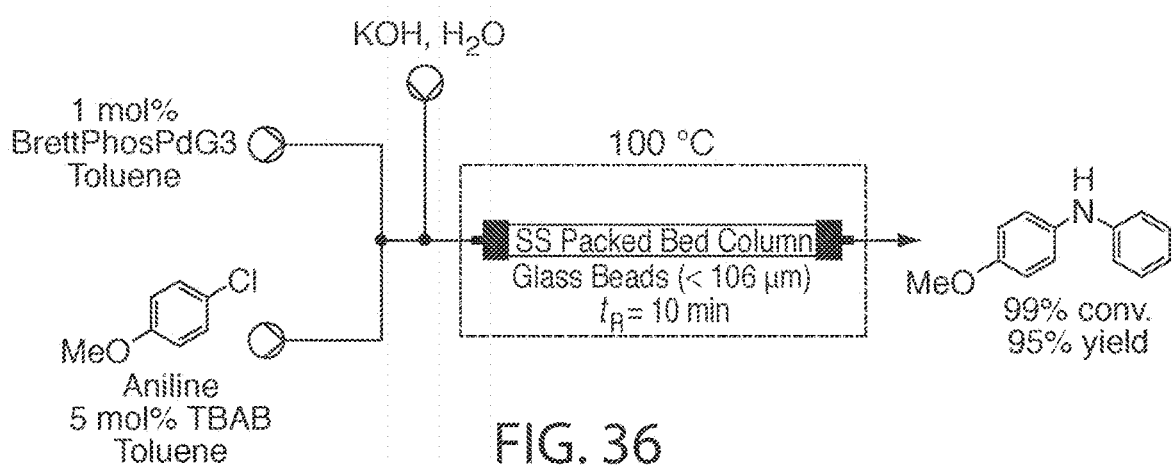

This example describes the use of a fluidic system to perform a Buchwald-Hartwig amination, which is used to form 27% of heteroatom-carbon bonds in medicinal chemistry. The Buchwald-Hartwig amination was performed in a fluidic system comprising 2 bays, 3 pumps, and a packed bed reactor. 1 mol % BrettPhosPdG3 in toluene was mixed with a solution comprising 4-chloroanisole, aniline, and 5 mol % TBAB in toluene. Then, aqueous sodium hydroxide was added and the mixture was introduced into a SS-packed bed column at 100° C. comprising glass beads. After 10 minutes, the solution exited the reactor to yield the desired product at 99% conversion with a 95% yield. FIG. 36 displays a schematic of the reaction setup.

EXAMPLE 6

Figure 37:
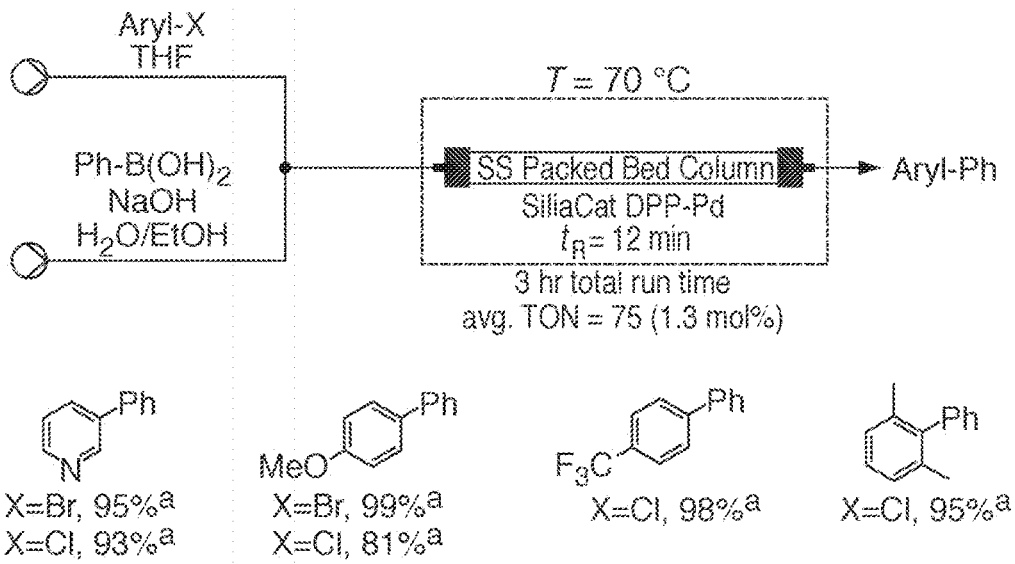

This example describes the use of a fluidic system to perform a Suzuki coupling reaction, which is used to form approximately 40% of carbon-carbon bonds in medicinal chemistry and is the most common cross-coupling reaction used in medicinal chemistry. The Suzuki coupling reactions were performed in a reactor comprising 1 bay, 2 pumps, and a packed bed reactor. Aryl-X in THF and a solution comprising phenylboronic acid, sodium hydroxide, water, and ethanol was added to a SS Packed Bed Column at 70° C. comprising SiliaCat DPP-Pd. After 12 minutes, the reagents exited the module. The conversion was assessed using crude GC analysis with an internal standard. The desired product was achieved with a conversion ranging from 81% to 99% depending upon the identity of Aryl-X. FIG. 37 displays a schematic of the reaction setup, including possible conversions which were obtained from different combinations of reagents.

EXAMPLE 7

Figure 38:
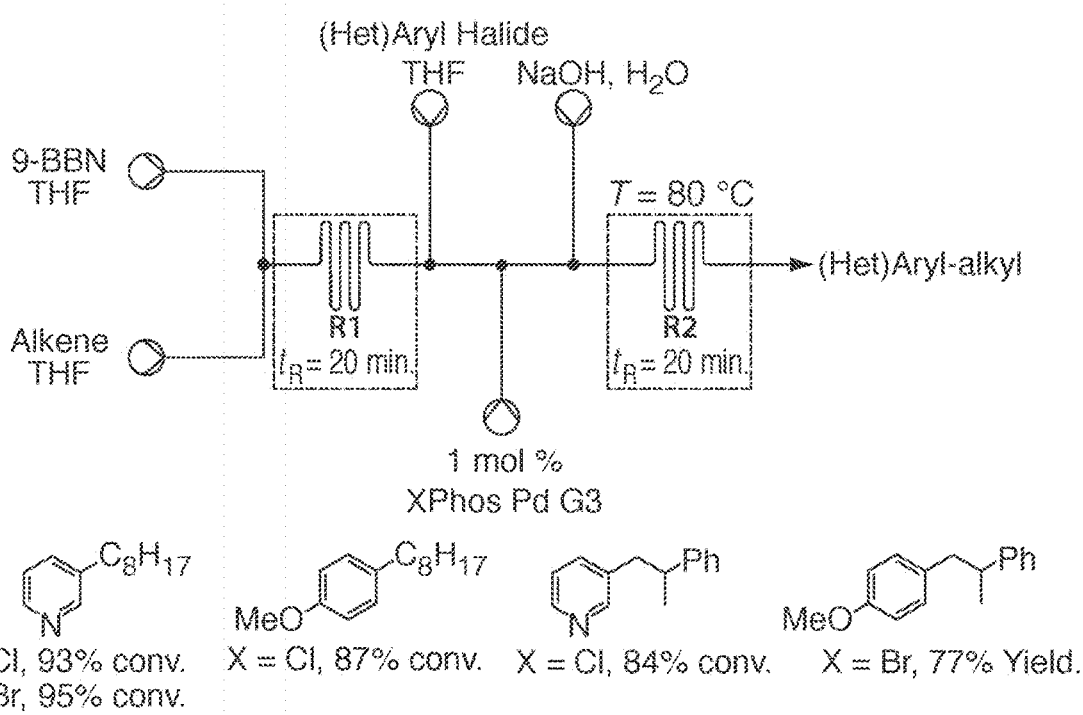

This example describes the use of a fluidic system to perform B-Alkyl Suzuki couplings. The B-Alkyl Suzuki couplings were performed in a fluidic system comprising 1 bay and 2 pumps. 9-BBN in THF and a solution comprising an alkene in TI-IF were added to a first module. After 20 minutes, these reagents exited the first module. At this point, a Het(Aryl) halide in THF, 1 mol % XPhos Pd G3, and sodium hydroxide in water were added to the reagents and the combined mixture entered the second module which was heated to 80° C. The mixture was then flowed through the second module over a time period of 20 minutes, after which the Het(Aryl)-alkyl product was recovered with a conversion between 77% and 95%. FIG. 38 displays a schematic of the reaction setup, including conversions which were obtained from different combinations of reagents.

EXAMPLE 8

This example describes the use of a fluidic system to perform a peptide coupling reaction. The peptide coupling reaction was performed in a fluidic system comprising 1 bay and 2 pumps. A mixture of N,N-Diisopropylethylamine, dichloromethane, a molecule comprising the following first structure

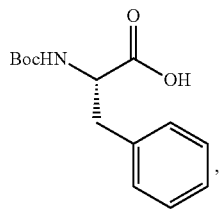 [SMILES: CC(C)(C)OC(=O)N[C@@H](Cc1ccccc1)C(=O)O]

and a molecule comprising the following second structure

Figure 39:
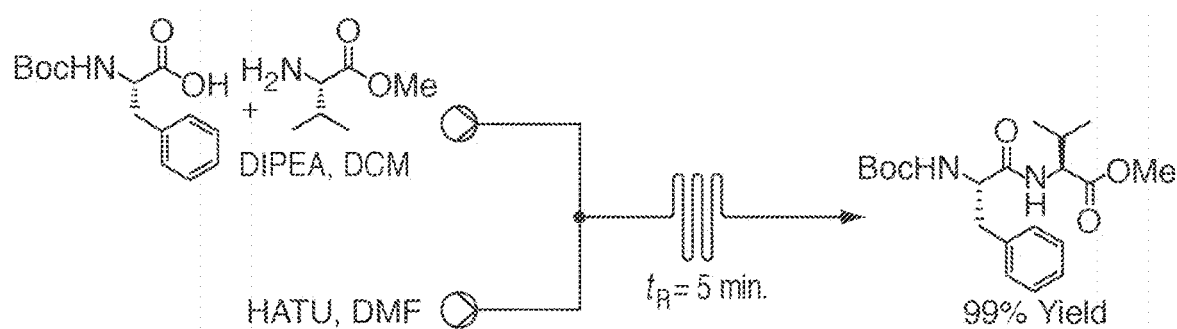

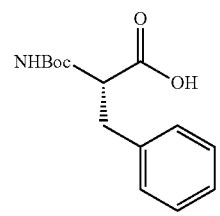 [SMILES: CC(C)(C)OC(=O)N[C@@H](Cc1ccccc1)C(=O)O]

were added to a solution comprising HATU and DMF. The solution was then flowed through the first module for 5 minutes. Upon exiting the first module, the desired product was obtained with 99% yield. FIG. 39 displays a schematic of the reaction setup.

EXAMPLE 9

Figure 40:
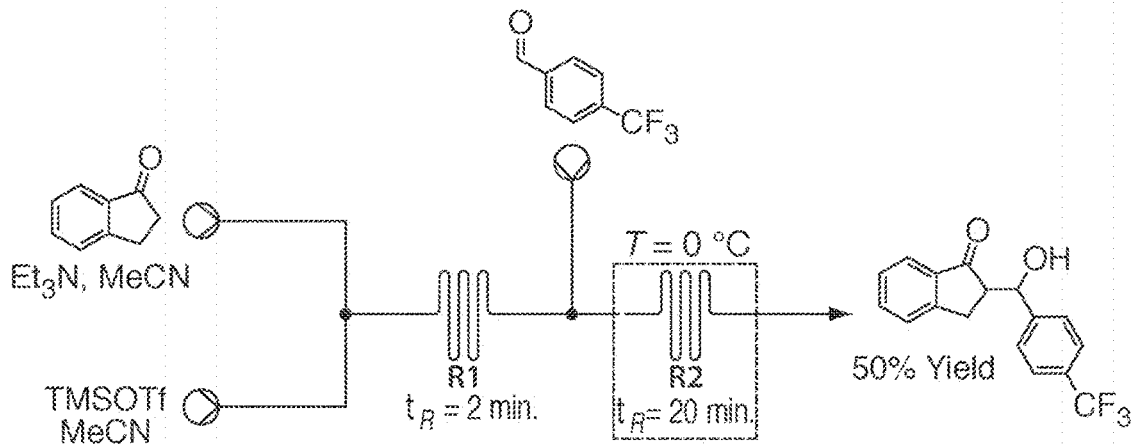

This example describes the use of a fluidic system to perform an aldol reaction. The aldol reaction was performed in a fluidic system comprising 2 bays, 3 pumps, and a cooled reactor. A solution comprising 1-indanone, triethylamine, and acetonitrile was added to a solution comprising trimethylsilyl trifluoromethanesulfonate and acetonitrile. The solution was then flowed through the first module over a period of two minutes. 4-(trifluoromethyl)benzaldehyde was then added to the solution and the solution was flowed through a second module at 0° C. for 20 minutes. Upon exiting the module, the desired product was achieved with a 50% yield. FIG. 40 displays a schematic of the reaction setup.

EXAMPLE 10

This example describes the use of a fluidic system to perform an asymmetric allylation. The asymmetric alkylations was performed in a fluidic system comprising 2 bays, 3 pumps, and a cooled reactor. A solution comprising the following molecule

Figure 41:
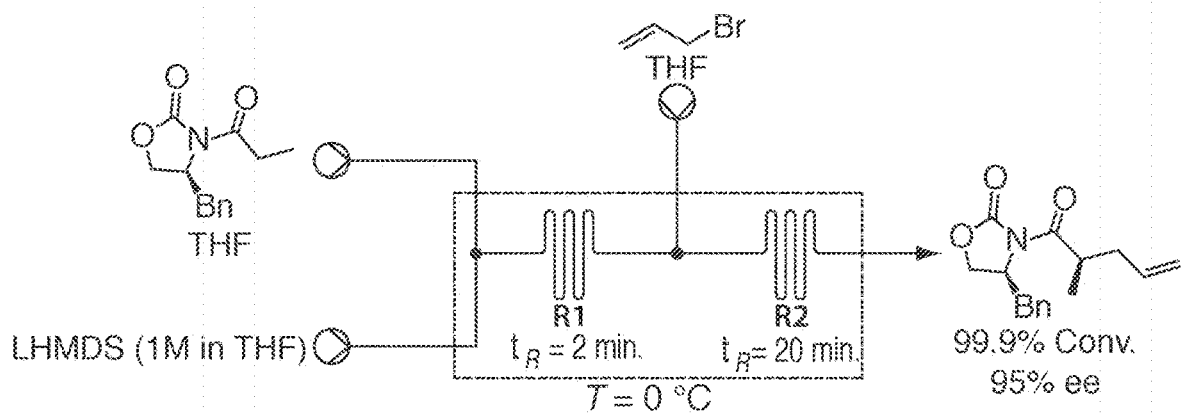

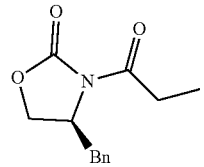 [SMILES: CCC(=O)N1C(=O)OC[C@@H]1Cc1ccccc1]

in THF was added to a 1M solution of LHMDS in THF. The solution was then cooled to 0° C. and flowed through a first module over the course of 2 minutes. 4-bromo-1-butene was added to the solution after it exited the first module. Then, the solution was flowed through the second module over the course of 20 minutes. Upon exiting the second module, the desired product was obtained with a 99.9% conversion, 95% ee. FIG. 41 displays a schematic of the reaction setup.

EXAMPLE 11

Figure 42:
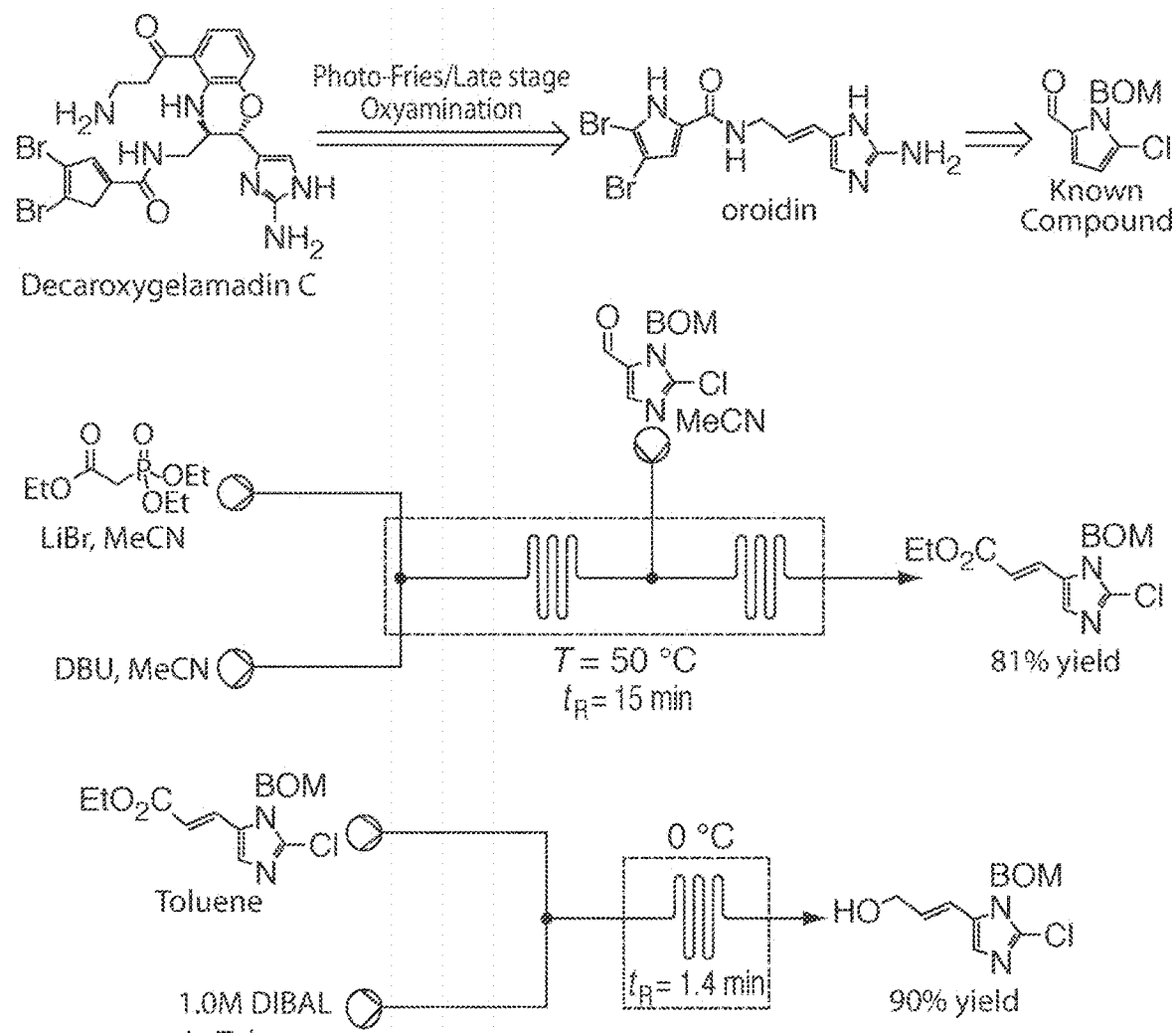

This example describes the use of a fluidic system to perform a target oriented synthesis. FIG. 42 shows the use of a fluidic system to perform reaction optimization such that a desired product is generated. In some embodiments, target oriented synthesis may be incorporated as one or more steps in a natural product synthesis. According to certain embodiments, target oriented syntheses may also demonstrate the utility of the fluidic system described herein for working with complex molecular systems and/or molecules that cannot be formed using Burke's machine.

EXAMPLE 12

Figure 43:
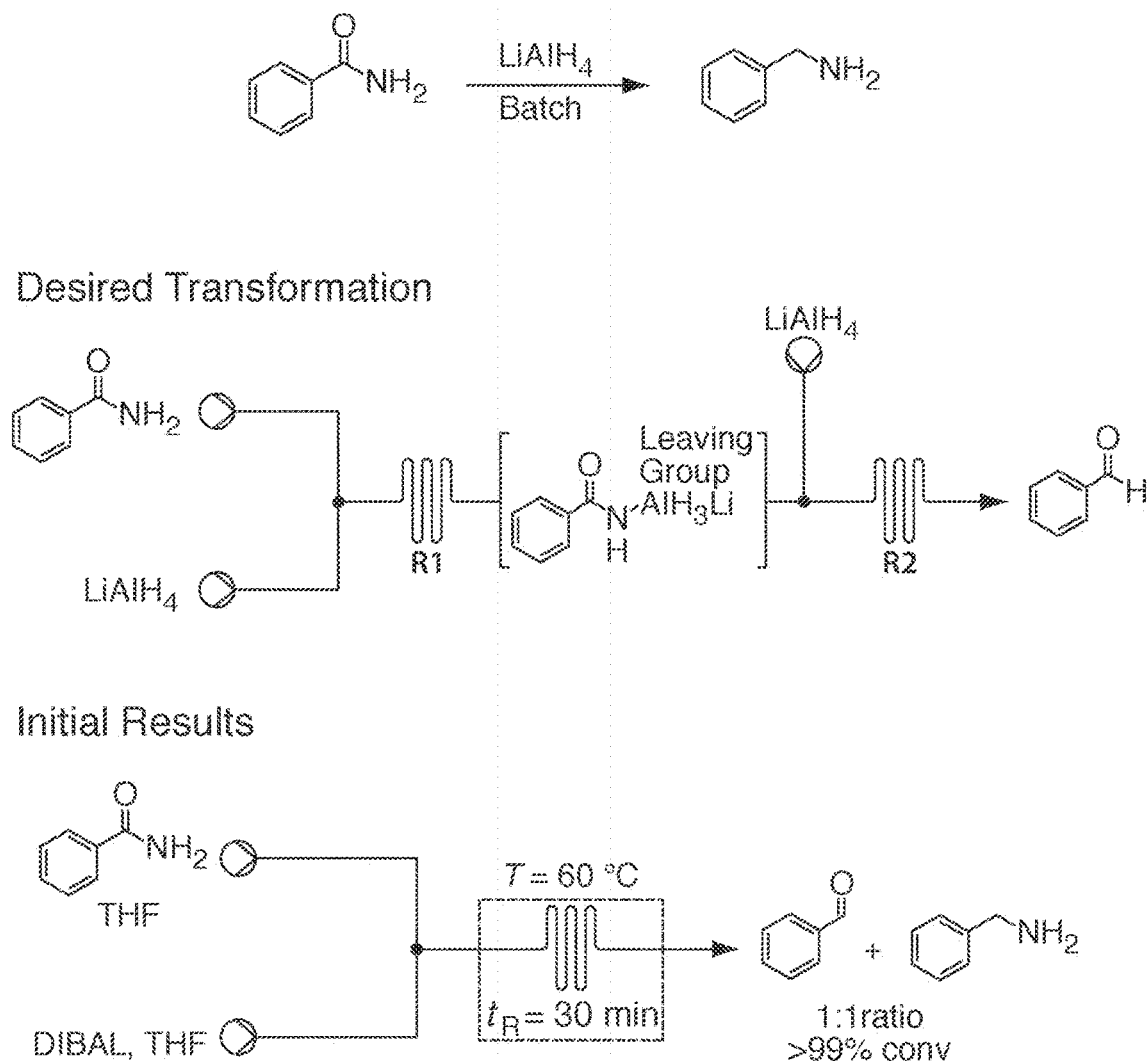

This example describes the use of a fluidic system to perform method development reactions. For instance, in some embodiments, flow reactions may comprise conditions that allow for the formation of products that are disfavored in batch reactors. According to certain embodiments, the fluidic system itself may be able to perform an optimization of synthesis conditions. In this example, a flow reactor was used to reduce an amide to the target aldehyde with a conversion of greater than 99% and a 1:1 ratio of favored aldehyde product to disfavored amine product. FIG. 43 displays the desired transformation and initial experimental results.

EXAMPLE 13

Figure 48:
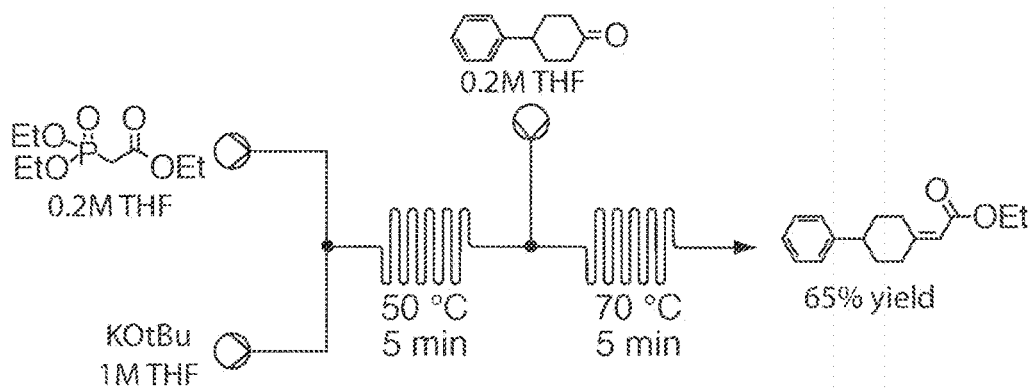
FIGS. 48-51 show, according to some embodiments, schematic depictions of reactions that may be carried out in a system comprising a fluidic distributor and one or more modules.

This example describes the use of a fluidic system to perform a Horner-Wadsworth-Emmons reaction, an olefination reaction that may be used to form C=C bonds. A 0.2 M solution of triethyl phosphonoacetate was mixed with a 1 M solution of potassium tert-butoxyde in THF. The mixed solutions were held at 50° C. for 5 minutes. The resulting stream was then mixed with a 0.2 M solution of 4-phenyl-cyclohexanone in THF and held at 70° C. for 5 min. At the conclusion of the reaction, the desired product was obtained in 65% yield. FIG. 48 displays a schematic of the reaction setup.

EXAMPLE 14

Figure 49:
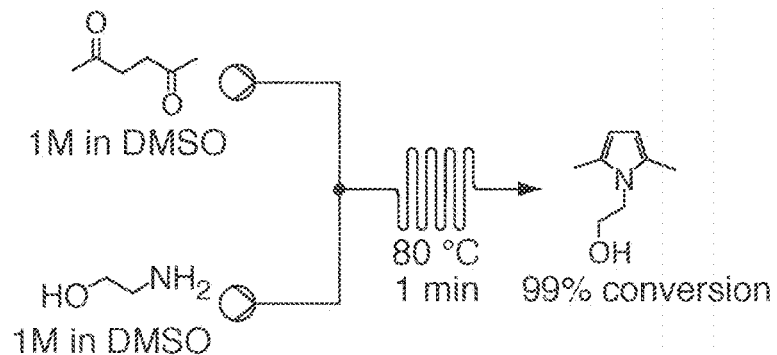

This example describes the use of a fluidic system to perform a Paal-Knorr pyrrole synthesis, which may be used to form heterocycles that are valuable motifs in active pharmaceutical ingredients. A 1 M solution of 2,5-hexanedione in DMSO was added to a 1 M solution of ethanolamine in DMSO. The mixture was held at 80° C. for 1 minute, after which the product was formed at 99% conversion. FIG. 49 displays a schematic of the reaction setup.

EXAMPLE 15

Figure 50:
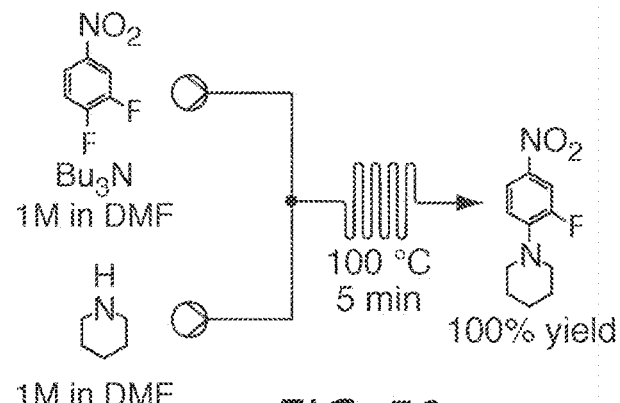

This example describes the use of a fluidic system to perform a nucleophilic aromatic substitution. A solution in DMF containing 1 M 3,4-difluoronitrobenzene and 1 M tributylamine was mixed with a solution in DMF containing 1 M piperidine. The solution was held at 100° C. for 5 min, after which the desired product was obtained in quantitative yield. FIG. 50 displays a schematic of the reaction setup.

EXAMPLE 16

Figure 51:
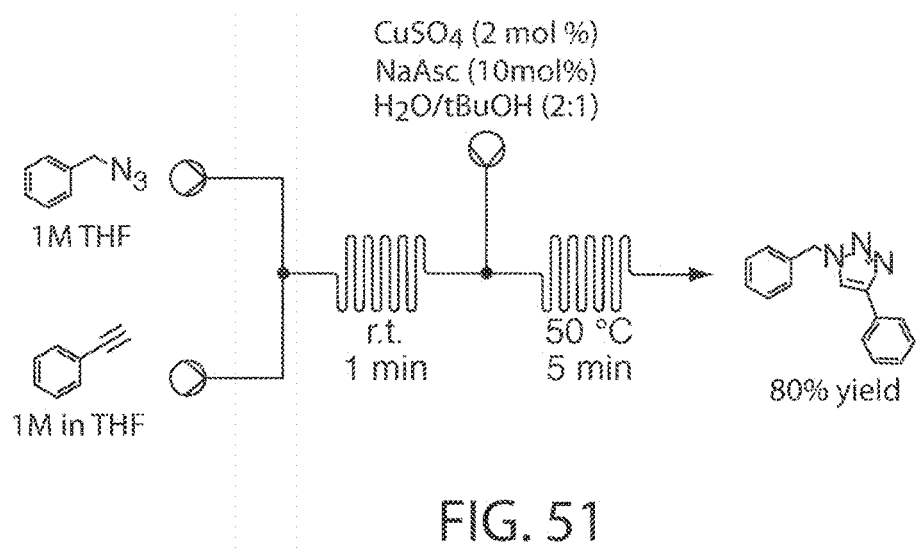

This example describes the use of a fluidic system to perform a copper-catalyzed azide-alkyne cycloaddition reaction, which is a click chemistry reaction. A 1 M solution of benzyl azide in THF was mixed with a 1 M solution of phenylacetylene in THF for 1 minute at room temperature. The resulting mixture was then mixed with a solution of copper sulfate and sodium ascorbate in water and tert-butanol. This mixture was held at 50° C. for 5 minutes, after which the desired triazole was obtained in 88% yield. FIG. 51 displays a schematic of the reaction setup.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A fluidic system, comprising:
   a fluidic distributor, comprising:
      a first bay comprising first and second fluidic connections; and
      a second bay comprising first and second fluidic connections;
      wherein the relative positions of the first and second fluidic connections of the first bay substantially correspond to the relative positions of the first and second fluidic connections of the second bay;
   a first fluidic module comprising an inlet and an outlet; and
   a second fluidic module comprising an inlet and an outlet,
   wherein the fluidic distributor, the first fluidic module, and the second fluidic module are configured to be interchangeable such that:
      the relative positions of the inlet and the outlet of the first fluidic module substantially correspond to the relative positions of the first and second fluidic connections of the first bay;
      the relative positions of the inlet and the outlet of the first fluidic module substantially correspond to the relative positions of the first and second fluidic connections of the second bay;
      the relative positions of the inlet and the outlet of the second fluidic module substantially correspond to the relative positions of the first and second fluidic connections of the first bay; and
      the relative positions of the inlet and the outlet of the second fluidic module substantially correspond to the relative positions of the first and second fluidic connections of the second bay.

2. A fluidic distributor, comprising:
   a first bay comprising first and second fluidic connections and an electrical interface; and
   a second bay comprising first and second fluidic connections and an electrical interface;
   wherein:
      a processor is electronically coupled to the electrical interfaces of the first and second bays; and
      the relative positions of the first fluidic connection of the first bay and the electrical interface of the first bay substantially correspond to the relative positions of the first fluidic connection of the second bay and the electrical interface of the second bay.

3. The fluidic distributor of claim 2, wherein relative positions of the first fluidic connection and the electrical interface of the first bay and relative positions of the first fluidic connection and the electrical interface of the second bay are arranged such that the first fluidic connection and electrical interface of the first bay can be superimposed over the first fluidic connection and the electrical interface of the second bay, while maintaining the relative positions between the first fluidic connection and electrical interface of the first bay and while maintaining the relative positions between the first fluidic connection and electrical interface of the second bay, such that:
   the degree of overlap of the first fluidic connection of the first bay and the first fluidic connection of the second bay is at least 50%, and
   the degree of overlap of the electrical interface of the first bay and the electrical interface of the second bay is at least 50%.

4. The fluidic distributor of claim 2, wherein relative positions of the first fluidic connection and the electrical interface of the first bay and relative positions of the first fluidic connection and the electrical interface of the second bay are arranged such that the first fluidic connection and electrical interface of the first bay can be superimposed over the first fluidic connection and the electrical interface of the second bay, while maintaining the relative positions between the first fluidic connection and electrical interface of the first bay and while maintaining the relative positions between the first fluidic connection and electrical interface of the second bay, such that:
   the degree of overlap of the first fluidic connection of the first bay and the first fluidic connection of the second bay is at least 95%, and
   the degree of overlap of the electrical interface of the first bay and the electrical interface of the second bay is at least 95%.

5. The fluidic system of claim 1, wherein relative positions of the first fluidic connection and the second fluidic connection of the first bay and relative positions of the first fluidic connection and the second fluidic connection of the second bay are arranged such that the first fluidic connection and the second fluidic connection of the first bay can be superimposed over the first fluidic connection and the second fluidic connection of the second bay, while maintaining the relative positions between the first fluidic connection and the second fluidic connection of the first bay and while maintaining the relative positions between the first fluidic connection and the second fluidic connection of the second bay, such that:
   the degree of overlap of the first fluidic connection of the first bay and the first fluidic connection of the second bay is at least 50%, and
   the degree of overlap of the second fluidic connection of the first bay and the second fluidic connection of the second bay is at least 50%.

6. The fluidic system of claim 1, wherein relative positions of the first fluidic connection and the second fluidic connection of the first bay and relative positions of the first fluidic connection and the second fluidic connection of the second bay are arranged such that the first fluidic connection and the second fluidic connection of the first bay can be superimposed over the first fluidic connection and the second fluidic connection of the second bay, while maintaining the relative positions between the first fluidic connection and the second fluidic connection of the first bay and while maintaining the relative positions between the first fluidic connection and the second fluidic connection of the second bay, such that:
   the degree of overlap of the first fluidic connection of the first bay and the first fluidic connection of the second bay is at least 95%, and the degree of overlap of the second fluidic connection of the first bay and the second fluidic connection of the second bay is at least 95%.

7. The fluidic system of claim 1, wherein the first fluidic connection of the first bay and the second fluidic connection of the first bay are arranged on a single surface.

8. The fluidic system of claim 1, wherein the fluidic distributor further comprises a third bay.

9. The fluidic system of claim 8, wherein the third bay comprises first and second fluidic connections, and the relative positions of the first and second fluidic connections of the first bay substantially correspond to the relative positions of the first and second fluidic connections of the third bay.

10. The fluidic system of claim 1, wherein the first fluidic module comprises at least one of a reactor, a separator, and a mixer.

11. The fluidic system of claim 10, wherein the second fluidic module comprises at least one of a reactor, a separator, and a mixer.

12. The fluidic system of claim 1, wherein the first fluidic module comprises a unit operation, and the second fluidic module comprises a unit operation that is different from the unit operation of the first fluidic module.

13. The fluidic system of claim 1, wherein the first fluidic module comprises a sensor configured to determine at least one condition within the first fluidic module selected from the group consisting of temperature, pressure, pH, a component concentration, and a flow rate.

14. The fluidic system of claim 13, wherein the second fluidic module comprises a sensor configured to determine at least one condition within the second fluidic module selected from the group consisting of temperature, pressure, pH, a component concentration, and a flow rate.

15. The fluidic system of claim 1, wherein the first bay comprises a cavity.

16. The fluidic system of claim 15, wherein the cavity is configured such that a module can be at least partially inserted into a volume of the cavity.

17. The fluidic system of claim 1, wherein:
the first fluidic module further comprises a sensor configured to determine at least one condition within the first fluidic module;
the second fluidic module further comprises a sensor configured to determine at least one condition within the second fluidic module;
when the inlet and outlet of the first fluidic module are coupled with the first and second fluidic connections of the first bay, an electrical interface of the first bay is electronically coupled with the sensor of the first fluidic module; and
when the inlet and outlet of the second fluidic module are coupled with the first and second fluidic connections of the second bay, an electrical interface of the second bay is electronically coupled with the sensor of the second fluidic module.

18. A fluidic system, comprising:
a fluidic distributor, comprising:
a first bay comprising first and second fluidic connections; and
a second bay comprising first and second fluidic connections;
wherein the relative positions of the first and second fluidic connections of the first bay substantially correspond to the relative positions of the first and second fluidic connections of the second bay;
a first fluidic module comprising an inlet, an outlet, and a sensor configured to determine at least one condition within the first fluidic module; and
a second fluidic module comprising an inlet, an outlet, and a sensor configured to determine at least one condition within the second fluidic module;
wherein:
when the inlet and outlet of the first fluidic module are coupled with the first and second fluidic connections of the first bay, an electrical interface of the first bay is electronically coupled with the sensor of the first fluidic module; and
when the inlet and outlet of the second fluidic module are coupled with the first and second fluidic connections of the second bay, an electrical interface of the second bay is electronically coupled with the sensor of the second fluidic module.

19. The fluidic system of claim 18, wherein the first fluidic module comprises at least one of a reactor, a separator, and a mixer.

20. The fluidic system of claim 18, wherein the sensor within the first fluidic module is configured to determine at least one condition within the second fluidic module selected from the group consisting of temperature, pressure, pH, a component concentration, and a flow rate.

* * * * *